US008037170B2

(12) United States Patent
Yoshiuchi et al.

(10) Patent No.: US 8,037,170 B2
(45) Date of Patent: Oct. 11, 2011

(54) INTEGRATED APPLICATION MANAGEMENT SYSTEM, APPARATUS AND PROGRAM, AND INTEGRATED SESSION MANAGEMENT SERVER, SYSTEM, PROGRAM AND SERVER CHASSIS, AND COMMUNICATION SYSTEM, SESSION MANAGEMENT SERVER AND INTEGRATION APPLICATION SERVER

(75) Inventors: Hideya Yoshiuchi, Kokubunji (JP); Tohru Setoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1533 days.

(21) Appl. No.: 11/190,805

(22) Filed: Jul. 28, 2005

(65) Prior Publication Data

US 2005/0267895 A1 Dec. 1, 2005

Related U.S. Application Data

(63) Continuation-in-part of application No. 10/882,075, filed on Jul. 1, 2004.

(30) Foreign Application Priority Data

Jan. 27, 2004 (JP) .................................. 2004-017862
Jan. 25, 2005 (JP) .................................. 2005-016251

(51) Int. Cl.
*G06F 15/173* (2006.01)
(52) U.S. Cl. ......... 709/224; 709/203; 709/217; 709/223
(58) Field of Classification Search .................. 709/224, 709/203, 217, 223
See application file for complete search history.

(56) References Cited

U.S. PATENT DOCUMENTS

| 5,724,508 A | 3/1998 | Harple, Jr. et al. |
| 5,854,893 A | 12/1998 | Ludwig et al. |
| 5,867,494 A | 2/1999 | Krishnaswamy et al. |
| 5,916,302 A | 6/1999 | Dunn et al. |
| 6,055,569 A | 4/2000 | O'Brien et al. |
| 6,134,680 A | 10/2000 | Yeomans |
| 6,604,129 B2 | 8/2003 | Slutsman et al. |
| 6,782,412 B2 | 8/2004 | Brophy et al. |
| 7,433,956 B2 * | 10/2008 | Zhao et al. ..................... 709/228 |
| 2002/0156843 A1 | 10/2002 | Hashimoto et al. |
| 2003/0033367 A1 * | 2/2003 | Itoh ............................... 709/203 |

(Continued)

FOREIGN PATENT DOCUMENTS

JP        07-160617       12/1993

(Continued)

*Primary Examiner* — Phuoc Nguyen
(74) *Attorney, Agent, or Firm* — Stites & Harbison PLLC; Juan Carlos A. Marquez, Esq.

(57) ABSTRACT

Disclosed here is an integrated application system for enabling a new application to be added and a user to select an optional application easily. The integrated application system includes a plurality of clients for receiving services from a plurality of application servers for supplying a plurality of services and a management apparatus for controlling services supplied by the application servers to the clients according to an integrated service starting request from any of clients. Each of the clients includes a client management unit for controlling participation of a plurality of application clients corresponding to a plurality of services in an integrated service. The client management unit selects each application used in the integrated service and a client that participates in the integrated service respectively and sends an integrated service starting request to the management apparatus while the management apparatus instructs each of the selected application servers to start a service according to the integrated service starting request from the client management unit.

4 Claims, 66 Drawing Sheets

U.S. PATENT DOCUMENTS

| | | | |
|---|---|---|---|
| 2003/0105813 A1* | 6/2003 | Mizutani | 709/203 |
| 2003/0115335 A1 | 6/2003 | Yoshida et al. | |
| 2003/0158910 A1* | 8/2003 | Toyouchi et al. | 709/218 |
| 2004/0143669 A1* | 7/2004 | Zhao et al. | 709/228 |
| 2004/0174392 A1 | 9/2004 | Bjoernsen et al. | |
| 2005/0037745 A1 | 2/2005 | Chan et al. | |
| 2005/0204048 A1* | 9/2005 | Pujol et al. | 709/229 |
| 2006/0294112 A1* | 12/2006 | Mandato et al. | 707/100 |
| 2008/0086564 A1* | 4/2008 | Putman et al. | 709/227 |

FOREIGN PATENT DOCUMENTS

| | | |
|---|---|---|
| JP | 9-114759 | 10/1995 |
| JP | 08-307544 | 11/1996 |
| JP | 2003-114858 | 4/2003 |

* cited by examiner

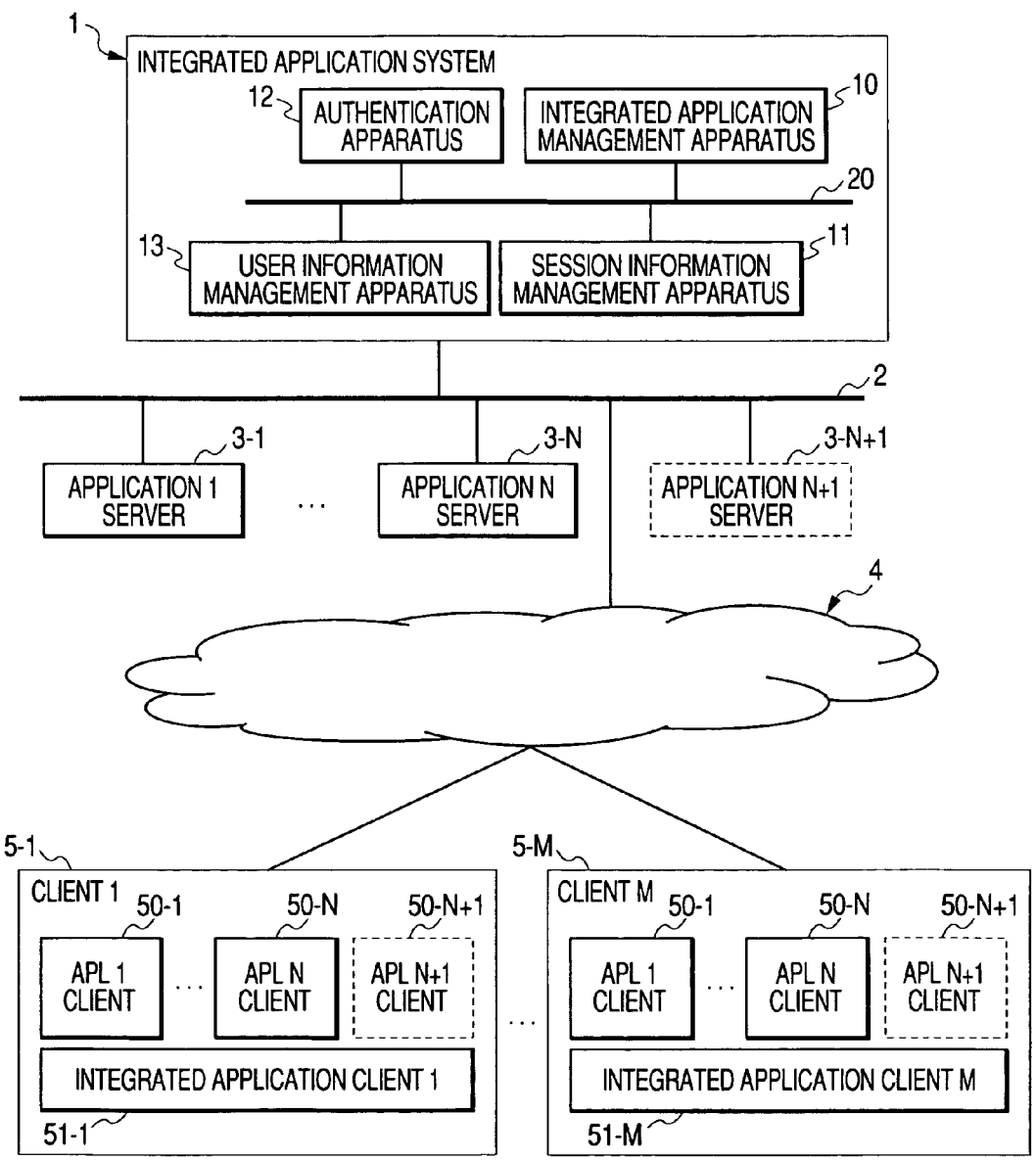

FIG. 25

| ORIGINATING ADDRESS | DESTINATION ADDRESS | PACKET TYPE (LOGIN REQUEST) | INTEGRATED SESSION ID | USER NAME | PASSWORD | PF1 |
|---|---|---|---|---|---|---|
| ORIGINATING ADDRESS | DESTINATION ADDRESS | PACKET TYPE (AUTHENTICATION INFORMATION COMPARISON) | INTEGRATED SESSION ID | USER NAME | PASSWORD | PF2 |
| ORIGINATING ADDRESS | DESTINATION ADDRESS | PACKET TYPE (AUTHENTICATION INFORMATION COMPARISON COMPLETION) | INTEGRATED SESSION ID | RESPONSE CODE | | PF3 |
| ORIGINATING ADDRESS | DESTINATION ADDRESS | PACKET TYPE (LOGIN COMPLETION NOTIFICATION) | INTEGRATED SESSION ID | RESPONSE CODE | | PF4 |
| ORIGINATING ADDRESS | DESTINATION ADDRESS | PACKET TYPE (LOGIN COMPLETION NOTIFICATION) | INTEGRATED SESSION ID | APPLICATION SERVER LIST | RESPONSE CODE | PF5 |
| ORIGINATING ADDRESS | DESTINATION ADDRESS | PACKET TYPE (INTEGRATED SESSION INVITING REQUEST) | INTEGRATED SESSION ID | PARTICIPANT LIST | APPLICATION LIST | APPLICATION TYPE LIST | PF6 |
| ORIGINATING ADDRESS | DESTINATION ADDRESS | PACKET TYPE (AUTHENTICATION STATUS NOTIFICATION REQUEST) | INTEGRATED SESSION ID | USER NAME | | PF7 |
| ORIGINATING ADDRESS | DESTINATION ADDRESS | PACKET TYPE (AUTHENTICATION STATUS NOTIFICATION) | INTEGRATED SESSION ID | USER NAME | RESPONSE CODE | PF8 |
| ORIGINATING ADDRESS | DESTINATION ADDRESS | PACKET TYPE (USER INFORMATION SENDING REQUEST) | INTEGRATED SESSION ID | USER NAME LIST | APPLICATION ID LIST | PF9 |
| ORIGINATING ADDRESS | DESTINATION ADDRESS | PACKET TYPE (USER INFORMATION) | INTEGRATED SESSION ID | USER NAME LIST | APPLICATION ACCOUNT LIST | RESPONSE CODE | PF10 |
| ORIGINATING ADDRESS | DESTINATION ADDRESS | PACKET TYPE (SESSION INFORMATION REGISTRATION REQUEST) | INTEGRATED SESSION ID | PARTICIPANT LIST | APPLICATION SESSION ID LIST | APPLICATION TYPE LIST | PF11 |
| ORIGINATING ADDRESS | DESTINATION ADDRESS | PACKET TYPE (SESSION INFORMATION REGISTRATION COMPLETION) | INTEGRATED SESSION ID | RESPONSE CODE | | PF12 |
| ORIGINATING ADDRESS | DESTINATION ADDRESS | PACKET TYPE (SESSION INVITING REQUEST) | INTEGRATED SESSION ID | APPLICATION SESSION ID | PARTICIPANT LIST | PF13 |
| ORIGINATING ADDRESS | DESTINATION ADDRESS | PACKET TYPE (SESSION INVITING COMPLETION) | INTEGRATED SESSION ID | APPLICATION SESSION ID | RESPONSE CODE | PF14 |

FIG. 26

| ORIGINATING ADDRESS | DESTINATION ADDRESS | PACKET TYPE (INTEGRATED SESSION INVITING COMPLETION) | INTEGRATED SESSION ID | RESPONSE CODE | | | PF15 |

| ORIGINATING ADDRESS | DESTINATION ADDRESS | PACKET TYPE (INTEGRATED SESSION ID NOTIFICATION) | INTEGRATED SESSION ID | PARTICIPANT LIST | APPLICATION SESSION ID LIST | APPLICATION TYPE LIST | PF16 |

| ORIGINATING ADDRESS | DESTINATION ADDRESS | PACKET TYPE (INTEGRATED SESSION EXITING REQUEST) | INTEGRATED SESSION ID | USER NAME | | | PF17 |

| ORIGINATING ADDRESS | DESTINATION ADDRESS | PACKET TYPE (INTEGRATED SESSION EXITING COMPLETION) | INTEGRATED SESSION ID | USER NAME | RESPONSE CODE | | PF18 |

| ORIGINATING ADDRESS | DESTINATION ADDRESS | PACKET TYPE (SESSION EXITING REQUEST) | INTEGRATED SESSION ID | APPLICATION SESSION ID | USER LIST | | PF19 |

| ORIGINATING ADDRESS | DESTINATION ADDRESS | PACKET TYPE (SESSION EXITING COMPLETION NOTIFICATION) | INTEGRATED SESSION ID | APPLICATION SESSION ID | USER LIST | RESPONSE CODE | PF20 |

| ORIGINATING ADDRESS | DESTINATION ADDRESS | PACKET TYPE (SESSION INFORMATION UPDATE REQUEST) | INTEGRATED SESSION ID | OPERATION TYPE (ADD/DELETE) | USER LIST | APPLICATION SESSION ID LIST | APPLICATION TYPE LIST | PF21 |

| ORIGINATING ADDRESS | DESTINATION ADDRESS | PACKET TYPE (SESSION INFORMATION UPDATE COMPLETION) | INTEGRATED SESSION ID | PARTICIPANT LIST | APPLICATION SESSION ID LIST | APPLICATION TYPE LIST | RESPONSE CODE | PF22 |

| ORIGINATING ADDRESS | DESTINATION ADDRESS | PACKET TYPE (SESSION INVITING ERROR) | INTEGRATED SESSION ID | APPLICATION SESSION ID | ERROR TYPE (CLIENT/SERVER) | ERROR USER LIST | RESPONSE CODE | PF23 |

| ORIGINATING ADDRESS | DESTINATION ADDRESS | PACKET TYPE (COMPULSORY EXITING ASKING) | INTEGRATED SESSION ID | APPLICATION SESSION ID | USER LIST | | PF24 |

| ORIGINATING ADDRESS | DESTINATION ADDRESS | PACKET TYPE (COMPULSORY EXITING COMPLETION) | INTEGRATED SESSION ID | APPLICATION SESSION ID | USER LIST | RESPONSE CODE | PF25 |

| ORIGINATING ADDRESS | DESTINATION ADDRESS | PACKET TYPE (INTEGRATED SESSION INVITING ERROR NOTIFICATION) | INTEGRATED SESSION ID | ERROR TYPE (CLIENT/SERVER) | ERROR USER LIST | APPLICATION TYPE | PF26 |

| ORIGINATING ADDRESS | DESTINATION ADDRESS | PACKET TYPE (INTEGRATED SESSION INVITING FAILURE) | INTEGRATED SESSION ID | | | | PF27 |

FIG. 64

| | | | | | | | |
|---|---|---|---|---|---|---|---|
| APF-01 | SOURCE ADDRESS | DESTINATION ADDRESS | PACKET TYPE (INTEGRATED PRESENCE INFORMATION REGISTRATION) | INTEGRATED SYSTEM SESSION ID | USER NAME | LIST OF AVAILABLE APPLICATION | LIST OF PRESENCE INFORMATION |
| APF-03 | SOURCE ADDRESS | DESTINATION ADDRESS | PACKET TYPE (INTEGRATED PRESENCE INFORMATION NOTIFICATION) | INTEGRATED SYSTEM SESSION ID | USER NAME | LIST OF AVAILABLE APPLICATION | LIST OF PRESENCE INFORMATION |
| APF-05 | SOURCE ADDRESS | DESTINATION ADDRESS | PACKET TYPE (INTEGRATED SESSION INFORMATION) | INTEGRATED SYSTEM SESSION ID | USER NAME | LIST OF AVAILABLE APPLICATION | INTEGRATED SESSION TYPE |
| APF-07 | SOURCE ADDRESS | DESTINATION ADDRESS | PACKET TYPE (APPLICATION PRESENCE INFORMATION REGISTRATION) | USER NAME | LIST OF AVAILABLE APPLICATION | LIST OF PRESENCE INFORMATION | |
| APF-09 | SOURCE ADDRESS | DESTINATION ADDRESS | PACKET TYPE (APPLICATION PRESENCE INFORMATION NOTIFICATION) | USER NAME | LIST OF AVAILABLE APPLICATION | LIST OF PRESENCE INFORMATION | |
| APF-11 | SOURCE ADDRESS | DESTINATION ADDRESS | PACKET TYPE (APPLICATION SESSION ADDING REQUEST) | INTEGRATED SYSTEM SESSION ID | PARTICIPANT LIST | LIST OF APPLICATION | LIST OF APPLICATION TYPE |
| APF-13 | SOURCE ADDRESS | DESTINATION ADDRESS | PACKET TYPE (COMPLETION OF APPLICATION SESSION ADDING REQUEST) | INTEGRATED SYSTEM SESSION ID | RESPONSE CODE | | |
| APF-15 | SOURCE ADDRESS | DESTINATION ADDRESS | PACKET TYPE (APPLICATION TYPE REGISTRATION REQUEST) | INTEGRATED SYSTEM SESSION ID | USER NAME | LIST OF APPLICATION | LIST OF USER APPLICATION |
| APF-17 | SOURCE ADDRESS | DESTINATION ADDRESS | PACKET TYPE (COMPLETION OF APPLICATION TYPE REGISTRATION REQUEST) | INTEGRATED SYSTEM SESSION ID | RESPONSE CODE | | |

INTEGRATED APPLICATION MANAGEMENT SYSTEM, APPARATUS AND PROGRAM, AND INTEGRATED SESSION MANAGEMENT SERVER, SYSTEM, PROGRAM AND SERVER CHASSIS, AND COMMUNICATION SYSTEM, SESSION MANAGEMENT SERVER AND INTEGRATION APPLICATION SERVER

CROSS-REFERENCE TO RELATED APPLICATION

This application is a Continuation-in-Part application of U.S. application Ser. No. 10/882,075 filed on Jul. 1, 2004. Priority is claimed based on Japanese Patent Application No. 2005-016251 filed on Jan. 25, 2005 and on the parent U.S. application Ser. No. 10/822,075 filed on Jul. 1, 2004, which claims the priority date of Jan. 27, 2004, the filing date of Japanese Patent Application No. 2004-017862.

CLAIM OF PRIORITY

The present application claims priority from Japanese application JP 2005-016251 filed on Jan. 15, 2005, the content of which is hereby incorporated by reference into this application.

FIELD OF THE INVENTION

The present invention relates to a technique for improving an interactive system using a plurality of applications that work cooperatively.

BACKGROUND OF THE INVENTION

In an interactive system used for a teleconference and chatting, image data, voice data, and text data are exchanged between servers and clients in preset control sequences using applications for processing those image data, voice data, and text data, respectively.

Such a system that uses a plurality of applications, as well known, is provided with a control interface for controlling those applications integrally (refer to the patent document 1).

In a conventional system provided with such an integral control interface, a predetermined application is installed in each of the servers and clients beforehand and an interactive session is started when all those applications are set up.
[Patent document 1] JP-A No. 114759/1997

In the above conventional example, however, an application is used for the communication between each server and each client according to the control sequences determined when the system is designed. It is therefore very difficult to add a new application required to cope with an expansion of the system in function if the application cannot satisfy the control sequences determined when the system is designed.

Furthermore, in the above conventional example, only the utilization rate of each of the resources (line, disk, etc.) used for each of the applications is managed; no application session cooperation is managed. This is why it is difficult to make a plurality of application sessions to cooperate. This has been a conventional problem. In addition, when distribution of an event is to be notified to a plurality of applications, each of those applications is required to be set manually, so that much labor is needed to manage the system. This has been another conventional problem.

A client user, when participating in the system, is required to use all of a plurality of predetermined applications; the user cannot select only necessary applications. This has also been still another conventional problem.

SUMMARY OF THE INVENTION

Under such circumstances, it is an object of the present invention to enable new applications to be added easily and the user to select necessary applications freely.

According to one aspect of the present invention, the integrated application management system comprises a plurality of application servers for supplying a service respectively; a plurality of clients for receiving services from those application servers respectively; a management apparatus for controlling the services supplied from the application servers to the clients and the clients that receive an integrated service according to an integrated service starting request from any of the clients. Each of the clients has a client management unit for controlling a plurality of application clients corresponding to the plurality of services and participation of those application clients in the integrated service. This client management unit selects an application used in the integrated service and a client that participates in the integrated service respectively and sends an integrated service starting request to the management apparatus while the management apparatus includes an integrated service control unit for instructing the application server that supplies a service corresponding to the selected application to start the service for the selected client according to the integrated service start request received from the client management unit. The application server notifies the client management unit of the selected participating client of the start of the service according to the instruction from the integrated service control unit.

This is why the present invention can configure such an application integrated management system flexibly, since services of a plurality of application servers are controlled by both of a management unit and a client management unit of each client when information is to be exchanged among a plurality of terminals, especially in real time, through an integrated service.

Especially, because each client can select any application to receive such an integrated service, the client user comes to receive the integrated service using any necessary application. And, the management unit can add/modify any application to be supplied therefrom as needed, thereby coming to supply integrated services with higher degrees of freedom.

BRIEF DESCRIPTION OF THE DRAWINGS

FIG. 1 is a block diagram of an integrated application management system in an embodiment of the present invention;

FIG. 25 describes an example of a packet used for communication between an integrated application management system and a client;

FIG. 26 describes another example of a packet used for communication between an integrated application management system and a client;

FIG. 64 is a format of packets related to the presence registering functions;

DETAILED DESCRIPTION OF THE PREFERRED EMBODIMENTS

Figure 2A:
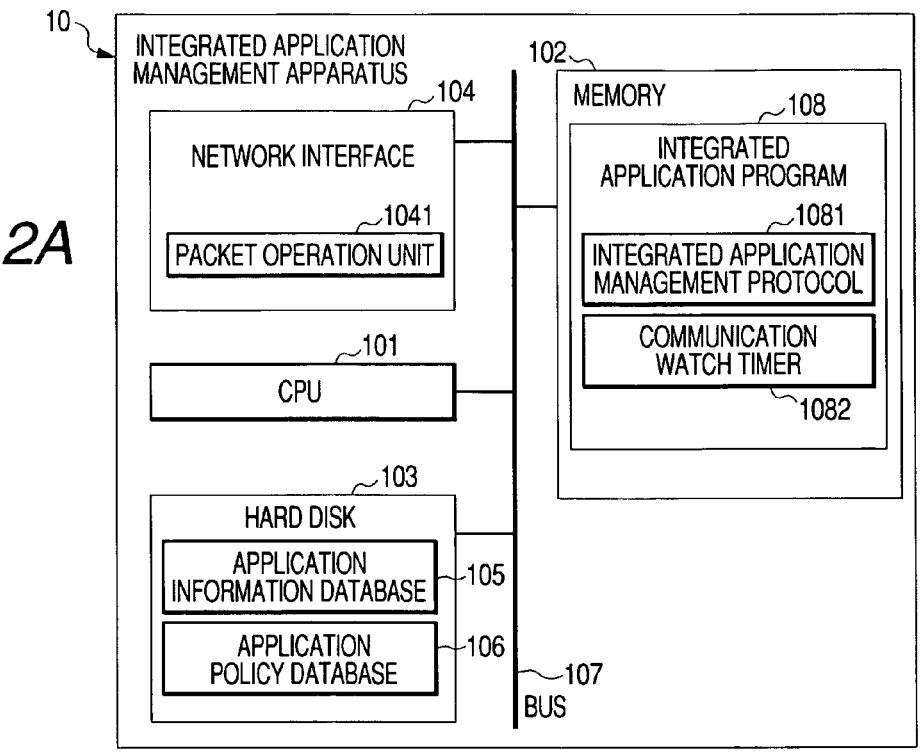
FIG. 2A is a block diagram of an integrated application management apparatus.

Hereunder, an embodiment of the present invention will be described with reference to the accompanying drawings.

FIG. 1 is a block diagram of an integrated system of the present invention, which enables a plurality of applications to cooperate so that a plurality of clients (users) exchange information with each another at a teleconference, text chat (for learning), or the like.

<Overall Configuration>

An integrated application management system 1 for controlling each integrated system comprises an integrated application management apparatus 10 for managing a plurality of application servers 3-1 to 3-N using an integrated application control protocol (to be described later), a session information management apparatus 11 for recording information of each session between the application servers 3-1 to 3-N and the clients 5-1 to 5-M, an authentication apparatus 12 for authenticating each user according to a request from any of the clients 5-1 to 5-M, a user information management apparatus 13 for managing information of each user who uses any of the clients 5-1 to 5-M. Those apparatuses are connected to each another through a network 20. A session mentioned above means information exchanges among a plurality of terminals. Mainly, it means information exchanges in real time.

The network 20 is connected to an internal network 2 connected to the application servers 3-1 to 3-N and the integrated application management system 1 manages the application servers 3-1 to 3-N integrally. Each of the application servers 3-1 to 3-N communicates with each of the clients 5-1 to 5-M (concretely, integrated application clients 51-1 to 51-M) through an external network 4 under the control of the integrated application management apparatus 10 to supply its service to those clients using an application.

Each of the plurality of application servers 3-1 to 3-N executes an application as follows, for example. The application server 3-1 executes the application APL1 that supplies a TV conference service with images and voices, the application server 3-N executes an application APLN that supplies a text chat service for enabling text data to be exchanged among users and/or distributed to users, another application server executes an application that supplies a service for enabling presentation data (including graphics, etc.) to be exchanged among users and/or distributed to users or a service for enabling CAD data to be exchanged among users and/or distributed to users.

In order to simplify the description, it is premised here that one application server executes one application. However, one application server may also execute a plurality of applications. Similarly, in the integrated application management system 1, each of the integrated application management apparatus 10, the session information management apparatus 11, the authentication apparatus 12, and the user information management apparatus 13 is configured by a single independent server. However, one server may include all the functions of those apparatuses.

After that, each of the plurality of clients 5-1 to 5-M receives services from the application servers 3-1 to 3-N through an external network 4 under the control of the integrated application management system 1.

Each of the clients 5-1 to 5-M includes a plurality of application clients (APL1 to N) 50-1 to 50-N for using the functions of the application servers 3-1 to 3-N and a plurality of integrated application clients 51-1 to 51-M for integrating the application clients 50-1 to 50-N and processing the integrated application control protocol between itself and the integrated application management apparatus 10. Each of the clients 5-1 to 5-M includes an input device and a display device (both not shown).

Each of the clients 5-1 to 5-M is not required to include the same application clients 50-1 to 50-N; each client may be configured by an application client indispensable for such systems as TV conference one, etc. and an optional application client selected optionally according to a user's request or the like. And, the operation environment of each application client except for the indispensable one may be set differently among users.

<Outline of System Functions>

Next, a description will be made for all the functions of the integrated application management system 1. The integrated application management apparatus 10 controls the session of each of the application servers 3-1 to 3-N using the integrated application control protocol to supply user-requested application services (starting, ending, etc.) to the clients 5-1 to 5-M. The integrated application management apparatus 10 detects application and system errors and notifies the user of each of the clients 5-1 to 5-M of such error occurrence when such an error occurs.

And, as to be described later, the integrated application management apparatus 10 includes an application information database used to manage applications of the application servers 3-1 to 3-N and application information is added to this database to enable a new application (APL N+1) in Fig.) to be added thereto at any time.

Each of the integrated application clients 51-1 to 51-M, which controls one of the application clients 5-1 to 5-M under the control of the integrated application management apparatus 10, can add a new application (APL N+1 in FIG. 1, for example) to any application client at any time. And, each of the application clients 50-1 to 50-N can implement such an added application by its plug-in function.

The application servers 3-1 to 3-N and the application clients 51-1 to 51-M of the clients 5-1 to 5-M never interfere with each another. For example, the application server 3-1 controls only the application client 51-1 (APL1 in Fig.) of the client 5-1 to 5-M and neglects the actions of other application clients.

<Detailed Description of Each Apparatus>

Next, each apparatus will be described in detail.

Figure 2B:
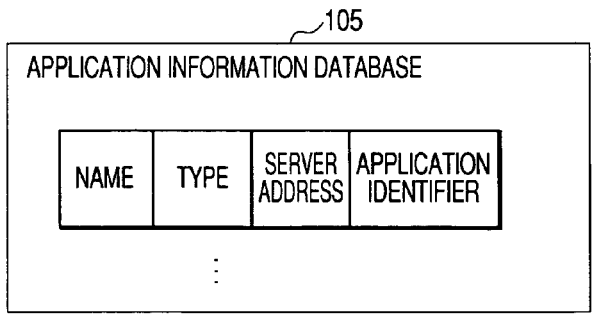
FIG. 2B is a block diagram of an application information database.
Figure 2C:
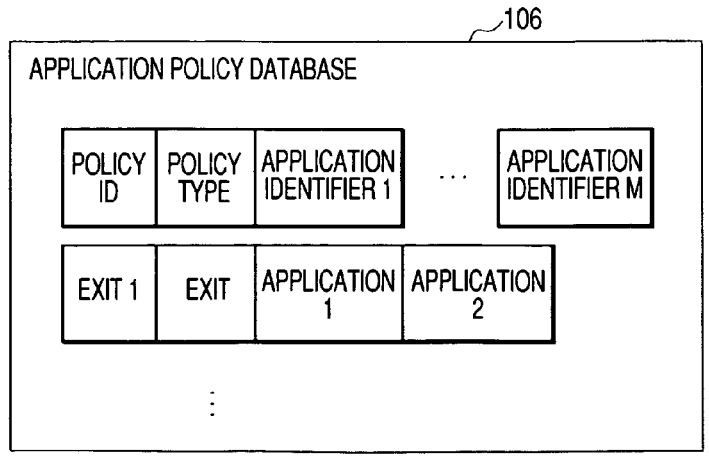
FIG. 2C is a block diagram of an application policy database.

FIG. 2 shows a detailed block diagram of an integrated application management apparatus 10; FIG. 2A shows a functional block diagram of the hardware mainly, FIG. 2B shows a structure of the data in an application information database 105 provided in the integrated application management apparatus 10, and FIG. 2C shows a structure of the data in an application policy database 106 provided in the integrated application management apparatus 10 respectively.

In FIG. 2A, the integrated application management apparatus (server) 10 includes a CPU 101, a memory 102, a hard disk 103, and a network interface 104 connected to a bus 107 respectively and the integrated application management apparatus 10 communicates with a network 20 through a packet operation unit 104 provided in the network interface 104.

The hard disk 103 includes an application information database 105 describing the information related to the applications to be executed in the application servers 3-1 to 3-N and an application policy database 106 describing a cooperative relationship among a plurality of applications. The integrated application program 108 loaded in the memory 102 reads/writes the information from/in those databases 105 and 106.

The integrated application program 108 in the memory 102 controls the application servers 3-1 to 30-N as described above using an integrated application control protocol 1081 and a communication watch timer 1082 watches each session the application servers 3-1 to 3-N and the clients 5-1 to 5-M and detects errors to occur in the session.

FIG. 2B shows a structure of the data retained in the application information database 105. Each record in this database consists of blocks of application name, application type for identifying the subject application is indispensable or optional for an integrated session (integrated service), address of each of the application servers 3-1 to 3-N for executing the type-identified application, and identifier (or field) for identifying an application. This application identifier is used for session information management and application policies to be described later.

FIG. 2C shows a structure of the data retained in the application policy database 106. Each record in this database 106 mainly consists of blocks of policy identifying ID, policy type denoting such a type as inviting/exiting a subject integrated system, identifier of a cooperative application in accordance with a policy type, as well as blocks of "exit1" denoting a policy management ID, exit status, and the name of an application to exit. The applications 1 and 2 to exit are defined so as to exit the subject integrated system when an application having one of the application identifiers 1 to N required for a cooperative processing, set for the application 1 or 2, is ended. Concretely, when an application ends, it becomes difficult to exchange information between clients 5, so that the application is required to exit the integrated system. For example, while an application for distributing/exchanging image data and an application for distributing/exchanging voice data are cooperating, if only the application for distributing/exchanging voice data ends, the TV conference disables the talking. Therefore, if an application required for enabling another application to function stops, the dependent application is also stopped.

This application policy database 106 retains information of applications used cooperatively to start/end a service according to the state of such a start/end of a session.

Figure 3:
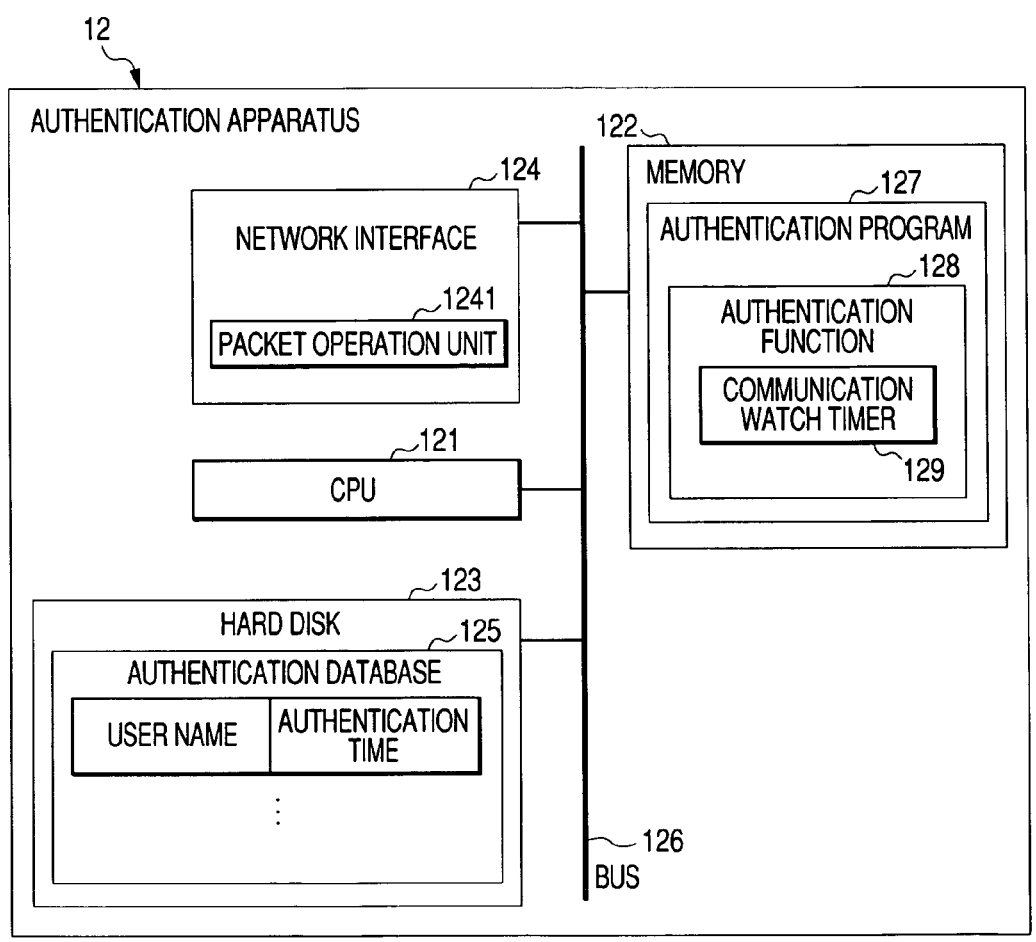
FIG. 3 is a block diagram of an authentication apparatus.

FIG. 3 shows a detailed block diagram of an authentication apparatus for authenticating each user when any of the clients 5-1 to 5-M is to participate in the system.

The authentication apparatus (server) 12 includes a CPU 121, a memory 122, a hard disk 123, and a network interface 124 connected to a bus 126 respectively and the apparatus 12 communicates with a network 20 through a packet operation unit 121 provided in the network interface 124.

The hard disk 123 retains an authentication database 125 for recording whether or not each user is authenticated. An authentication program 127 loaded in the memory 122 reads/writes information from/in the database 125.

The authentication program 128 in the memory 122 reads user information from the user information management apparatus 13 according to the authentication information (user name, password, etc.) received from any of the clients 5-1 to 5-M to execute an authentication program 128 for determining whether or not the authentication information is correct. This authentication program 128, when a user name is authenticated, writes the authenticated user name in the database 125 together with the authentication time as a pair of records. The authentication program 128 then notifies the authentication result to the integrated application management apparatus 10. The authentication program 128 also has a communication watch timer 129 used to detect such communication errors as timeout.

Figure 4A:
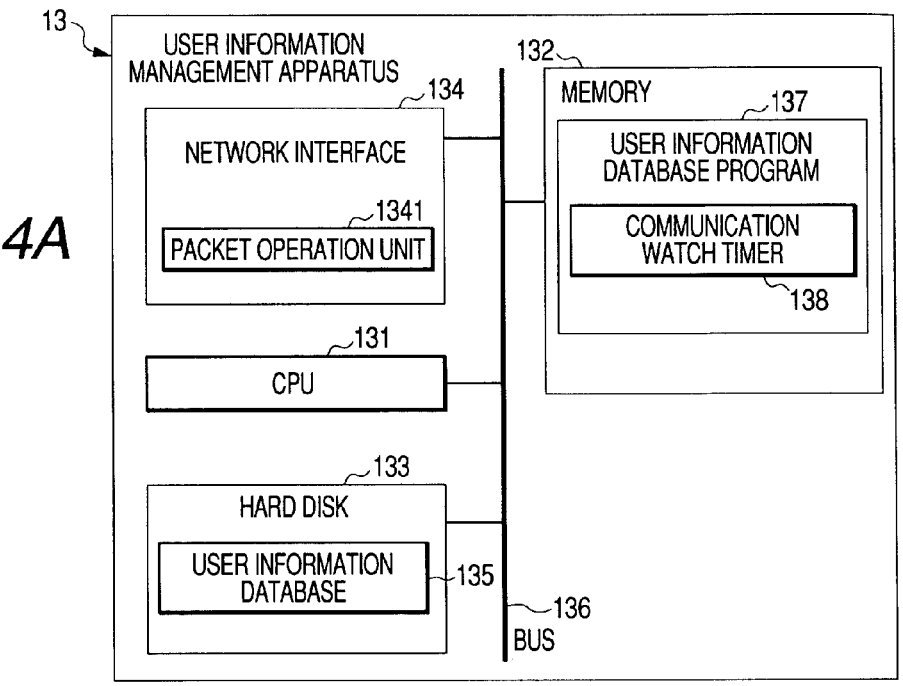
FIG. 4A is a block diagram of a user information management apparatus.
Figure 4B:
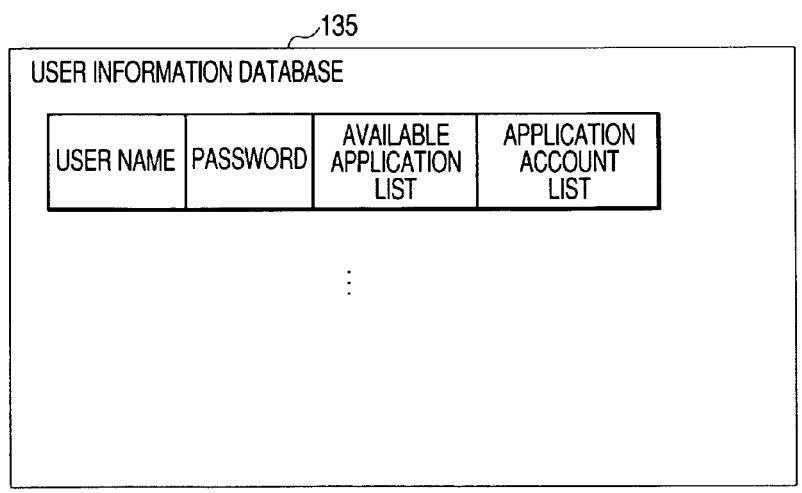
FIG. 4B is a block diagram of a user information database (B)

FIGS. 4A and 4B show a detailed block diagram of a user information management apparatus 13 for managing user information when any of the clients 5-1 to 5-M participates in the system. FIG. 4A shows a functional block diagram of the hardware mainly while FIG. 4B shows a structure of the data in the user information database 135 provided in the user information management apparatus 13.

In FIG. 4A, the user information management apparatus 13 includes a CPU 131, a memory 132, a hard disk 133, and a network interface 134 connected to a bus 136 respectively and the apparatus 13 communicates with the network 20 through a packet operation unit 1341 provided in the network interface 134.

The hard disk 133 retains a user information database 135 in which each user information is set. A user information database program 137 loaded in the memory 132 reads/writes information from/in the database 135. The user information database program 137 includes a communication watch timer 128 used to detect such communication errors as timeout.

FIG. 4B shows a structure of the data retained in the user information database 135. Each record in the database 135 consists of blocks of user name, password, application list denoting identifiers of the applications to be used by the user, accounting list preset for each application in each of the application servers 3-1 to 3-N.

The user information database program 137 reads both user name and password according to a request from the authentication apparatus 12 and sends the information to the apparatus 12 and notifies each available application and the account of each of the application servers 3-1 to 3-N to the integrated application management apparatus 10 according to the user name in response to a request therefrom.

User information is set when the user applies his/her participation in the system, for example.

Figure 5A:
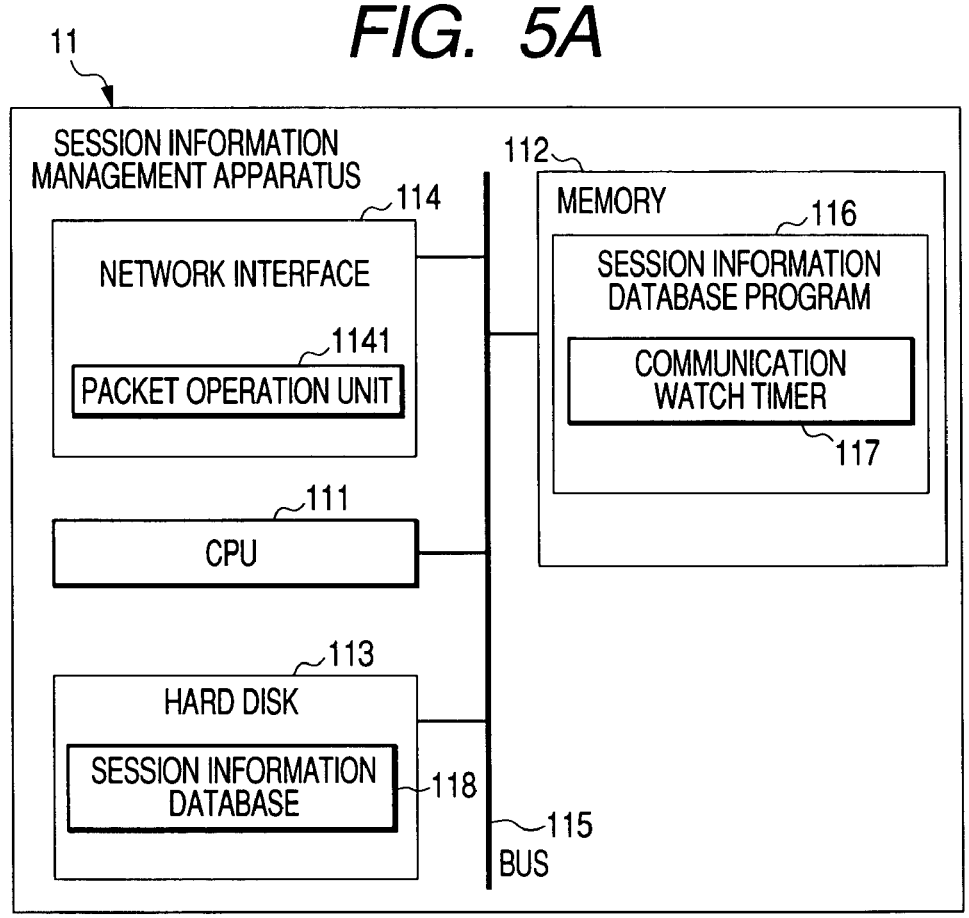
FIG. 5A is a block diagram of a session information management apparatus.
Figure 5B:
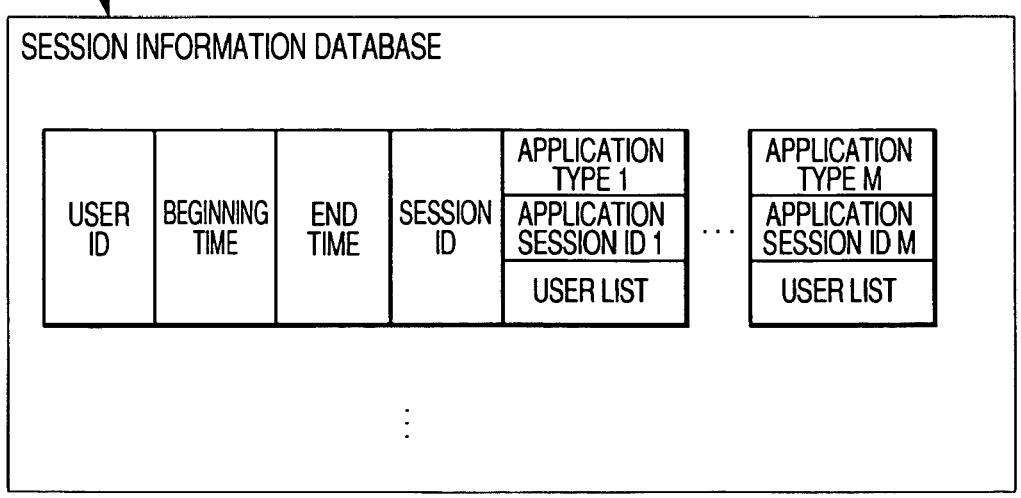
FIG. 5B is a block diagram of a session information database (B)

FIGS. 5A and 5B show a detailed block diagram of a session information management apparatus 11 for managing information of each session between the application servers 3-1 to 3-N and the clients 5-1 to 5-M according to a command received from the integrated application management apparatus 10. FIG. 5A shows a functional block diagram of the hardware mainly while FIG. 5B shows a structure of the data retained in the session information database 118 provided in the session information management apparatus 11.

In FIG. 5A, the session information management apparatus 11 includes a CPU 111, a memory 112, a hard disk 113, and a network interface 114 connected to a bus 115 respectively and the apparatus 11 communicates with the network 20 through a packet operation unit 1141 provided in the network interface 114.

The hard disk 113 retains a user information database 118 in which each user information is set. A session information database program 116 loaded in the memory 112 reads/writes information from/in the database 116. The session information database program 116 includes a communication watch timer 117 used to detect such communication errors as timeout.

FIG. 5B shows a structure of the data retained in the user information database 118. Each record in the database 118 consists of blocks of user ID with which a session with the application servers 3-1 to 3-N is established, session starting time, session ending time, unique session ID for specifying a session, and session established application information. This application information consists of blocks in accordance with the number of session established applications as shown in FIG. 5. Each block consists of items of application type set in the application information database 105, application session ID assigned to each application session, and session user list.

The session information database program 116, when notified the start/end of a session from the integrated application management apparatus 10, records the time (ex., a time added to a packet or system time) as the starting/ending time in the session information database 118. The session ID is given from the integrated application management apparatus 10 as to be described later. The application session ID is a predetermined number (ex., a serial number) given from any of the application servers 3-1 to 3-N.

The session information management apparatus 11 records both time and application information each time a session between the application servers 3-1 to 3-N and the clients 5-1 to 5-M is changed over to another.

Figure 6:
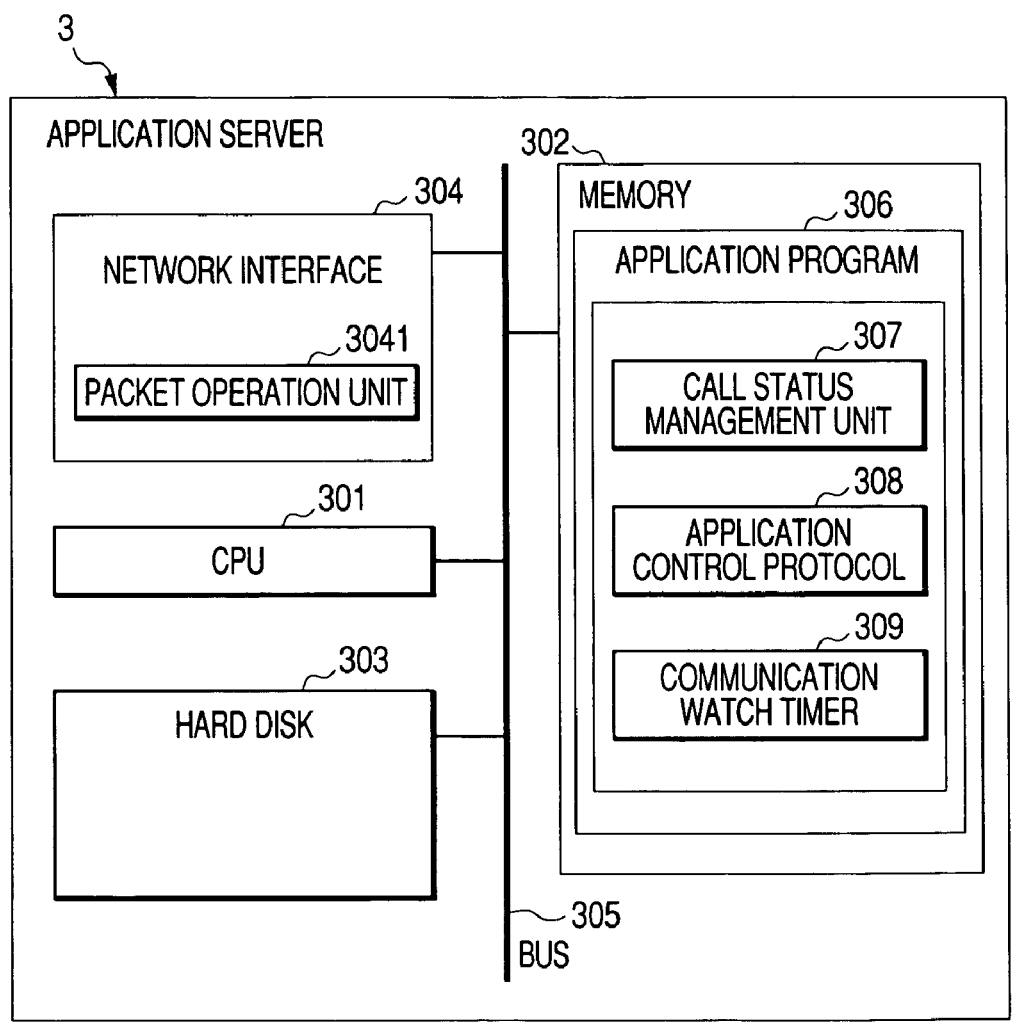
FIG. 6 is a block diagram of an application server.

FIG. 6 shows a detailed block diagram of one of the application servers 3-1 to 3-N for supplying services to the clients 5-1 to 5-M under the control of the integrated application management apparatus 10. The application servers 3-1 to 3-N are all the same in configuration, so that a generic name "application server 3" will be used for them and the internal configuration is shown in FIG. 6. In the description to be made hereunder, the application server 3 will be used as a generic name of the application servers 3-1 to 3-N and the application servers 3-1 to 3-N will be used when respective application servers are to be described.

The application server 3 includes a CPU 301, a memory 302, a hard disk 303, and a network interface 304 connected to a bus 305 respectively and the application server 3 communicates with the network 20 through a packet operation unit 3041 provided in the network interface 304.

The memory 302 stores an application 306 loaded therein and executed there to supply a predetermined service. This application 306 includes a call status management unit 307 for managing start or end of a service according to a request (service start/end request) from any of the integrated application management apparatus 10 and the clients 5-1 to 5-M, as well as an application control protocol processing unit 308 for processing communication (application control protocol) with any of the integrated application management apparatus 10 and the integrated application clients 51-1 to 51-M of the clients 5-1 to 5-M, as well as a communication watch timer 309 for watching such communication errors as timeout.

The application server 3, when receiving a service start request (session inviting request, hereinafter) from the integrated application management apparatus 10 as to be described later, notifies invitation to a session to the integrated application clients 51-1 to 51-M of the clients 5-1 to 5-M, respectively. Receiving the invitation, each of the integrated application clients 51-1 to 51-M of the clients 5-1 to 5-M then starts up the application corresponding to each of the clients 5-1 to 5-M so as to establish the session with one of the clients 5-1 to 5-M to supply a service thereto.

Figure 7:
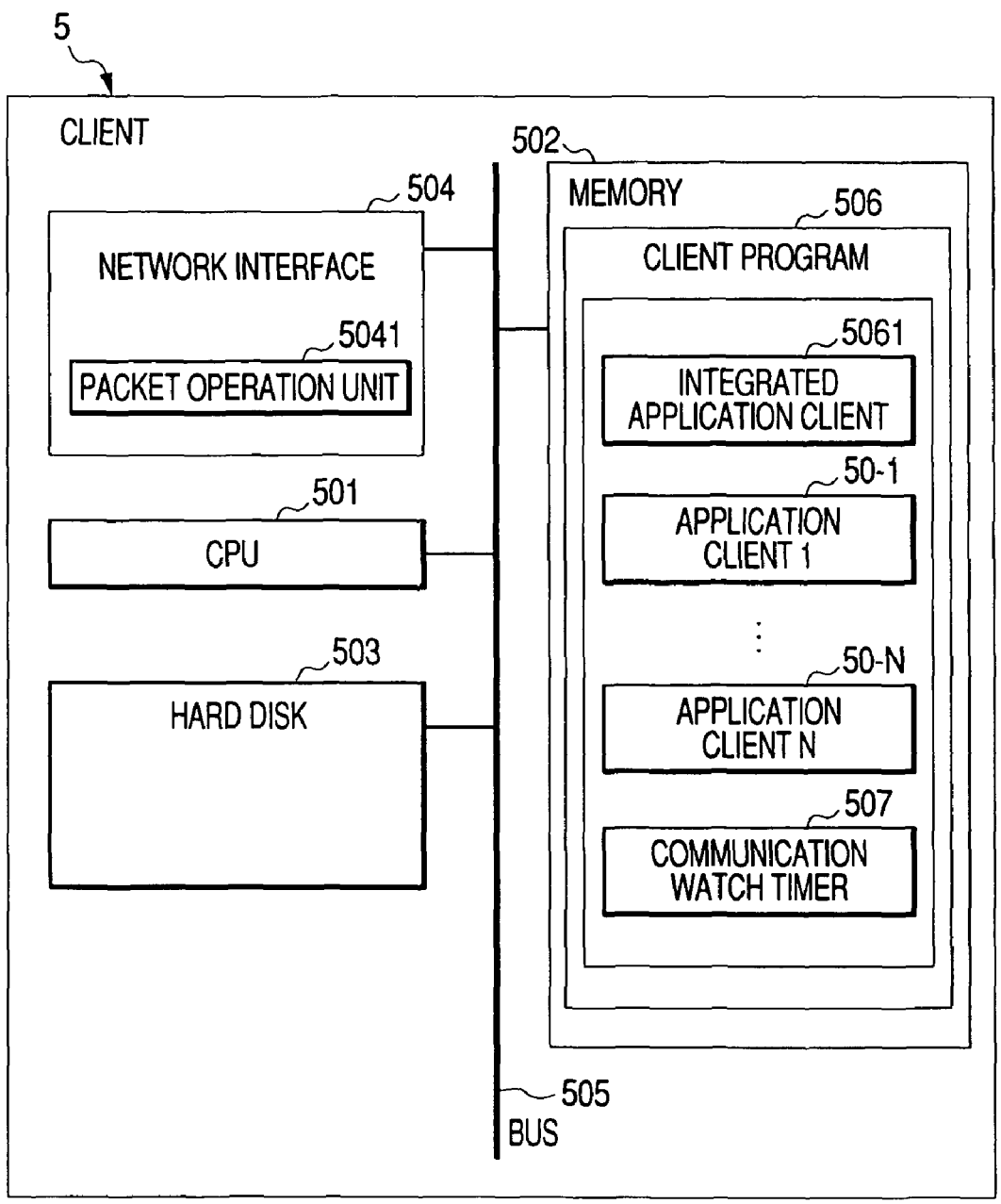
FIG. 7 is a block diagram of a client.

FIG. 7 shows a detailed block diagram of one of the clients 5-1 to 5-M for receiving services from the application servers 3-1 to 3-N under the control of the integrated application management apparatus 10. The clients 5-1 to 5-M are all the same in configuration, so that the client 5 will be used as a generic name of those clients 5-1 to 5-M as shown in FIG. 7 and FIG. 7 shows the internal configuration of the client 5. In the description to be made hereinafter, the client 5 (generic name) will be used for describing all the clients generally as shown in FIG. 7 and the clients 5-1 to 5-M will be used for describing each of those clients independently.

The client 5 includes a CPU 501, a memory 502, a hard disk 503, and a network interface 504 connected to a bus 505 respectively and the client 5 communicates with the network 20 through a packet operation unit 5041 provided in the network interface 504.

The memory 502 stores the integrated application clients 51-1 to 51-M (the integrated application client 51, hereinafter) loaded and used to communicate with the integrated application management system 1 through an external network 4 using an integrated application control protocol.

The integrated application client 51 starts up selected one of the application clients 50-1 to 50-N installed in the client 5 according to a permission, request or command from the integrated application management apparatus 10. Each of the application clients 50-1 to 50-N may be loaded into the memory from the hard disk 503 according to a command from the integrated application client 51 or resident in the memory 502.

Each of those application clients 50-1 to 50-N is started up or ended under the control of the integrated application client 51. The memory 502 includes a communication watch timer 507 used to watch such communication errors as timeout.

<Overall System Operation>

Next, a description will be made for how the integrated system operates to enable a plurality of applications to cooperate with each another with reference to the timing charts to be shown below.

{1-1. Logging in and Starting Up a Single Application}

At first, a description will be made for a control sequence in which the client 5 logs in the integrated system and starts up an application with reference to the timing chart shown in FIG. 8.

At first, in S1, the client 5 requests its log-in to the authentication apparatus 12 provided in the integrated application management system 1. Concretely, the client 5 sends a log-in request packet PF1 shown in FIG. 7 to the authentication apparatus 12. This log-in request packet PF1 includes the following items written after its IP header; packet type that is information denoting a log-in request, integrated system session ID, user name for using the client 5, and password.

Receiving the log-in request packet PF1, the authentication apparatus 12 requests the user information management apparatus 13 for comparison of the user authentication information in S2. Actually, this request is sent as a packet PF2 shown in FIG. 7 to the user information management apparatus 13.

This request packet PF2 includes the following items written after its IP header; packet type that is information (identifier) denoting comparison of the authentication information, integrated system session ID, and both name and password of the user for using the client 5.

Receiving this request packet PF2, the user information management apparatus 13 determines whether or not the user information is valid by searching the information in the user information database 135, then generates a comparison result and send it to the authentication apparatus 12 in S3. Concretely, the comparison result is set as a packet PF3 shown in FIG. 7 to the authentication apparatus 12. This packet PF3 includes the following items written after its IP header; packet type that is information (identifier) denoting completion of the authentication information comparison, integrated system session ID, both name and password of the user who uses the client 5, and response code denoting the comparison result. The response code is an identifier denoting success or failure of the user's log-in.

After that, in S4, if the authentication information comparison result is OK, the authentication apparatus 12 requests the integrated application management apparatus 10 for a list of currently available application servers of those 3-1 to 3-N. This request is sent as a packet PF27. This packet PF27 includes the following items written after its IP header; packet type that is information (identifier) denoting an application information request and completion of authentication information comparison, and integrated system session ID.

Receiving this packet PF27, the integrated application management apparatus 10 refers to the application information database 105 to generate a list of available application servers of those 3-1 to 3-N and sends the list to the authentication apparatus 12.

This response is sent as an application information packet PF28. This packet PF28 includes the following items written after its IP header; packet type that is information (identifier) denoting application information, integrated system session ID, and generated list of application servers, and response code added to the application server list. This response code is an identifier denoting whether the list of application servers is obtained successfully or resulted in an error.

Receiving the packet PF28, the authentication apparatus 12 notifies the client 5 of the completion of the log-in when the log-in is completed. The packet PF5 also includes a list of available application servers. The packet PF5 includes the following items written after its IP header; packet type that is information (identifier) denoting log-in completion, integrated system session ID, generated list of available application servers, and response code added to the list.

Receiving the packet PF5, the client 5 requests a predetermined application server selected by the client 5 from the list of application servers for starting a session to receive a desired service.

{1-2. Logging in and Starting Up a Single Application}

Figure 8:
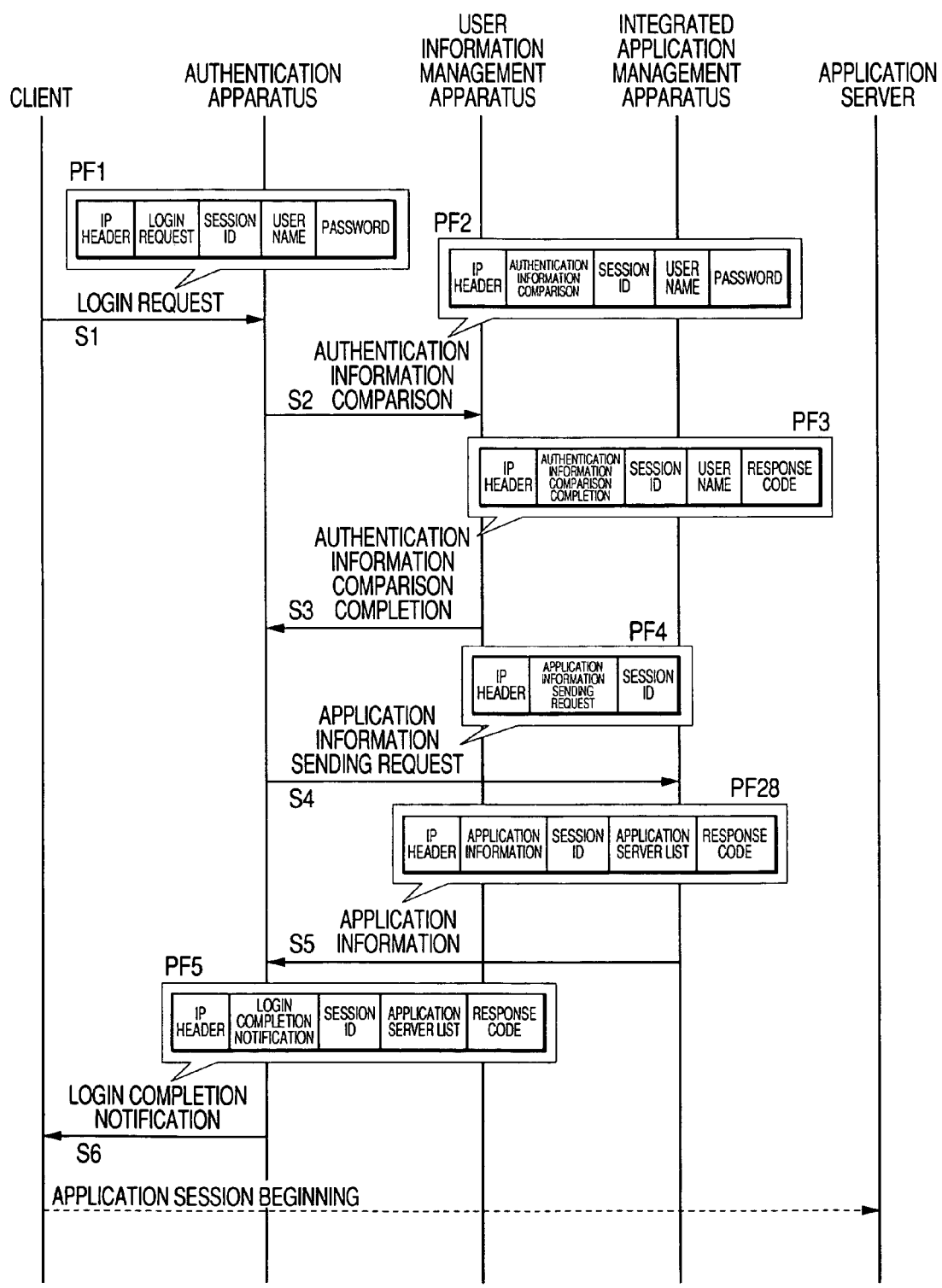
FIG. 8 is a time chart of processings between client log-in and independent startup of an application server.
Figure 9:
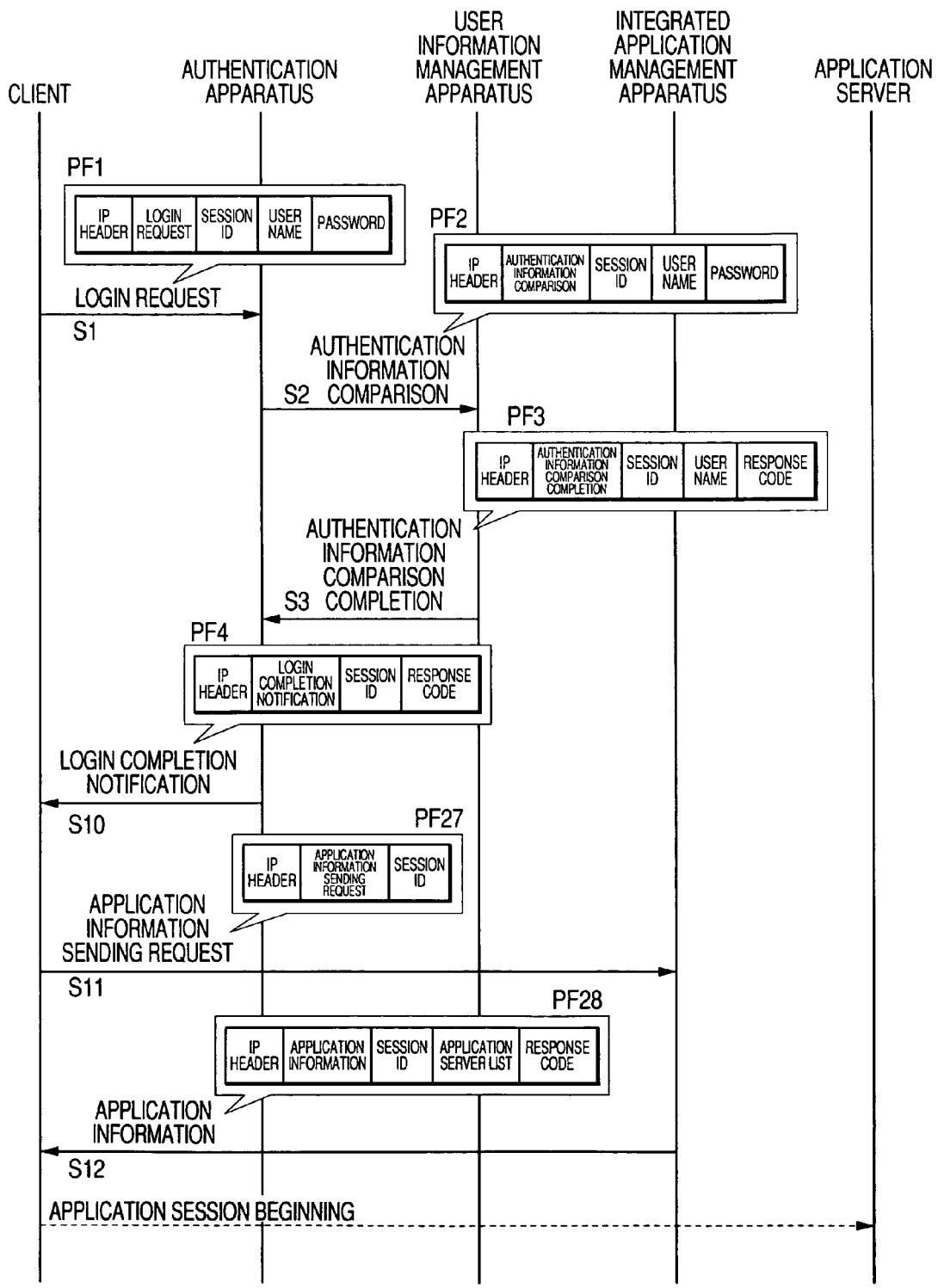
FIG. 9 is another time chart of processings between client log-in and independent startup of the application server.

The client 5 may also request the list of available application servers of those 3-1 to 3-N instead of the authentication apparatus 12 as shown in FIG. 9 without using the control sequence shown in FIG. 8.

S1 to S3 shown in FIG. 9 are the same as S1 to S3 shown in FIG. 8. And, authentication is done in both of the authentication apparatus 12 and the user information management apparatus 13 as described above. Then, the authentication apparatus 12 notifies the client 5 of the log-in completion in S10. This notification of log-in completion is sent as a packet PF4 shown in FIG. 9. The packet PF4 includes the following items written after its IP header; packet type that is information (identifier) denoting log-in completion, integrated system session ID, and response code added to the list as described above.

After that, the client 5 that has received the log-in completion notification in S11 sends an application information sending request packet PF27 similarly to that shown in FIG. 8 to the integrated application management apparatus 10.

The integrated application management apparatus 10, when receiving the packet PF27 in S12, refers to the application information database 105 to generate a list of available application servers of those 3-1 to 3-N and sends the list as an application information database packet PF28 to the client 5 similarly to that shown in FIG. 8.

Receiving the packet PF28, the client 5 extracts the list of available application servers and requests a predetermined application server selected by the client 5 for session starting, thereby the client 5 can receive a desired service independently.

As shown in FIG. 8, after completing comparison of the authentication information, the authentication apparatus 12 may request the integrated application management apparatus 10 for application information or the client 5 may send the packet PF27 to the integrated application management apparatus 10. The packet PF27 includes an authentication information comparison completion result received from the authentication apparatus 12. The integrated application management apparatus 10, if the packet PF27 includes a packet type that is information (identifier) denoting an application information request and completion of authentication information comparison, puts confidence in this information and sends the list of available application servers to the object.

{1-3. Starting an Integrated Session}

Next, a description will be made for how to start an integrated system (integrated session, hereinafter) for enabling information to be exchanged among a plurality of clients 5 using a plurality of applications that are cooperating with each another with reference to the timing chart shown in FIG. 10.

The following example shows a procedure of the processings between requesting invitation (starting) to an integrated session and starting of the integrated session between the application servers 3-1 to 3-N and the client 5.

At first, the client 5-1 sends an integrated session inviting request to the integrated application management apparatus 10 in S21.

This inviting request is sent as a packet PF6 shown in FIG. 25. This packet PF6 includes the following items written after its IP header; packet type that is information (identifier) denoting the integrated session inviting request, integrated system session ID, list of participants (users) to be invited by the request, list of available application clients of those 50-1 to 50-N to be used, and list of types of application clients 50-1 to 50-N. The integrated system session ID is generated so as to be unique in the system.

In prior to the invitation to the integrated session, the user of the client 5-1 is required to specify the participants and the application clients to be used. When requesting the invitation, the integrated application client 51-1 generates a list of the participants and a list of application clients to be used and sends the lists to the integrated application management apparatus 10 as a packet PF6.

Receiving the packet PF6, the integrated application management apparatus 10 requests the authentication apparatus 12 for notification of whether or not the user of the client 5-1 is authenticated using a packet PF7 in S22. The authentication apparatus 12, which has authenticated the user as shown in FIG. 8 or 9, refers to the authentication database 123 to determine whether or not the comparison result is OK. The apparatus 12 then notifies the integrated application management apparatus 10 of the result using a packet PF8 (S23).

Receiving the notification of the result (packet PF8), the integrated application management apparatus 10 requests the user information management apparatus 13 for notification of the user information of the client 5-1 using a packet PF9 shown in FIG. 25 if the user is already authenticated (S24).

This packet PF9 includes the following items written after its IP header; packet type that is information (identifier) denoting the user information sending request, integrated system session ID, list of user names to be invited by the request and described in the list of participants in the client 5-1, and list of identifiers of the applications to be used, specified by the client 5-1. The list of identifiers of applications corresponds to that retained in the application information database 105 shown in FIG. 2.

The user information management apparatus 13 obtains each available application and each application server account for each user name to participate in the integrated session from the received packet PF9 in response to the user information request from the integrated application management apparatus 10. The user information management apparatus 13 then compares the list of the identifiers of the applications to be used, extracted from the packet PF9, with the available applications. After that, the user information management apparatus 13 generates a response code denoting whether or not each application of each user can be used, then sends the user information to the integrated application management apparatus 10 as a packet PF10 shown in FIG. 25. This packet PF10 includes the following items written after its IP header; packet type that is information (identifier) denoting the user information, integrated system session ID, list of user names who can participate in the integrated session, list of identifiers of the applications to be used and specified by the client 5-1, and list of accounts of the application servers 3-1 to 3-N with respect to the applications, and response code for each application of each user as described above.

If no error occurs in the response code of the packet PF10, the integrated application management apparatus 10 generates an application session ID used between each participant (client 5) and each of the application servers 3-1 to 3-N to start the integrated session, then requests the session information management apparatus 11 for registration of the session information using the integrated session ID included in the integrated session inviting request (S21) in S26.

A packet PF11 shown in FIG. 25 is used to send this request for registration. The packet PF11 includes the following items written after its IP header; packet type that is information (identifier) denoting the request of registering session information, integrated system session ID specified by a client, list of user names who participate in the integrated session, list of session IDs of the applications to be used, and application type information.

The session information management apparatus 11 records the integrated session requesting user name (user ID), the starting time, and the integrated session ID, as well as the list of session IDs of the applications to be used and the list of participants for each application type in the session information database 118 shown in FIG. 5. When completing the recording, the session information management apparatus 11 notifies the integrated application management apparatus 10 of the completion of the session information registration as a packet PF12 shown in FIG. 25 (S27).

Receiving the packet PF12, the integrated application management apparatus 10 sends a session inviting request to each of the application servers 3-1 to 3-N corresponding to the application to be used (S28-1 to 28-N).

A packet PF13 shown in FIG. 25 is used to send this session inviting request. The packet PF13 includes the following items written after its IP header; packet type that is information (identifier) denoting the session inviting request, integrated system session ID, application session ID, and list of the user names who participate in the integrated session.

Receiving this session inviting request, each of the application servers 3-1 to 3-N notifies each participating client of the session inviting and each client 5 replies its participation.

For example, if the application servers 3-1 and 3-N makes invitation to a session, the application server 3-1 notifies the client 5-1 of the invitation to the session (S29-1). The client 5-1 then replies its participation to the application server 3-1 to establish an application session with the server 3-1 (S30-1).

Similarly, the client server 3-1 notifies the client 5-M of the invitation to the session (S29-M). The client 5-M then replies its participation to the client 5-M and establishes the application session with the server 3-1 (S30-M).

The application server 3-1, when the session is established for all the participants, notifies the integrated application management apparatus 10 of the completion of the application 1 session invitation (S31). A packet PF14 shown in FIG. 25 is used to make this notification. The packet PF14 includes the following items written after its IP header; packet type that is information (identifier) denoting completion of the session invitation, integrated system session ID, application session ID, and response code denoting whether or not the session is established. This response code includes error information if any client 5 rejects the invitation to the session.

Just like the steps S29-1 to S31, the application server 3-N also notifies each of the clients 5-1 to 5-M of the invitation to the session (S32-1 to M) and receives responses from the participants (S33-1 to M).

The application server 3-N, when the session is established for all the participants, notifies the integrated application management apparatus 10 of the completion of the application N session invitation (S35).

When the invitation to the session with all the participating clients 5-1 to 5-M is completed in all of the application servers 3-1 to 3-N used in the integrated session, the application server 3-N notifies each of the clients 5-1 to 5-M of the completion of the session invitation (S36-1 to 36-M). Packets PF15 and PF16 shown in FIG. 26 are used to make this notification. The packet PF15 is used only to notify the completion of the invitation to the integrated session and the packet PF16 includes a list of participants, and both session ID and application type of each application.

In the above sequence, invitation to an integrated session is made, then the integrated session is started by the participants and the applications requested by the client 5-1, thereby information comes to be exchanged among a plurality of users in real time using a plurality of applications that are cooperating with each another.

{1-4. Exiting an Integrated Session}

Next, a description will be made for how one of the clients 5 exits an integrated session with reference to the time chart shown in FIG. 11. In this example, the client 5-M is assumed to exit the integrated session.

The client 5-M requests the integrated application management apparatus 10 for its exiting the integrated session using a packet PF17 shown in FIG. 26 (S40). This packet PF17 includes the following items written after its IP header; packet type that is information (identifier) denoting the request of exiting the integrated session, integrated system session ID, and user name.

Receiving the packet PF17, the integrated application management apparatus 10 notifies the client 5-M of the accepted exit (S41). A packet PF18 shown in FIG. 26 is used to make this notification. The packet PF18 includes the following items written after its IP header; packet type that is information (identifier) denoting the accepted exit, integrated system session ID, and response code.

After that, the integrated application management apparatus 10 notifies the application servers 3-1 to 3-N used in the current integrated session of the client 5-M user's request of exiting the application session (S42-1 to N).

A packet PF19 shown in FIG. 26 is used to make this notification. The packet PF19 includes the following items written after its IP header; packet type that is information (an identifier) denoting the request of exiting the integrated session, integrated system session ID, application session ID, and exit requesting user list.

According to this exit request, each of the application servers 3-1 to 3-N notifies its corresponding one of the clients 5-M described in the user list written in the packet PF19 and waits for a response from the client 5-M.

For example, the application server 3-1 notifies the client 5-M of exiting the application session (S43) while the client 5-M replies to the request, then exits the session with the application server 3-1 (S44).

Similarly, the application server 3-N notifies the client 5-M of exiting the application session (S45) while the client 5-M replies to the request to exit the session with the application server 3-1 (S46).

Each of the application servers 3-1 to 3-N, when the requested user exits the session, notifies the integrated application management apparatus 10 of the specified user's exiting each application session (S47-1 to S47-N). A packet PF20 shown in FIG. 26 is used to make this notification. The packet PF20 includes the following items written after its IP header; packet type that is information (identifier) denoting the completion of the exit, integrated system session ID, application session ID, list of users who exit the integrated session, and response code denoting the exit status.

Receiving the packet PF20 for notifying the completion of the exit from all the application servers 3-1 to 3-N used in the integrated session, the integrated application management apparatus 10 requests the session information management apparatus 11 for updating the session information (S48). A packet PF21 shown in FIG. 26 is used to make this request. The packet PF21 includes the following items written after its IP header; packet type that is information (identifier) denoting the request for updating the session information, integrated system session ID, operation type (addition or deletion), list of the participating users, list of application session IDs, and list of application types.

Receiving the packet PF21, the session information management apparatus 11 searches the user IDs described in the list of the users in the session information database 118 shown in FIG. 5, and then sets an ending time for them. After that, the session information management apparatus 11 searches the target application session ID from each user information to delete the target users from the list of the users.

When completing the requested updating of the session information database 118, the session information management apparatus 11 notifies the integrated application management apparatus 10 of the completion of the requested updating (S49). A packet PF22 shown in FIG. 26 is used to make this notification. The packet PF22 includes the following items written after its IP header; packet type that is information (an identifier) denoting the completion of the updating of the session information, list of application session IDs used in the integrated session, and list of application types, and response code denoting the updating result.

If a user exits the integrated session after the above processings, the session is ended in each of the application servers 3-1 to 3-N. After that, the information in the session information database 118 is updated according to a command from the integrated application management apparatus 10 and the end of the series of the integrated session is recorded together with the ending time in the session information database 118 with respect to the ID of the user who has exited.

{1-5. Exiting an Application Session}

Figure 12:
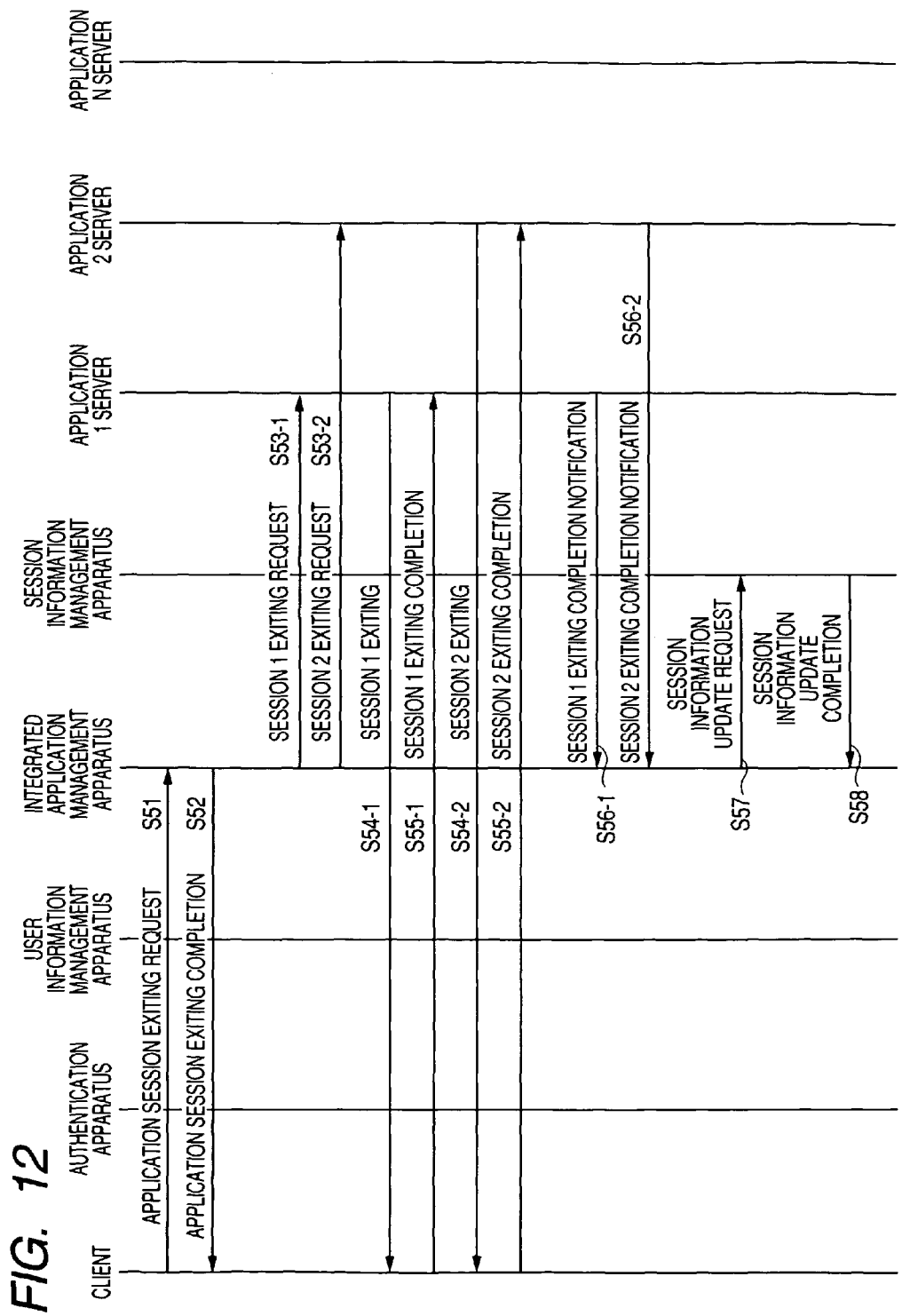
FIG. 12 is a time chart of how a client exits an application session.

After that, if a client 5 wants to stop the use of a specific application, the application is stopped in accordance with the time chart shown in FIG. 12. The processing is executed, for example, to unavoidably stop the use of a motion picture application in an integrated session of a TV conference due to an insufficient response speed of the network and/or heavy load of the client 5.

Figure 27:
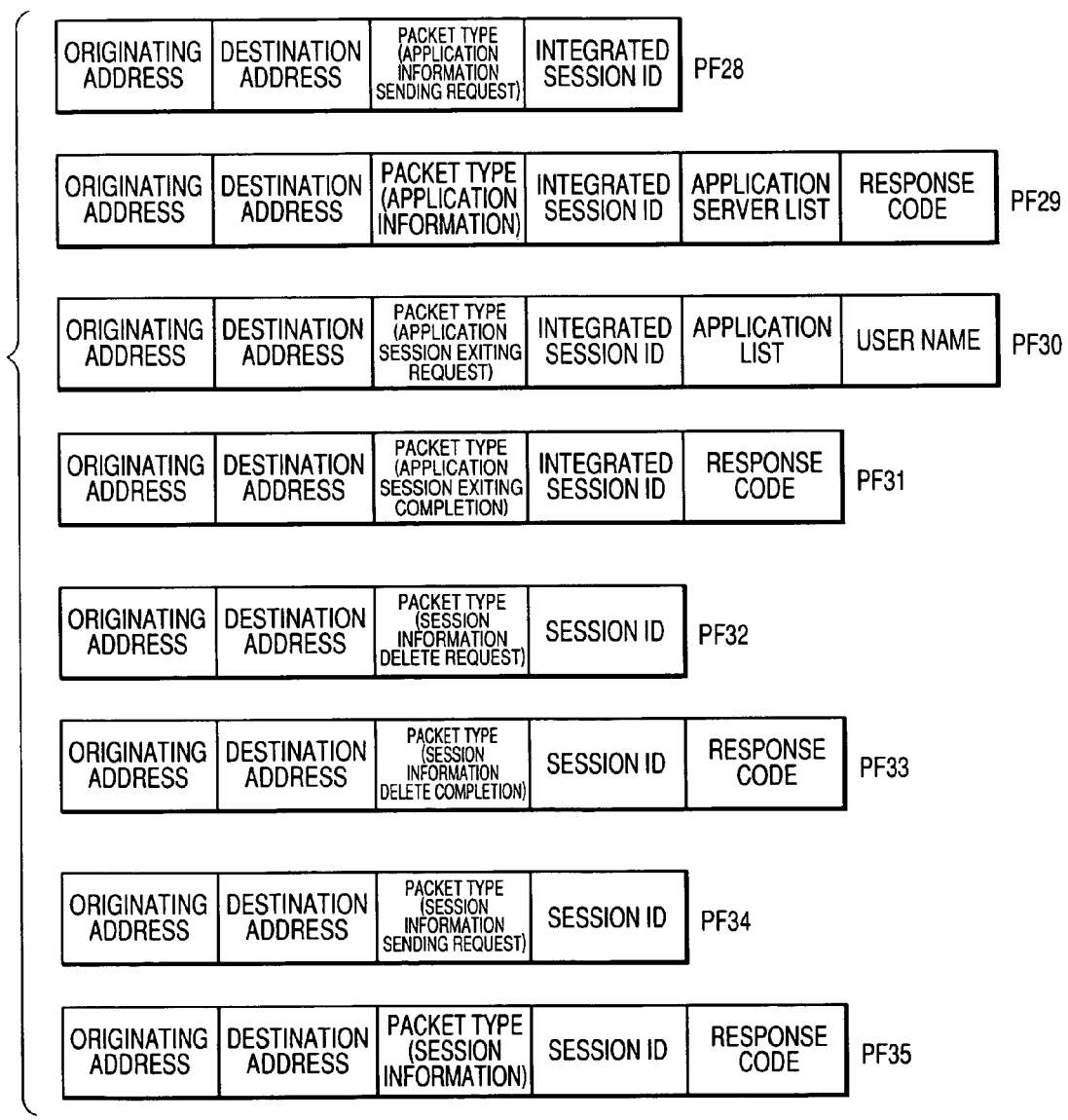
FIG. 27 describes still another example of a packet used for communication between an integrated application management system and a client.

In that connection, a client 5 requests the integrated application management apparatus 10 for its exiting the user specified application session using a packet PF30 shown in FIG. 27 (S51). This packet PF30 generated by an integrated application client 51 of the client 5 includes the following items written after its IP header; packet type that is information (identifier) denoting a request of its exiting the application session, integrated system session ID, list of applications the client 5 is to exit, and requesting user name. The integrated application client 51 controls the communication between the client 5 and the integrated application management system 1.

Receiving the exit request, the integrated application management apparatus 10 notifies the client 5 of the acceptance of the exit (S52). A packet PF31 shown in FIG. 27 is used to make this notification. The packet PF31 includes the following items written after its IP header; packet type that is information (identifier) denoting the accepted exit, integrated system session ID, and response code.

After that, the integrated application management apparatus 10 refers to the application policy database 106 to check the cooperative relationship between the application specified in the S51 and each of other applications. If other application sessions are required to be ended when the user specified application session is ended (applications 1 and 2 shown in FIG. 2C), those other applications are also requested to exit.

In this example, the user of the client 5 specifies the exit of the application 1.

The integrated application management apparatus 10 notifies the application servers 3-1 and 3-2 that supply services of the applications 1 and 2 of the request from the user of the client 5 to exit the application session (S53-1 and S53-2).

A packet PF30 shown in FIG. 27 is used to make this notification. When receiving the exit request, each of the application servers 3-1 to 3-N notifies the client 5 of the user described in the user list in the packet PF30 of exiting the application session and waits for a response from the client 5.

For example, the application server 3-1 notifies the client 5 of exiting the application session (S54-1) and the client 5 replies exiting the session with the application server 3-1 (S55-1).

Similarly, the application server 3-2 requests the client 5 to exit the application session (S54-2) and the client 5 replies its exiting the session with the application server 3-2 (S55-2).

Each of the application servers 3-1 to 3-N, when the requested user exits the session, notifies the integrated application management apparatus 10 of the completion of the specified user's exiting each application session (S56-1 to S56-2). A packet PF20 is used to make this notification. The packet PF20 includes the following items written after its IP header as described above; application session ID and list of users who exit the session.

Receiving the packet PF20 notifying the completion of exiting all the application servers 3-1 to 3-N corresponding to the specified application session, the integrated application management apparatus 10 requests the session information management apparatus 11 for updating the session information (S57). A packet PF21 shown in FIG. 26 is used to send this request.

Receiving the packet PF21, the session information management apparatus 11 searches each user ID corresponding to that in the user list in the session information database 118 shown in FIG. 5 to erase the application session ID and deletes the requesting user from the list of users corresponding to the application session ID.

The session information management apparatus 11, when completing the updating of the session information database 118, notifies the integrated application management apparatus 10 of the completion of the updating (S58). A packet PF22 shown in FIG. 26 is used to make this notification.

If any user exits the specified application session (to stop the use of the application) after the above processings, the session is ended in each of the application servers 3-1 to 3-N. After that, the session information database 118 is updated according to the command from the integrated application management apparatus 10, so that the application session ID is erased from the session information database 118 corresponding to the exited user's ID. And, the user who has requested the stop of the application session is erased from the user list corresponding to another user's application session ID.

The integrated application management apparatus 10 keeps watching the cooperative relationship among applications. If an exit request is issued to one of the applications, the other application must also exit, application sessions cooperative with those applications can also be ended according to the setting in the application policy database 106. It is thus prevented that unnecessary sessions are kept between the client 5 and each of the application servers 3-1 to 3-N.

{1-6. Ending an Integrated Session}

Figure 13:
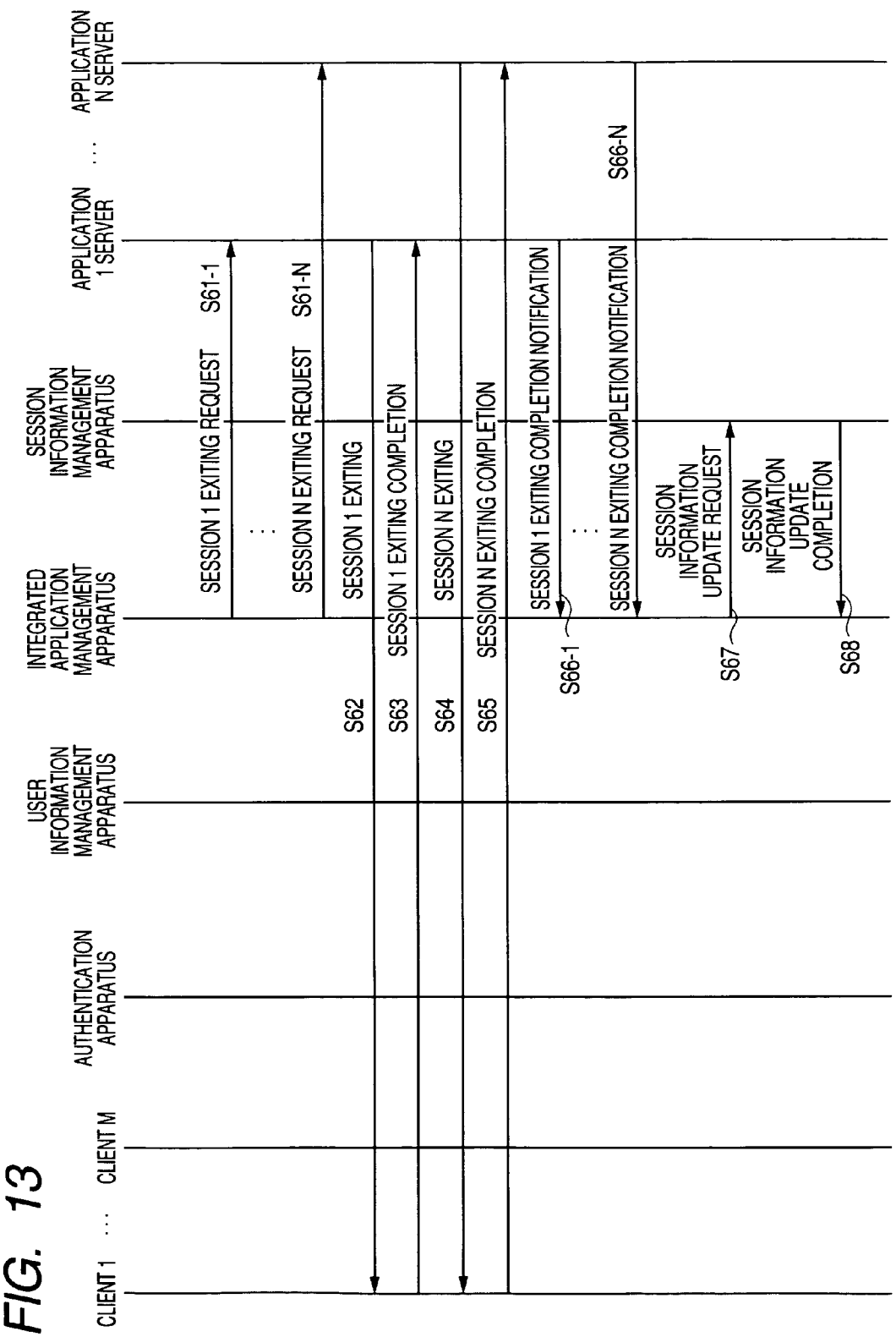
FIG. 13 is a time chart of how an integrated session is ended.

If an integrated session is to be stopped, for example, when only one user is left over in a session, the integrated application management apparatus 10 ends the integrated session. Hereinafter, such ending of an integrated session will be described with reference to the time chart shown in FIG. 13.

If a predetermined condition for ending an integrated session is satisfied, for example, when only one user is left over in an integrated session, the integrated application management apparatus 10 ends the session. All the application sessions in the integrated session are thus closed.

Therefore, the integrated application management apparatus 10 obtains both subject user ID and application session ID from the session information database 118 provided in the session information management apparatus 11, then starts a processing.

At first, the client 5-1 that becomes the last user notifies the application servers 3-1 to 3-N used in the integrated session of a request for exiting the application session (S61-1 to 61-N).

A packet PF30 shown in FIG. 27 is used to make this notification. Each of the application servers 3-1 to 3-N notifies each user client 5 described in the list of users in the packet PF30 of its exiting the session, then waits for a response therefrom.

For example, the application server 3-1 notifies the client 5-1 of its exiting the application session (S62) and the client 5-1 replies exiting the session with the application server 3-1 (S63).

Similarly, the application server 3-N notifies the client 5-1 of its exiting the application session (S64) and the client 5 replies to exit the session with the application server 3-N (S65).

Each of the application servers 3-1 to 3-N, when the last user exits the session, notifies the integrated application management apparatus 10 of the completion of the specified user's exiting each application session (S66-1 to S66-N). A packet PF20 shown in FIG. 26 is used to make this notification. The packet PF20 includes the following items written after its IP header; application session ID and list of users who exit the session.

Receiving the notification of the completion of exiting from all the application servers 3-1 to 3-N used in the integrated session to be ended, the integrated application management apparatus 10 requests the session information management apparatus 11 for updating the session information (S67). A packet PF21 shown in FIG. 26 is used to make this request.

Receiving this packet PF21, the session information management apparatus 11 searches each subject user ID corresponding to that in the list of users in the session information database 118 shown in FIG. 5, then sets an ending time for the subject user ID to record the end of the integrated session.

Completing the updating of the session information database 118, the session information management apparatus 11 notifies the integrated application management apparatus 10 of the completion of the updating (S58). A packet PF22 shown in FIG. 26 is used to make this notification.

If an integrated session is required to be ended, for example, because only one user is left over in a session, the integrated application management apparatus 10 ends all the application sessions corresponding to the integrated session ID, records the end of the integrated session in the last user's session information, and ends the integrated session.

{1-7. Error that Occurs when an Integrated Session Starts (in an Indispensable Application of a Client)}

Next, a description will be made for an error that occurs in an indispensable application of a client used in an integrated session when the integrated session is started, with reference to the time chart shown in FIG. 14.

Figure 10:
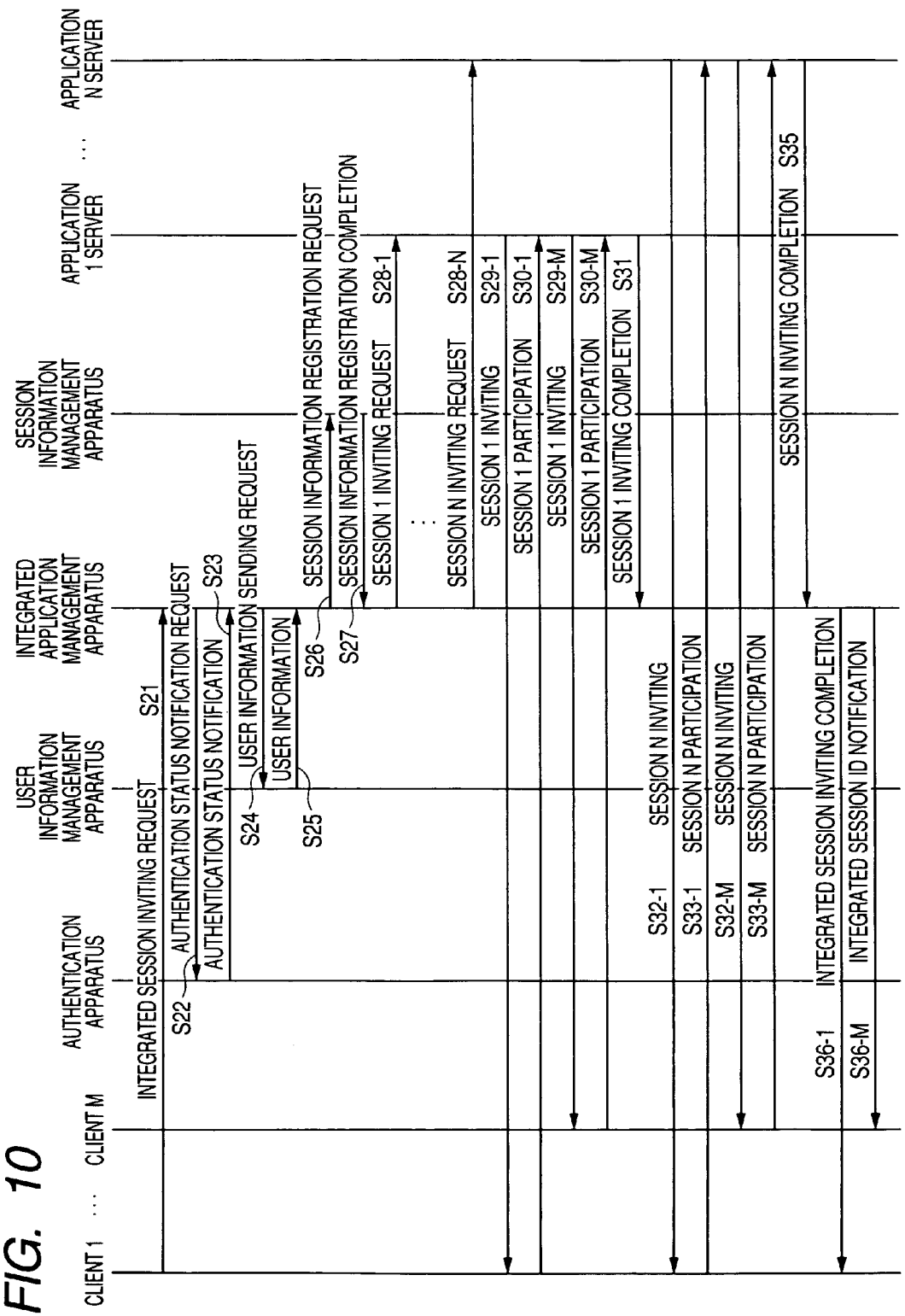
FIG. 10 is a time chart of starting up an integrated session.

As shown in FIG. 10, after an integrated session is started in S21 to S27, the integrated application management apparatus 10 issues a session inviting request to each of the application servers 3-1 to 3-N corresponding to the application used in the integrated session as shown in S71 to S71-N. This request is issued just like that in S28-1 to S28-N in FIG. 10.

Receiving the session inviting request, each of the application servers 3-1 to 3-N notifies its corresponding one of the participating clients 5-1 to 5-M of the session invitation, then each client replies the participation, and then establishes an application session with its corresponding server.

For example, if application servers 3-1 to 3-N that supply indispensable applications makes the invitation to the session, the application server 3-1 notifies the client 5-1 of the invitation first (S72-1). The client 5-1 then replies its participation to the server 3-1, then establishes the application session with the server 3-1 (S73-1).

Similarly, the application server 3-1 sends the invitation to the session to the client 5-M (S72-M). The client 5-M then replies its participation to the server 3-1, then establishes an application session with the server 3-1 (S73-M).

When the application session is established for all the participants, the application server 3-1 notifies the integrated application management apparatus 10 of the completion of the invitation to the application 1 session (S74). A packet PF14 shown in FIG. 25 is used to make that notification similarly to that in S31 shown in FIG. 10.

After that, the application server 3-N sends the invitation to the session to the client 5-1 (S75-1). The client 5-1 then replies its participation, then establishes an application session with the server 3-N (S76-1).

Similarly, the application server 3-N sends the session invitation to the client 5-M (S75-M). The client 5-M replies its nonparticipation or the application client 50-N thereof goes into a timeout error (S76-M). The nonparticipation from the client 5-M is processed by the integrated application client 51-M that watches client applications, then notified to the integrated application management apparatus 10.

The application server 3-N, when detecting such nonparticipation or timeout error in the client 5-M, notifies the integrated application management apparatus 10 of the error (S77). A packet PF23 shown in FIG. 25 is used to make this notification. The packet PF23 includes the following items written after its IP header; packet type that is information (identifier) denoting the session invitation error, integrated system session ID, application session ID, error type denoting the client 5 or application server in which the error occurs, list of users of the error occurred client 5, and application type. And, because the application type in the packet PF23 is indispensable, each client 5 comes to know its inability to start the integrated session. The user list may set a plurality of users.

At that time, the integrated application management apparatus 10 refers to the application information database 105 according to the type of the error-detected application server 3-N to determine whether or not the subject application is indispensable.

If it is determined as an indispensable application, the error-detected client 5-M cannot participate in the integrated session. Therefore, the integrated application management apparatus 10 requests the application server 3-1 that already establishes its application session to make the client 5-M exit from the integrated session compulsorily (S78).

A packet PF24 shown in FIG. 26 is used to make this request. The packet PF24 includes the following items written after its IP header; packet type that is information (identifier) denoting the compulsory exit from the integrated session, integrated system session ID, application session ID, error detected user list, and application type.

Receiving the compulsory exit request, the application server 3-1 sends the request to the client 5-M of the user included in the user list written in the packet PF24. A packet that is similar to the packet PF17 shown in FIG. 26 is used for this processing.

Receiving the compulsory exit request, the integrated application client 51-M of the client 5-M sends its acceptance of the compulsory exit to the application server 3-1. The application server 3-1 then ends the application session with the client 5-M.

After that, the application server 3-1 notifies the integrated application management apparatus 10 of the completion of the compulsory exit of the client 5-M (S81). A packet PF25 shown in FIG. 26 is used to make this notification. The packet PF25 includes the following items written after its IP header; packet type that is information (identifier) denoting the completion of the compulsory exit, integrated system session ID, compulsorily exiting application session ID, error detected user list, and response code.

Receiving the notification of the completion of the compulsory exit, the integrated application management apparatus 10 notifies each client 5 of the error occurrence in the integrated session invitation (S82). A packet PF26 shown in FIG. 26 is used to make this notification. The packet PF26 includes the following items written after its IP header; packet type that is information (identifier) denoting the error occurrence in the integrated session invitation, integrated system session ID, error type for identifying the error detected object (client 5 or application server), error detected user list, and response code.

Figure 11:
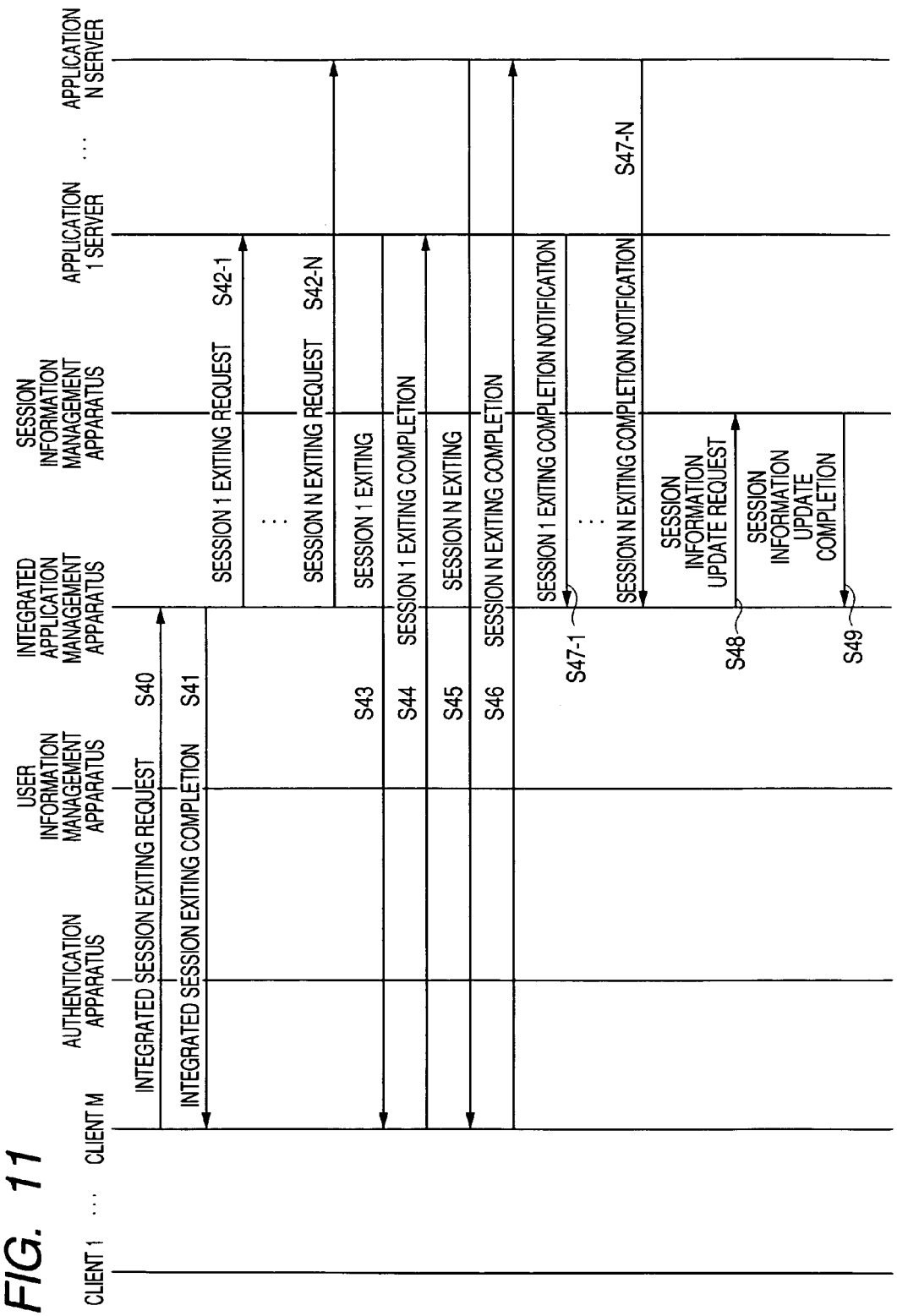
FIG. 11 is a time chart of how a client exits an integrated session.

After that, the integrated application management apparatus 10 instructs the session information management apparatus 11 to record the start of the integrated session participated by all the request source users except for the user of the client 5-M in the session information database 118 similarly to those in S48 and S49 shown in FIG. 11 (S83). On the other hand, the session information management apparatus 11, when completing the updating of the session information database 118, notifies the integrated application management apparatus 10 of the completion of the updating of the session information.

If an error occurs in such an indispensable application in the client 5 as described above, the application session established by the error detected client 5 is ended compulsorily and the error detected user list is notified to other users who are participating in the integrated session, thereby the integrated session is started among the clients 5 that have established successfully the application session of the indispensable application.

{1-8. Error to Occur (in a Server Side Indispensable Application) When an Integrated Session is Started}

Next, a description will be made for error occurrence in an application indispensable for an integrated session in an application server when the integrated session is started, with reference to the time chart shown in FIG. 15.

Figure 15:
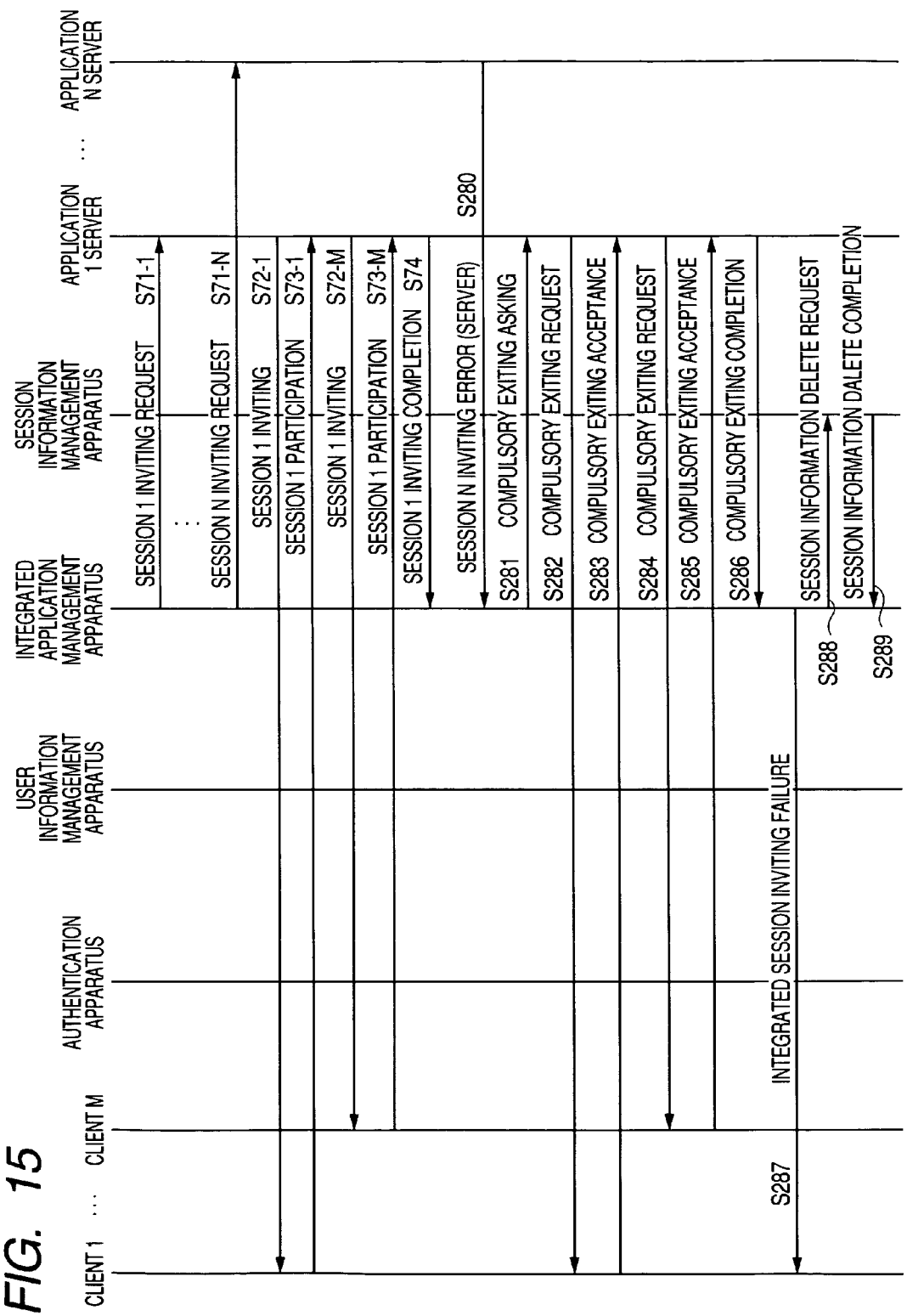
FIG. 15 is a time chart of how to process an indispensable application related error occurred in an application server.

As shown in FIG. 10, after an integrated session is started in S21 to S27, the integrated application management apparatus 10 issues a session inviting request to each of the application servers 3-1 to 3-N corresponding to the application used in the integrated session as shown in S71 to S71-N in FIG. 15. This request is made just like each of those in S28-1 to S28-N shown in FIG. 10.

Receiving the session inviting request, the application servers 3-1 to 3-N notify the participant clients 5-1 to 5-M of the session invitation respectively, then each of the clients replies its participation and establishes the application session.

In that example, it is assumed that the application servers 3-1 and 3-N supply indispensable applications and an error is detected in the application server 3-N.

Figure 14:
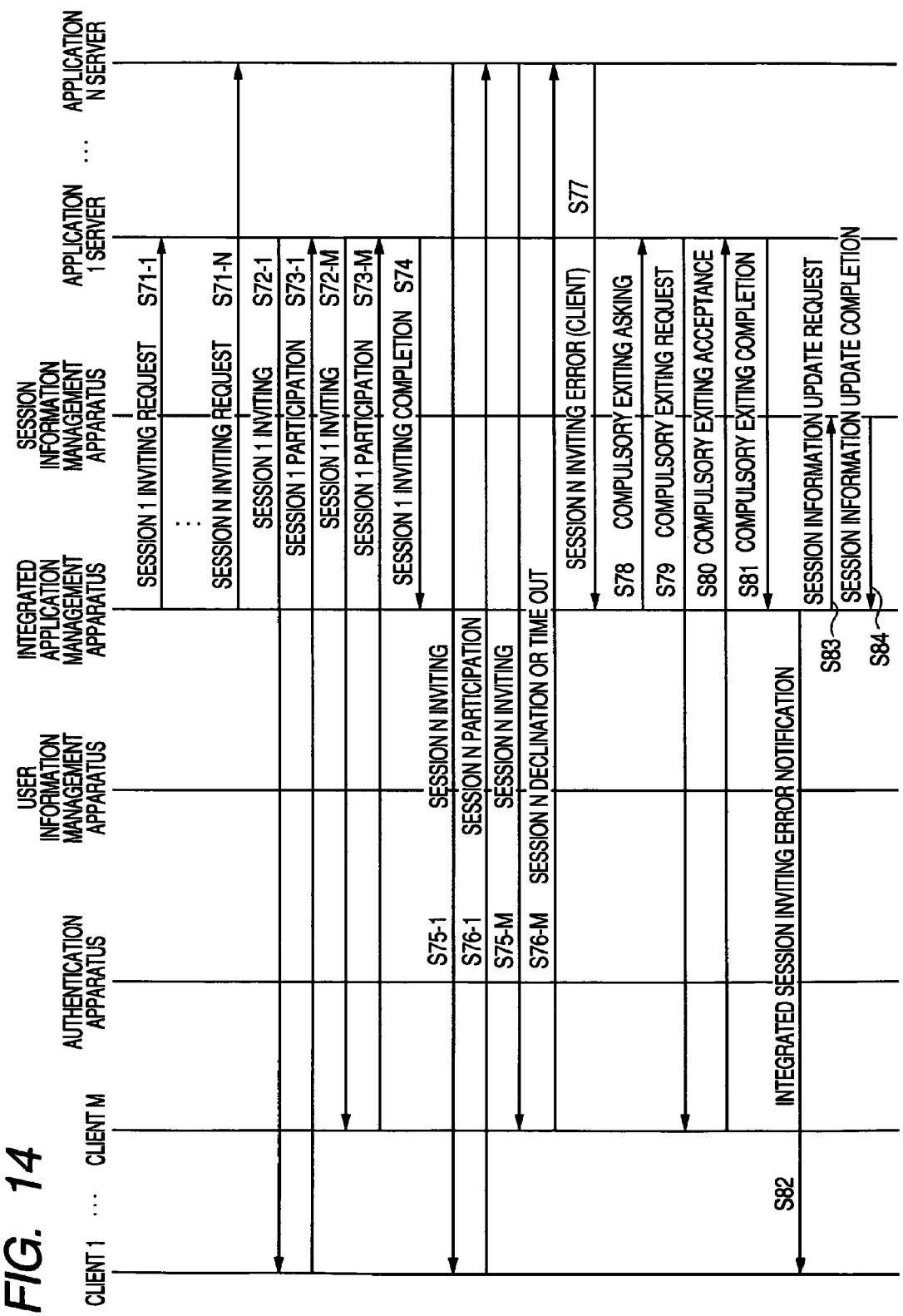
FIG. 14 is a time chart of how to process an indispensable application related error occurred in a client.

At first, the application server 3-1 establishes an application session with the clients 5-1 to 5-M similarly to each of those in S72-1 to S72-M shown in FIGS. 14, S73-1 to S73-M, and S74, then notifies the integrated application management apparatus 10 of the completion of the invitation to the application 1 session.

After that, an error occurs in the application server 3-N that supplies an indispensable application, so that the server 3-N sends the error in response to the request for invitation to the session received from the integrated application management apparatus 10 (S280). This processing is also executed when the response (notification of the completion of the invitation) to the request for session invitation from the integrated application management apparatus 10 goes into a timeout error instead of the error notification.

At that time, the integrated application management apparatus 10 refers to the application information database 105 to determine whether or not the subject application is indispensable according to the type of the error detected application server 3-N.

If the application is indispensable, the integrated session cannot be started in the client 5. The integrated application management apparatus 10 therefore instructs the application server 3-1 that already establishes the application session with the client 5 to exit the integrated session compulsorily (S281). A packet PF24 shown in FIG. 26 is used to make this request.

The application server 3-1 requests each of the client servers 5-1 to 5-M that will participate in the integrated session to exit the session compulsorily according to the user list set in the packet PF24 (S282 and S284).

Each client 5 accepts the compulsory exit according to the instruction from the application server 3-1 while the application server 3-1 exits the application session with each client 5 (S283 and S285).

The application server 3-1, when exiting the application session with all the users who participate in this integrated session, notifies the integrated application management apparatus 10 of the completion of the compulsory exit using a packet PF25 shown in FIG. 26 (S286).

Receiving the packet PF25, the integrated application management apparatus 10 notifies each client 5 of the failure of the invitation to the integrated session (S287). A packet PF27 shown in FIG. 26 is used to make this notification. The packet PF27 includes the following items written after its IP header;

packet type that is information (identifier) denoting the failure of the integrated session inviting and integrated system session ID.

Receiving this notification, each of the integrated application clients 51-1 to 51-M of the clients 5 that comes to know the failure of the integrated session start notifies its users of the failure.

After that, the integrated application management apparatus 10 instructs the session information management apparatus 11 to delete the record of the integrated session ID to invalidate the session information in the session information database 118 created in S26 and S27 in FIG. 10 (S288).

A packet PF32 shown in FIG. 7 is used to make this instruction. The packet PF32 includes the following items written after its IP header; packet type that is information (identifier) denoting the request for deleting the session information and integrated system session ID.

The session information management apparatus 11 deletes the integrated session ID, and then notifies the integrated application management apparatus 10 of the completion of the deletion (S289).

If an error occurs in an application server that supplies an indispensable application, the client 5 ends the established application session compulsorily, deletes the session information, and ends the integrated session.

{1-9. Optional Application Error Detected in a Client in a Started Integrated Session}

Next, a description will be made for an error detected in an optional application of a client 5 in an integrated session when the integrated session is started, with reference to the time chart shown in FIG. 16.

The processings in S71-1 to S71N, S72-1 to S72-M, and S74 performed at the start of an integrated session are the same as those shown in FIG. 10 and FIG. 14. In S71-1 to S71N, the integrated application management apparatus 10 sends a session inviting request to each of the application servers 3-1 to 3-N. In S72-1 to S72-M, the application server 3-1 establishes an application session with the clients 51-1 to 51-M respectively. And, in S74, the server 3-1 notifies the integrated application management apparatus 10 of the completion of the session inviting to the server.

After that, the application server 3-N that supplies an optional application notifies the client 5-1 of the inviting to the session (S75-1). The client 5-1 replies its participation and establishes an optional application session with the server 3-N (S76-1).

The application server 3-N notifies the client 5-M of the inviting to the session (S75-M). Then, the client 5-M replies its nonparticipation in response to the notification or the application client 50-N of the client 5-M goes into a timeout error (S90). The nonparticipation reply from the client 5-M is processed by the integrated application client 51-M that watches the client applications, then notified to the integrated application management system 1.

The application server 3-N that detects nonparticipation or timeout error notifies the integrated application management apparatus 10 of the error detected in the client 5-M (S91). A packet PF23 shown in FIG. 25 is used to make this notification.

At that time, the integrated application management apparatus 10 refers to the application information database 105 to determine whether or not the subject application is indispensable according to the type of the error detected application server 3-N.

Because the subject application is an optional one at that time, the client 5-M can participate in the integrated session except for that of the error detected optional application.

The integrated application management apparatus 10 then notifies each client 5 of the error occurrence in the inviting to the integrated session (S92). A packet PF26 shown in FIG. 26 is used to make this notification. The packet 26 includes the following items written after its IP header; packet type that is information (identifier) denoting the error occurrence in the inviting to the integrated session, integrated system session ID, error type for identifying which is the error source, client or application server, error detected user list, and application type. And, because the application type is an optional application, each client 5 comes to know its inability to use the optional application for information exchanges with the participants described in the error-detected user list.

After that, the integrated application management apparatus 10 requests the session information management apparatus 11 to record in the session information database 118 that an integrated session is started by requesting participants while only the user of the client 5-M does not use the optional application management apparatus 11, when updating of the session information database 118 is completed, notifies the integrated application management apparatus 10 of the completion of the session information updating (S83).

If an error occurs in an optional application in a client 5 as described above, only the subject client 5 starts an integrated session without establishing any application session with the optional application server 3-N. In that connection, however, the client 5 comes to notify other users of the error detected user list and starts an integrated session among all the users without using the optional application.

{1-10. Optional Application Error Detected in a Server at the Start of an Integrated Session}

Figure 17:
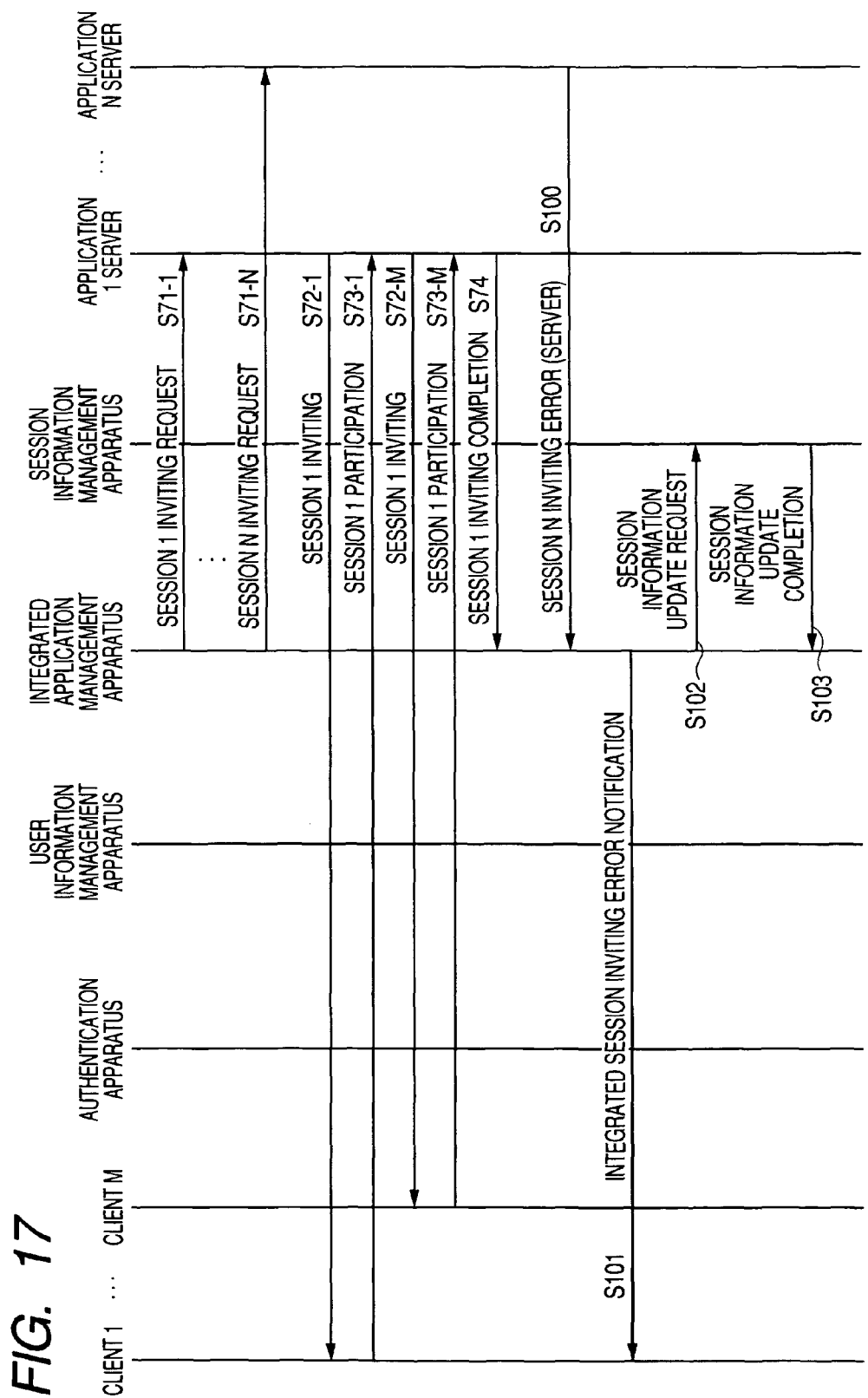
FIG. 17 is a time chart of how to process an optional application related error occurred in an application server.

Next, a description will be made for an error detected in an optional application of an application server in an integrated session at the start of the integrated session with reference to the time chart shown in FIG. 17. In that case, the application server 3-N is premised to be an optional application server.

When starting an integrated session, the integrated application management apparatus 10 sends a session inviting request to each of the application servers 3-1 to 3-N (S71-1 to 71-N) and the application server 3-1 establishes an application session with each of the clients 51-1 to 51-M (S72-1 to 72-M and S73-1 to 73-M). The processings are executed just like those shown in FIG. 10 and FIG. 15 until session inviting completion is notified to the integrated application management apparatus 10 (S74).

After that, the application server 3-N that supplies an indispensable application detects an error in itself and reports the error to the integrated application management apparatus 10 in response to the session inviting request therefrom (S100). This processing is also executed when the response to the session inviting request (S71-N) from the integrated application management apparatus 10 becomes a timeout error.

At that time, the integrated application management apparatus 10 refers to the application information database 105 to determine whether the subject application is indispensable or optional according to the type of the error detected application server 3-N.

If the subject application is optional, the integrated session can be started while no service of the application server 3-N can be used. The integrated application management apparatus 10 therefore notifies each client 5 of the error occurrence in the integrated session inviting (S101). This notification is made by a packet PF26 shown in FIG. 26. The packet PF26 includes the following items written after its IP header; packet type that is information (identifier) denoting the error occurrence in the integrated session inviting, integrated system session ID, error type for identifying the error detected side (client 5 or application server) (server side here), error detected user list, and application type. In the integrated application client 51 of each client 5, the application type is optional, so that it is detected here that any optional application that includes no application session can be used for information exchanges among participating users.

After that, the integrated application management apparatus 10 requests the session information management apparatus 11 to record in the session information database 118 that an integrated session is started using another requested optional application without using the optional application of the application server 3-N (S102) just like the processings in S48 and S49 shown in FIG. 11 and the session information management apparatus 11, when completing the updating of the session information database 118, notifies the integrated application management apparatus 10 of the completion of the session information updating (S103).

Even if an error occurs in an optional application in an application server, therefore, the subject integrated session is started while no application session with the subject optional application server 3-N is established as described above. Even in that case, however, if the optional application server already establishes an application session, the server can be used for the integrated session.

As shown in FIGS. 14 through 17, the integrated application management apparatus 10 determines the error detected side (client or application server) and whether the application is indispensable or optional, and then processes the error optimally according to the error type and the error detected place. The start of the integrated session is suppressed only when such an error occurs in an application server that supplies an indispensable application. In other cases, an integrated session can be started in another system configuration enabled for the starting.

<Details of Controlling by Each Apparatus>

{2-1. Authentication Apparatus}

Figure 18:
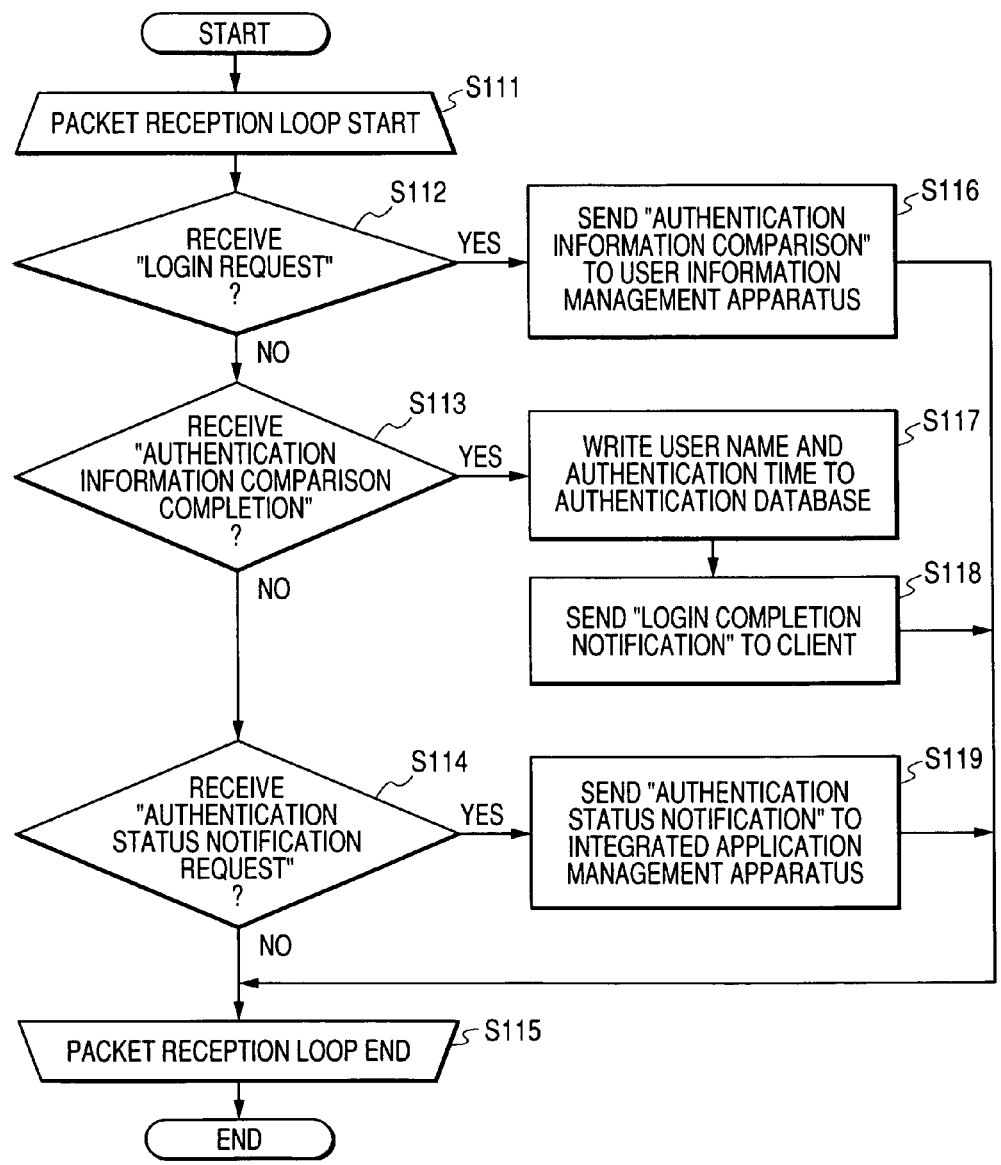
FIG. 18 is a flowchart of an example of controlling by an authentication apparatus.

Next, an example of controlling by the authentication apparatus 12 will be described with the flowchart shown in FIG. 18. The processings in this flowchart are executed in predetermined cycles.

At first, the system starts a packet reception loop in S111 to receive packets from an external network 4 or internal network 2.

The system then determines whether the received packet is a log-in request from the client 5 in S112. If the determination result is YES (log-in request), the system goes to S116 to request the user information management apparatus 12 to make an authentication information comparison (S2 in FIGS. 8 and 9).

On the other hand, if the determination result is NO (not a log-in request), the system goes to S113 to determine whether or not the packet notifies the completion of the authentication information comparison from the user information management apparatus 13. If the result is YES (completion), the system goes to S117 to record the user name and the authentication time in the authentication information database 125, then notifies the client 5 of the log-in completion (S10 shown in FIG. 9).

If the received packet does not notify the completion of the authentication information comparison, the system goes to S114 to determine whether or not the packet is an authentication status notification request one from the integrated application management apparatus 10. If the result is YES (notification request), the system refers to the authentication information database 125 to search the authentication status, then sends the status to the integrated application management apparatus 10 according to the user name and the authentication time (S23 in FIG. 10).

The system ends the packet reception loop in S115.

As described above, the system compares the authentication information with that in the user information management apparatus 13 in response to a log-in request and notifies the client 5 of the result and searches the authentication status in the authentication information database according to the status notification request from the integrated application management apparatus 10, then notifies the integrated application management apparatus 10 of the result.

{2-2. User Information Management Apparatus}

Figure 19:
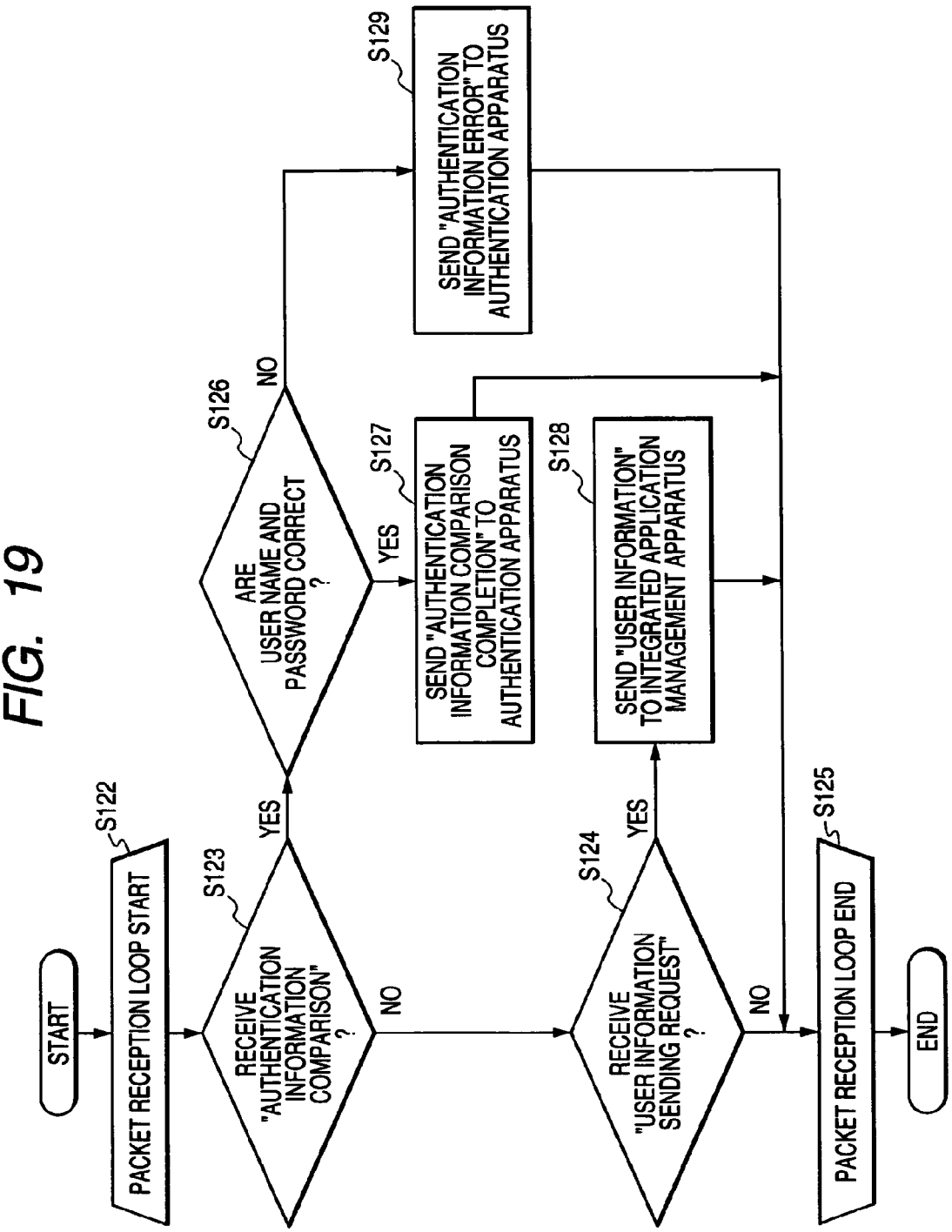
FIG. 19 is a flowchart of an example of controlling by a user information management apparatus.

Next, an example of controlling by the user information management apparatus 13 will be described with reference to the flowchart shown in FIG. 19. The processings in this flowchart are executed in predetermined cycles.

At first, the system starts a packet reception loop in S122 to receive packets from the external network 4 or internal network 2.

In S123, the system determines whether or not a packet denoting an authentication information comparison request is received from the authentication apparatus 12. If the received packet is a packet PF2 denoting the authentication information comparison request, the system goes to S126 to compare both user name and password with those in the user information database 135. If both user name and password match with those in the database 135, the system goes to S127 to notify the authentication apparatus 12 of the completion of the authentication information comparison (S3 in FIG. 8). On the other hand, if both user name and password do not match with those in the database 135, the system goes to S129 to record the error in the response code set in the authentication information comparison completion packet PF3 and sends the packet PF3 to the authentication apparatus 12.

In S123, if the received packet does not denote an authentication information comparison request, the system goes to S124 to determine whether or not the packet denotes a user information sending request (S24 in FIG. 10) received from the integrated application management apparatus 10. If the determination result is YES (sending request), the system goes to S128 to search the application list and the account list corresponding to the user name in the user information database 135 and sends the result to the integrated application management apparatus 10 (S25 in FIG. 10).

After completing the above processing, the system ends the packet reception loop in S125.

{2-3. Integrated Application Management Apparatus}

Figure 20:
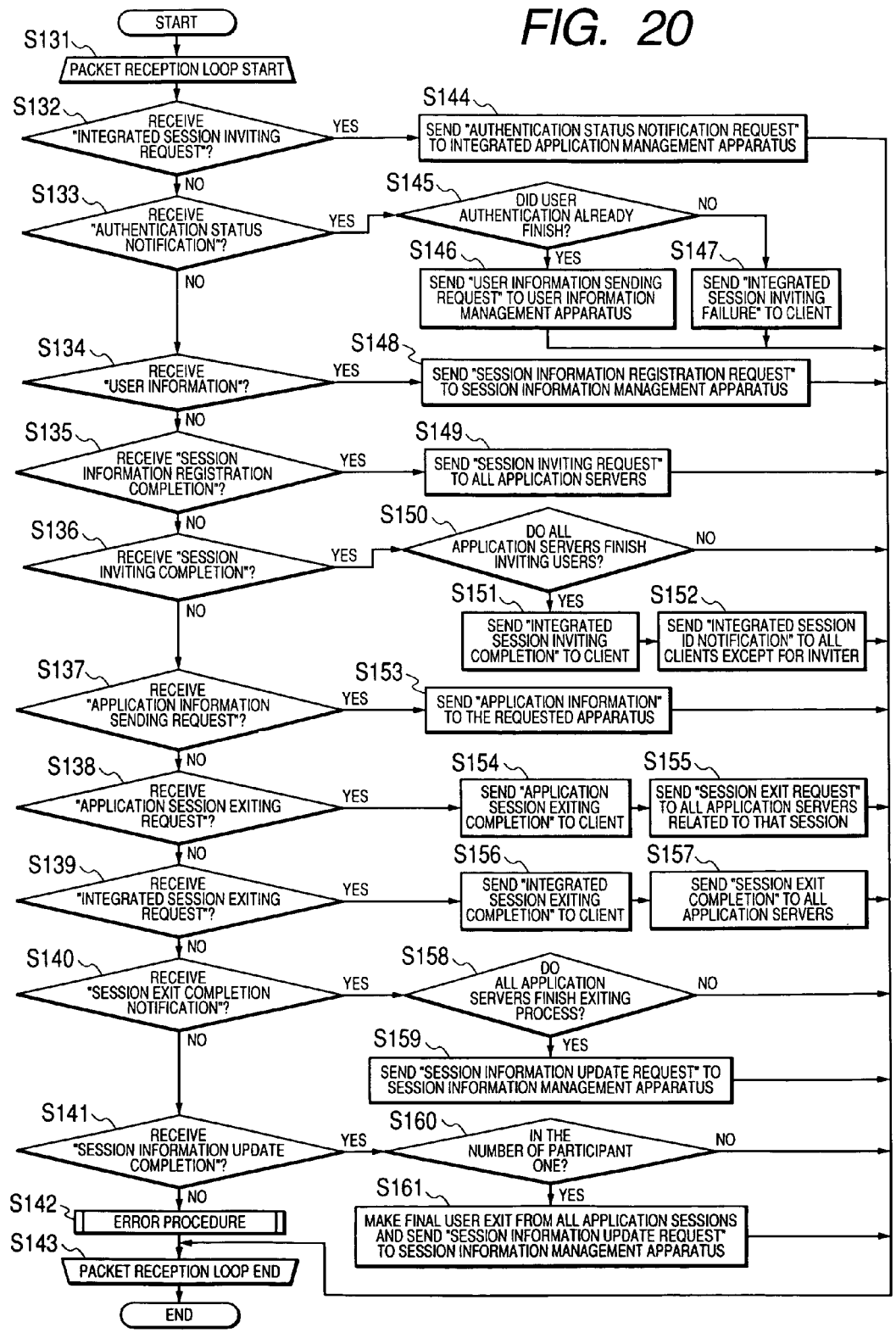
FIG. 20 is a flowchart of an example of controlling by an integrated application management apparatus.
Figure 21:
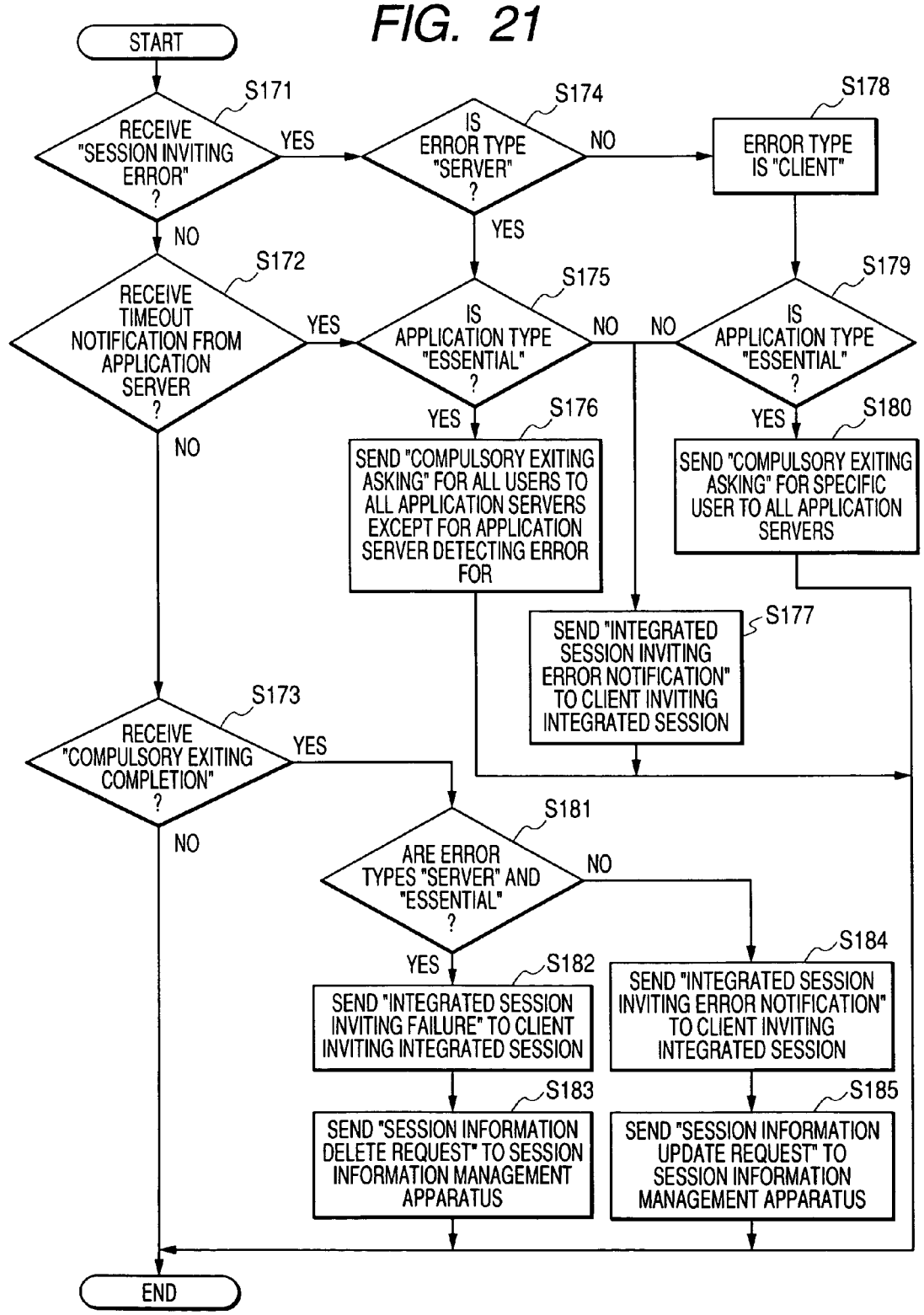
FIG. 21 is a flowchart of an example of an error procedure performed by a subroutine in the integrated application management apparatus.

Next, an example of controlling by the integrated application management apparatus 10 will be described with reference to the flowcharts shown in FIGS. 20 and 21. The processings in those flowcharts are executed in predetermined cycles. FIG. 20 is a flowchart of processings in the normal status while FIG. 21 is a flowchart of a subroutine performed when an error is detected in an integrated system.

In S131 shown in FIG. 20, the system starts a packet reception loop to receive packets from the external network 4 or internal network 2.

In S132, the system determines whether or not a packet denoting an integrated session starting request is received from a client 5. If the determination result is YES (received), the system goes to S144 to send an authentication status notification request to the authentication apparatus 12 (S22 in FIG. 10), then ends the packet reception loop in S143.

After that, the system determines whether or not a packet of authentication status notification is received from the authentication apparatus 12 (S23 in FIG. 10). If the determination result is YES (received), the system goes to S145 to determine whether or not the user is already authenticated according to the notification of the authentication status. If the determination result is YES (authenticated), the system goes to S146 to send a user information sending request to the user information management apparatus 13 (S24 in FIG. 10). On the other hand, if the determination result is NO (not authenticated), the system notifies each client 5 of the inviting failure and ends the packet reception loop in S143.

After that, the system determines whether or not a packet denoting user information is received from the user information management apparatus 13 (S25 in FIG. 10). If the determination result is YES (received), the system requests the session information management apparatus 11 to register the session information (S26 in FIG. 10), then ends the packet reception loop in S143.

Then, the system determines whether or not a packet denoting the completion of session information registration (S27 in FIG. 10) is received in S135. If the determination result is YES (received), the system goes to S149 to send an inviting request to all the application servers 3-1 to 3-N to be used in the integrated session (S28-1 to S28-N), then ends the packet reception loop in S143.

In S136, the system determines whether or not a packet denoting the completion of session inviting is received from each of the application servers 3-1 to 3-N (S31 and S35 in FIG. 10.

If the determination result is YES (received), the system goes to S150 to determine whether or not all the application servers 3-1 to 3-N to be used in the integrated session have already been invited. If the determination result is YES (invited), the system goes to S151 to notify each client 5 of the completion of the integrated session inviting (S36-1 in FIG. 10). Then, in S152, the system notifies each client 5 except for the inviting user of the integrated session ID (S36-M in FIG. 10), then ends the packet reception loop in S143.

Then, in S137, the system determines whether or not a packet denoting an application information sending request (S4 in FIG. 8) is received from the authentication apparatus 12. If the determination result is YES (received), the system goes to S153 to search the requested application information in the application information database 1-5 and notifies each client 5 of the result. The system then ends the packet reception loop in S143.

In S138, the system determines whether or not a packet denoting an application session exit request (S51 in FIG. 12) is received from a client 5. If the determination result is YES (received), the system notifies the client 5 of the acceptance of the application session exit request in S154, then requests all the application servers 3-1 to 3-N related to the application session requested to exit in S154 to exit the application session in S155 (S53-1 and S53-2 in FIG. 12), then ends the packet reception loop (S143).

In S139, the system determines whether or not a packet denoting an integrated session exit request is received from a client 5. If the determination result is YES (received), the system goes to S156 and notifies the client 5 of the acceptance of the integrated session exit request, then requests all the application servers 3-1 to 3-N related to the application session used in the integrated session in S156 to exit the application session in S157 (S42-1 and S42-N in FIG. 11), then ends the packet reception loop (S143).

In S140, the system determines whether or not a packet denoting exit completion notification is received from all the application servers 3-1 to 3-N used in the integrated session. If the determination result is YES (received), the system goes to S158 to determine whether or not a packet denoting exit completion notification is received from all the application servers 3-1 to 3-N. If the determination result is YES (received), the system goes to step S159 to send a session information updating request to the session information management apparatus 11, then ends the packet reception loop (S143).

In S141, the system determines whether or not a packet denoting completion of session information updating is received from the session information management apparatus 11. If the determination result is YES (received), the system goes to S160 to determine whether or not there is only one participant in the current integrated session. If the determination result is YES (only one), the system ends the integrated session, then the system goes to S161 to request the last user to exit all the application servers 3-1 to 3-N used in the integrated session. After that, the system requests the session information management apparatus 11 to update the session information. The system then ends the packet reception loop (S143).

In S142, the system performs an error procedure shown in FIG. 21, and then ends the packet reception loop.

Next, the error procedure in S142 will be described with reference to FIG. 21.

At first, in S171, the system determines whether or not a packet denoting a session inviting error is received. If the determination result is YES (received), the system goes to step 174 to determine whether or not the error is detected in any of application servers 3-1 to 3-N according to the error type extracted from the received packet. If the determination result is YES (one of the servers), the system goes to S175. If the determination result is NO (client 5), the system goes to S178.

In S175, the system determines whether or not the subject application server is indispensable. If the determination result is YES (indispensable), the system goes to S176 to send a packet denoting an all-user compulsory exit request (S281 in FIG. 15) to all the application servers 3-1 to 3-N used in the integrated session, then ends the subroutine. The system notifies nothing about the error detected application server to any server at that time.

On the other hand, if the application type determined in S175 is optional, the system goes to S177 to notify the client 5 that has invited the integrated session of the error occurrence in the application server that supplies the subject optional application (S101 in FIG. 17), then ends the subroutine.

If the determination in S174 results in NO (client 5) in S178, the system goes to S179 to determine whether or not the subject application is indispensable. If the determination result is YES (indispensable), the system goes to S180 to send an error-detected user compulsory exit request (S78 in FIG. 14) to all the application servers to be used in the integrated session, then ends the subroutine. If the determination result is NO (optional), the system goes to S177 to execute the processing there.

In S173, the system determines whether or not a packet denoting compulsory exit completion is received. If the determination result is YES (received), the system goes to S181 to determine whether or not the processing error type denotes a server and the subject application is indispensable. If the error is detected in a server and the subject application is indispensable, the system goes to S182 to notify the client 5 that has invited the integrated session of the inviting failure (S287 in FIG. 15), then goes to S183 to instruct the session information management apparatus 11 to delete the integrated session information (S288 in FIG. 15). The system then ends the subroutine.

Figure 16:
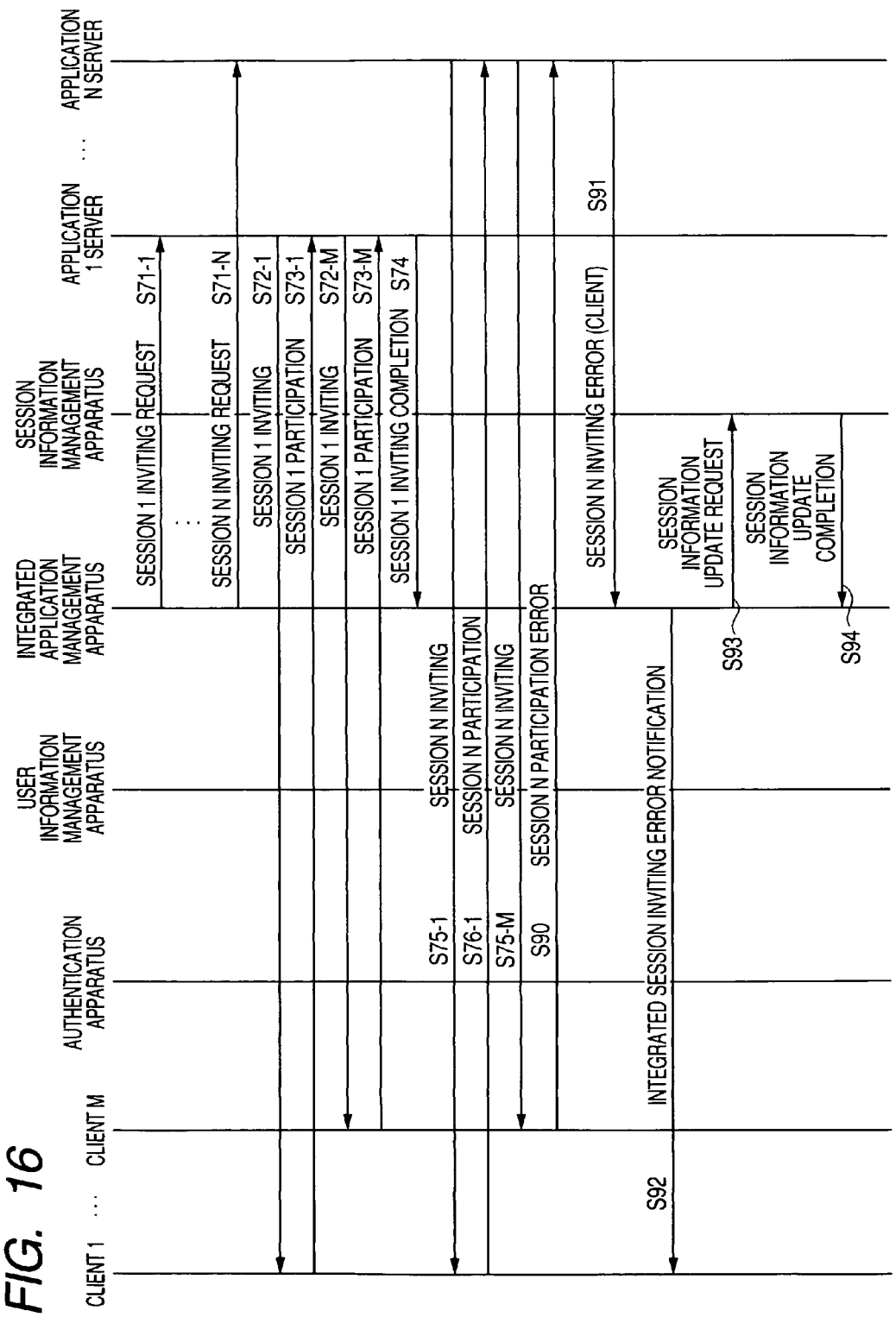
FIG. 16 is a time chart of how to process an optional application related error occurred in a client.

If the error is detected in a server and the subject application is not indispensable, the system goes to S184 to notify each client 5 of the integrated session inviting error (S82 in FIGS. 14 and S92 in FIG. 16). In S185, the system instructs the session information management apparatus 11 to update the session information, and then ends the subroutine.

{2-4. Session Information Management Apparatus and Authentication Apparatus}

Figure 22:
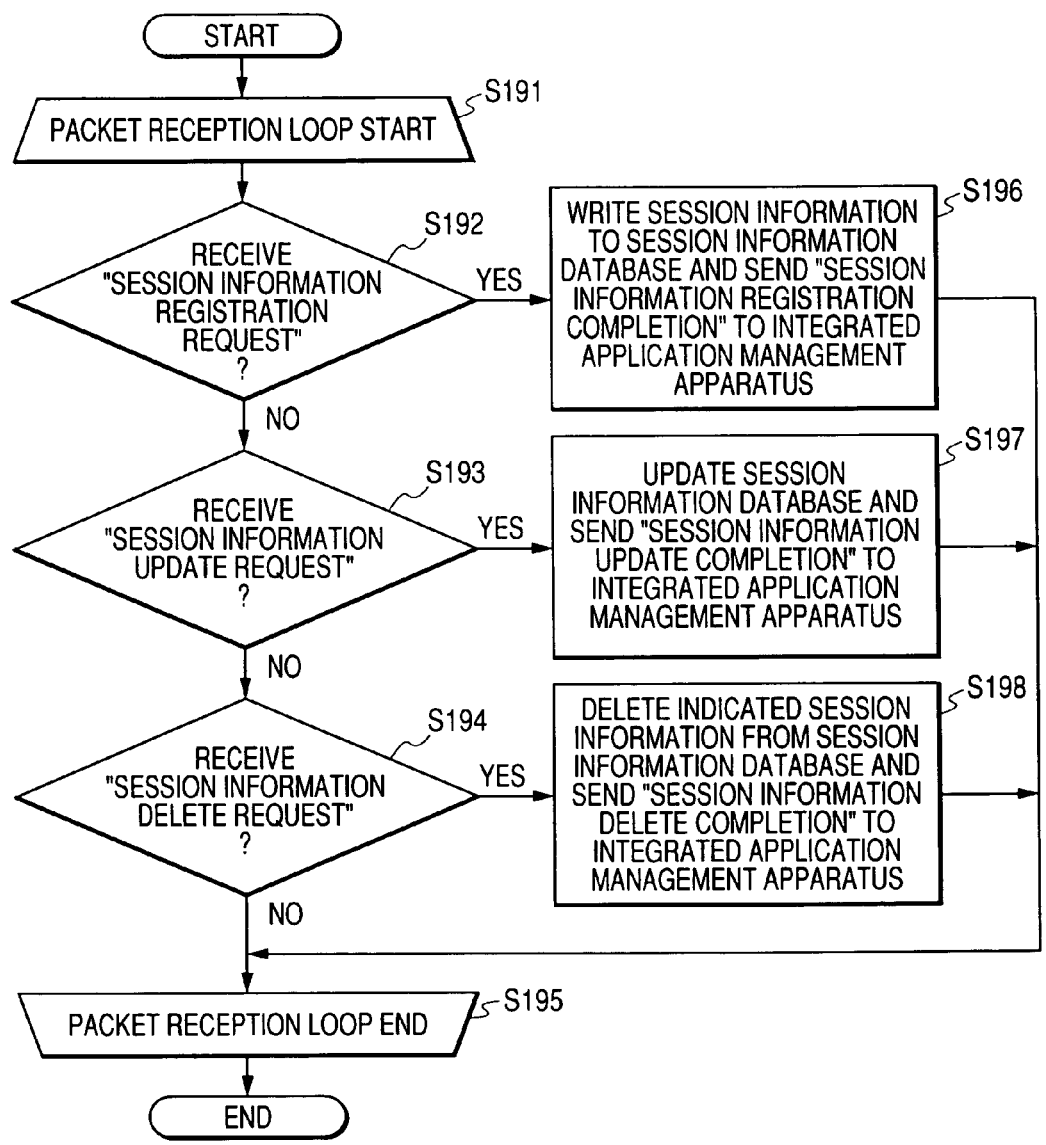
FIG. 22 is a flowchart of an example of controlling by a session information management apparatus.

Next, an example of controlling by the session information management apparatus 11 will be described with reference to the flowchart shown in FIG. 22. The processings in this flowchart are executed in predetermined cycles.

In S191, the system starts a packet reception loop to receive packets from the external network 4 or internal network 2.

In S192, the system determines whether or not a packet denoting a session information registration request (S26 in FIG. 10) is received form the integrated application management apparatus 10. If the determination result is YES (received), the system goes to S196 to register such information as the user ID, both starting and ending times of the subject session, etc. in the session information database 113, then notifies the integrated application management apparatus 10 of the completion of the session information registration (S27 in FIG. 10).

If the determination result in S192 is NO (not received), the system goes to S193 to determine whether or not the received packet denotes a session information updating request (S48 in FIG. 11) from the integrated application management apparatus 10. If the determination result is YES (updating request), the system goes to S197 to search the user ID in the session information database 113, then updates the subject record information and notifies the integrated application management apparatus 10 of the completion of the updating (S49 in FIG. 11).

If the determination result is NO (not updating request) in S193, the system goes to S194 to determine whether or not the received packet denotes a session information deletion request (S288 in FIG. 15) from the integrated application management apparatus 10. If the determination result is YES (deletion request), the system goes to S198 to delete the record of the requested integrated session ID from the session information database 118. After that, the system notifies the integrated application management apparatus 10 of the completion of the session information deletion (S289 in FIG. 15).

Completing the above processing, the system goes to S195 to end the packet reception loop.

Such way, the session information management apparatus 11 can manage the session information of the application servers 3-1 to 3-N for starting/ending an application session with each client 5 under the control of the integrated application management apparatus 10 with the processings as described above.

{2-5. Client}

Figure 23:
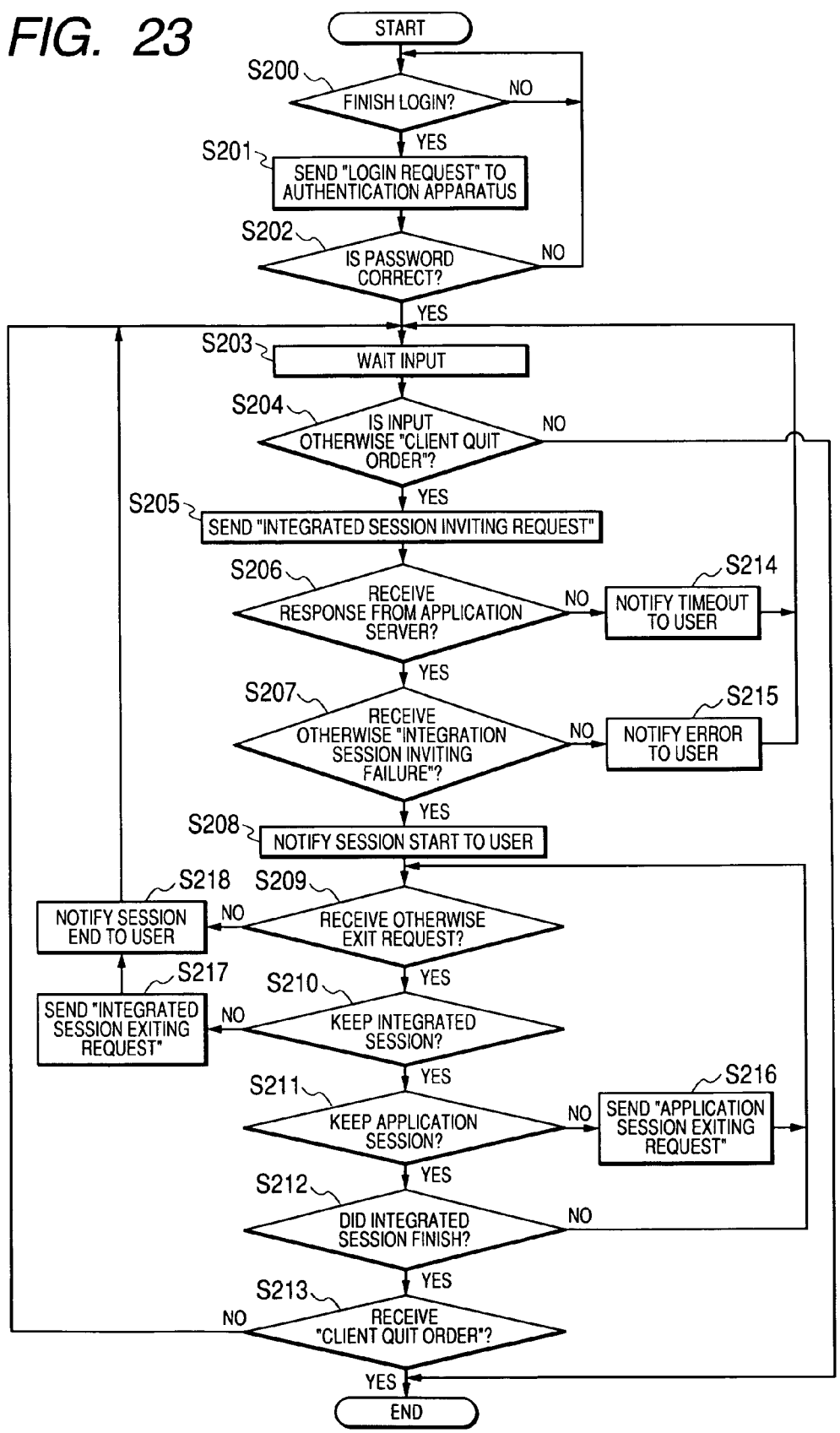
FIG. 23 is a flowchart of an example of controlling by a client.

Next, an example of controlling by each client 5 will be described with reference to the flowchart shown in FIG. 23.

At first, in S200, the system determines whether or not the logging in the integrated application management system 1 is accepted. If the determination result is NO (not accepted), the system waits for the log-in from the user. If the determination result is YES (accepted), the system goes to S201 to send a log-in request to the authentication apparatus 12 (S1 in FIG. 8).

After that, the system waits for notification of the log-in completion (S6 in FIG. 8) from the authentication apparatus 12 to determine whether or not the log-in is successful. If the determination result is NO (not successful), the system determines that the failure is caused by an illegal password or ID, and then goes back to S200. If the determination result is YES (successful), the system goes to S203.

In S203, the system waits for receiving of a list of users who will participate in the integrated session and a list of applications to be used in the integrated session inputted from an input device (keyboard/mouse) (not shown) of the client 5.

In S204, the system determines whether or not the inputted information is an ending request from the integrated application client 51. If the determination result is NO (not ending request), the system goes to S205. If the determination result is YES (ending request), the system ends the processing.

In S205, the system sends an integrated session starting request to the integrated application management apparatus 10 (S21 in FIG. 10) upon receiving the log-in completion notification, the user list, and the application list as described above.

After that, the system determines whether or not a response packet (S29-1 to S29-M in FIG. 10) is received from each of the application servers 3-1 to 3-N specified in the application list.

If the determination result is NO (not received), the system goes to S214 to notify the user of a timeout error detected in each of the application servers 3-1 to 3-N. The timeout error notification is displayed on the screen of a display unit (not shown) of the client 5. The system then goes back to 5203.

If the determination result is YES (received), the system goes to S207 to determine whether or not a packet denoting an integrated session inviting failure (S287 in FIG. 15) is received from the integrated application management apparatus 10. If the determination result is YES (received), the system goes to 5215 to notify the user of the error occurrence, then goes back to S203.

On the other hand, if the determination result is NO (not received), the system goes to S208 to notify the user of the start of the integrated session, which is displayed on the screen of a display device (not shown) or the like.

After that, the system determines whether or not a packet denoting a compulsory exit request (S282 in FIG. 15) is received from any of the application servers 3-1 to 3-N. If the determination result is YES (received), the system goes to S218 to notify the user of the end of the integrated session, since an error might have occurred in the application server that supplies the subject indispensable application. The system then goes back to S203.

If the determination result is NO (not received), the system goes to S210 to determine whether or not the users desire to continue the integrated session. If the determination result is NO (not desired), the system goes to S217 to send an integrated session exit request (S40 in FIG. 11) to the integrated application management apparatus 10, then notifies the respective users of the end of the integrated session in S218 and goes back to S203.

If the determination result is YES (desired), the system goes to S211 to determine whether or not the users desire to continue only the application session. If the determination result is NO (not desired), the system goes to step S216 to request the users to exit the session as shown in FIG. 12. The system then goes back to S209.

If the determination result is YES (desired), the system goes to S212 to determine whether or not the integrated session is ended. If the determination result is YES (ended), the system goes to 5213. If the determination result is NO (not ended), the system goes back to S209.

In S213, the system determines whether or not the ending request of the client is accepted. If the determination result is YES (accepted), the system ends the processing. If the determination result is NO (not accepted), the system goes back to S203.

After completing the above processing, if any of the application servers 3-1 to 3-N related to the subject indispensable application, is normal, the system starts the integrated session to exchange information with other clients 5 in real time through a plurality of application servers.

If the integrated application management apparatus 10 ends the integrated session, for example, when an error is detected in any of the application servers 3-1 to 3-N related to the subject indispensable application, the system notifies the users of the error occurrence, then ends the integrated session.
{2-6. GUI}

Figure 24A:
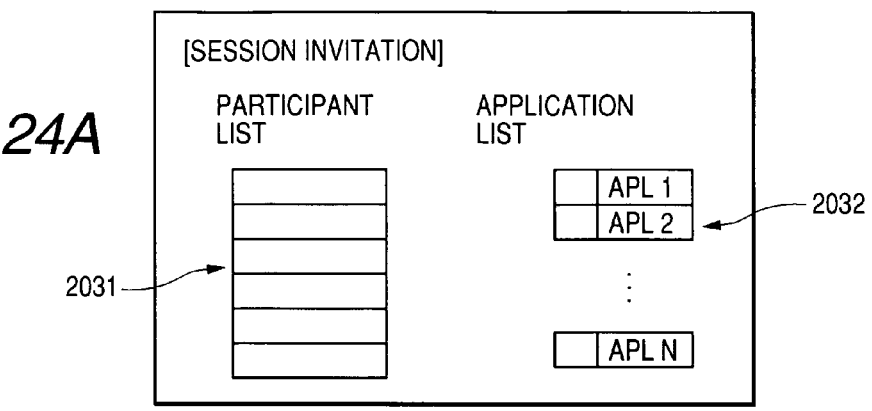
FIG. 24A is an example of an input screen of a client, consisting of a session invitation screen.
Figure 24B:
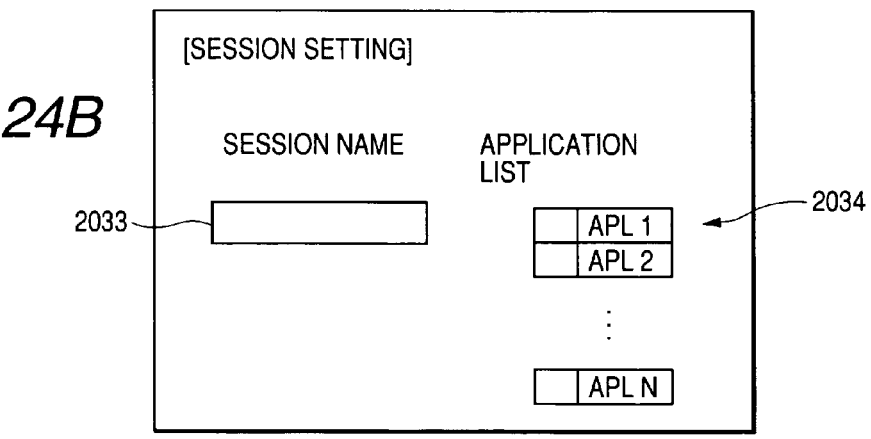
FIG. 24B is a setting screen.
Figure 24C:
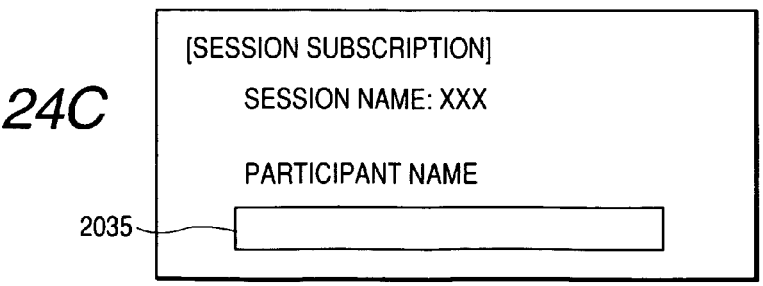
FIG. 24C is a session subscription screen.

FIG. 24 shows an example of an input screen provided in a client 5. FIG. 24A is the input screen displayed in S203 in FIG. 23 and FIG. 24B is a screen for setting an integrated session name and applications, and FIG. 24C is a screen for requesting participation in an integrated session.

In FIG. 24A, participants of a user-desired integrated session can be inputted to any of fields 2031. It is also possible to select an application type used in the subject integrated session from the check box 2032.

In FIG. 24B, an integrated session name can be inputted freely to the field 2033. And, an application used in this integrated session can be selected from the check box 2034.

In FIG. 24C, when participating in a selected integrated session, the participating user names can be inputted to the field 2035.

Second Embodiment

Figure 28:
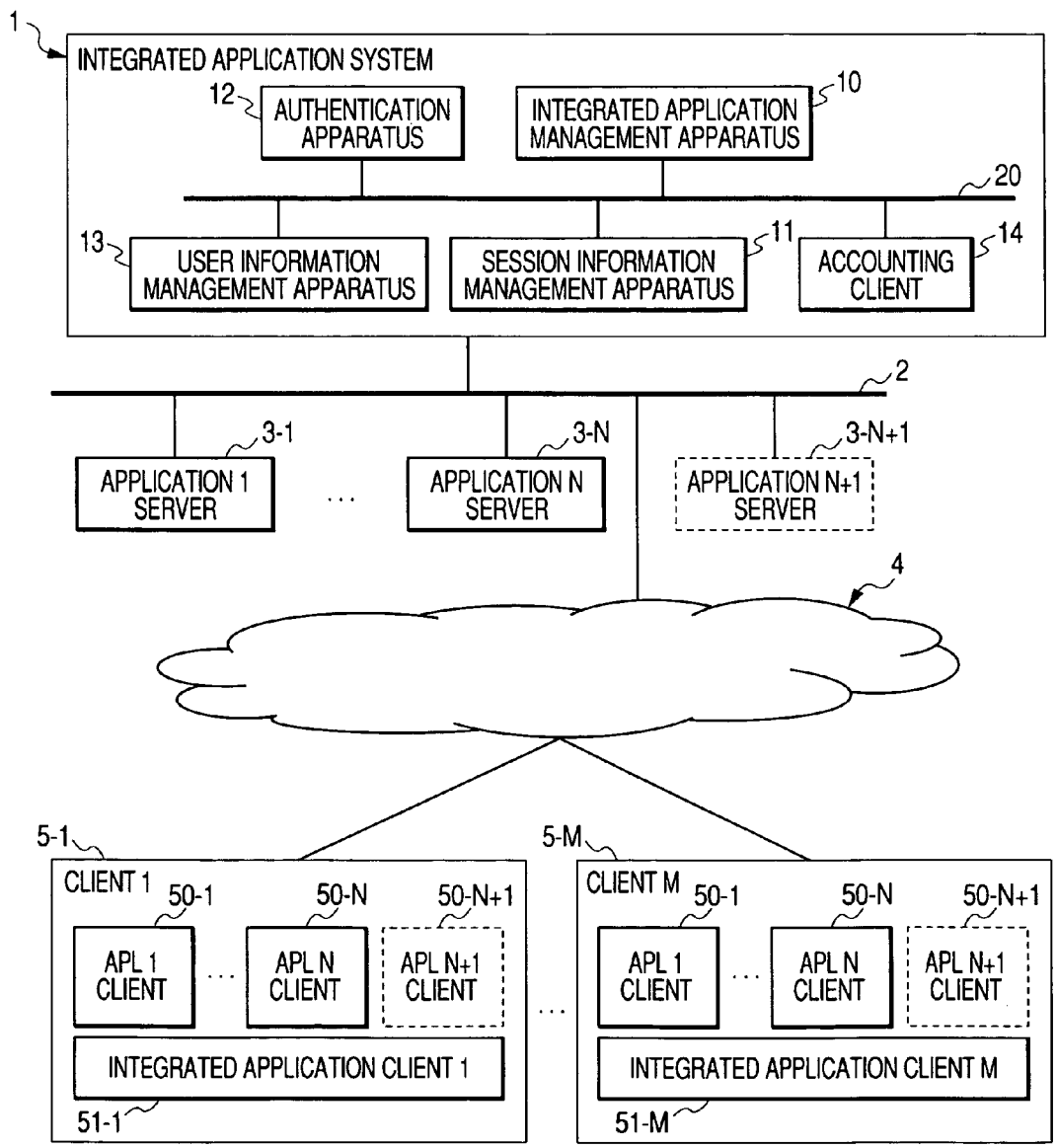
FIG. 28 is a block diagram of an integrated application management system in the second embodiment of the present invention.

FIG. 28 shows a case in which the integrated application management system 1 is provided with an accounting information terminal 14. The configuration of the integrated application management system 1 shown in FIG. 28 is the same as that in the first embodiment except for the addition of the accounting information terminal 14.

Figure 29:
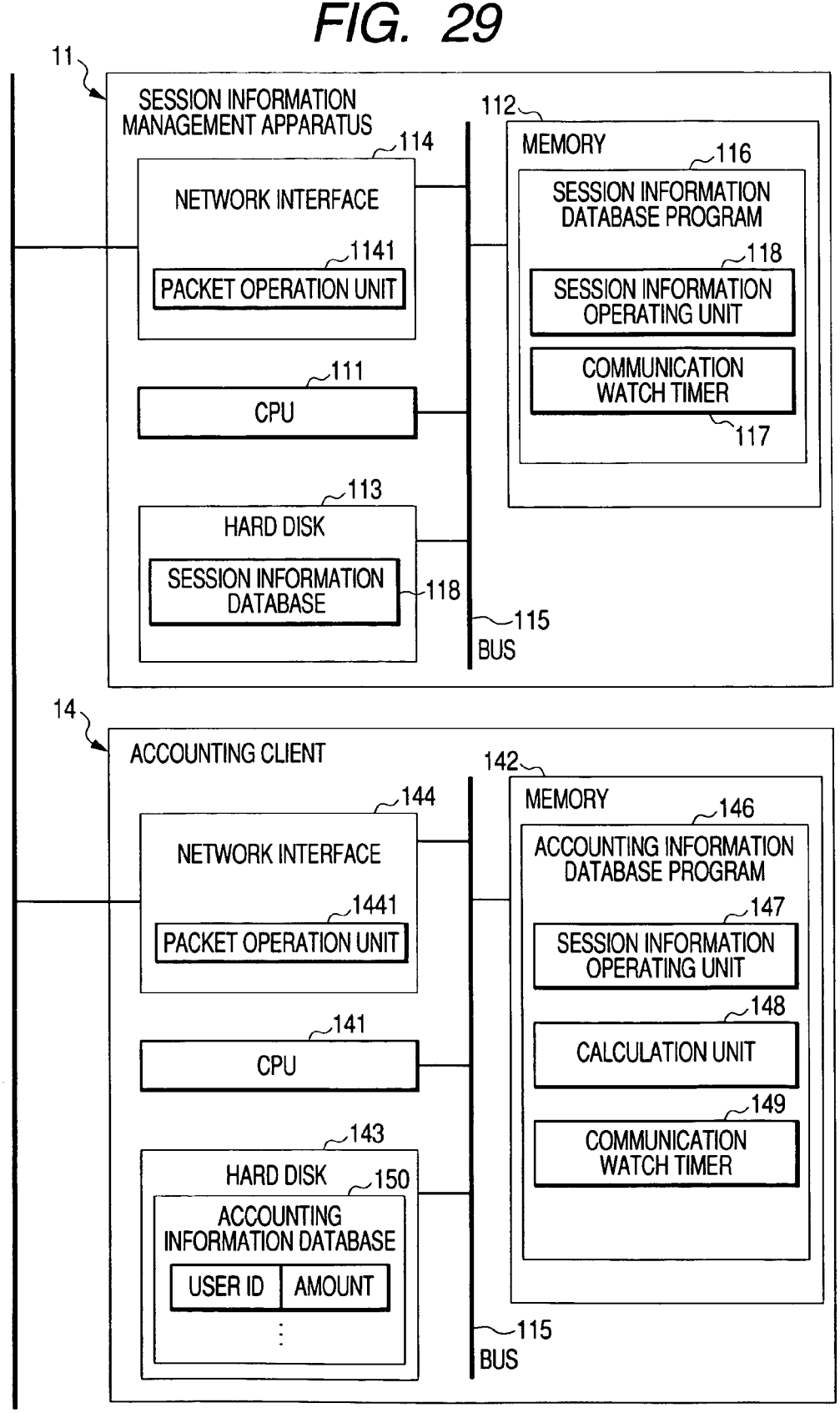
FIG. 29 is block diagrams of an accounting client and a session information management apparatus.

FIG. 29 shows a block diagram of the accounting client 14 and a block diagram of the session information management apparatus 11. The configuration of the session information management apparatus 11 is the same as that in the first embodiment except for the elucidation of the session information operating unit 118.

The accounting client 14 includes a CPU 141, a memory 142, a hard disk 143, and a network interface 144 that are all connected to a bus 145 and the client 14 communicates with the network 20 through the packet operating unit 1441 provided in the network interface 144.

The hard disk 143 retains an accounting information database 150 for recording accounting information of each user. An accounting information database program 146 loaded in the memory 142 reads/write accounting information from/in the database 150. The accounting information database program 146 operates a session information operating unit 147 for obtaining a utilization time of each user from the session information management apparatus 11, a calculation unit 148 for calculating an accounting sum according to a preset unit price of time, and a communication watch timer 117 for detecting such communication errors as timeout, etc.

Figure 30:
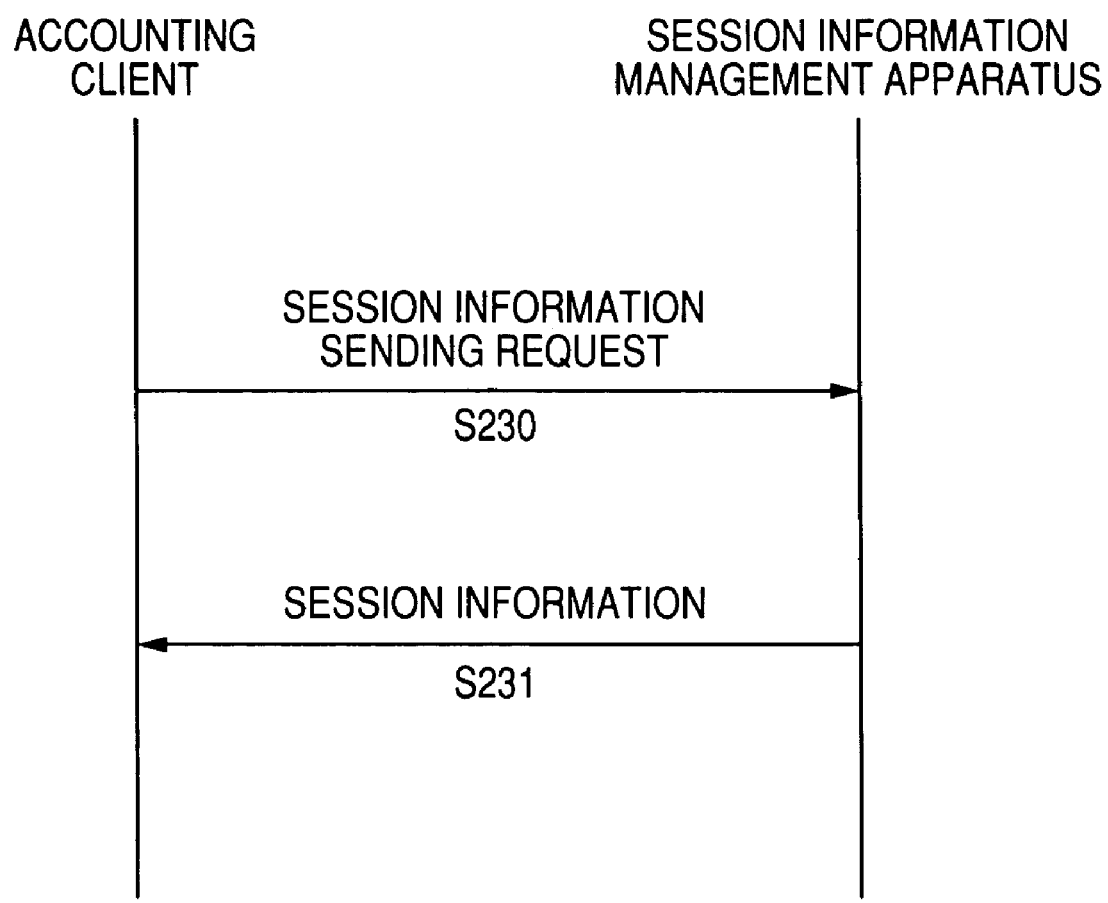
FIG. 30 is a time chart of accounting.

FIG. 30 is a time chart denoting processings of communication between the accounting client 14 and the session information management apparatus 11. The accounting client 14 requests the session information management apparatus 11 to send session information at a predetermined timing (S230). The session information management apparatus 11 then returns session information to the accounting client 14. The session information includes both starting and ending times of each user ID and an integrated session ID.

The accounting client 14 calculates the system utilization time of each user according to both starting and ending times to calculate the compensation for using the integrated application management system 1.

Figure 31:
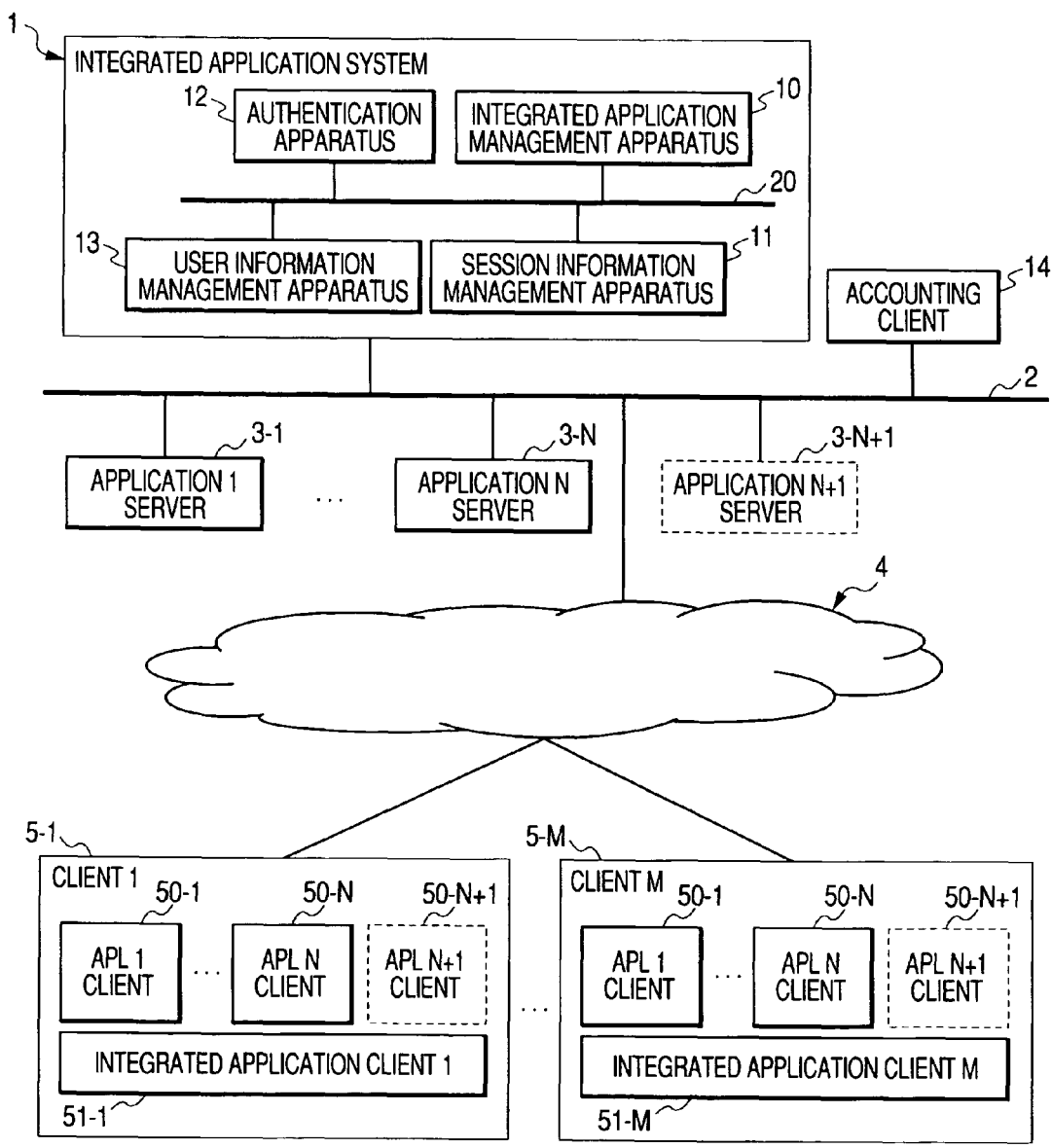
FIG. 31 is another block diagram of the integrated application management system.

As shown in FIG. 31, the accounting client 14 maybe disposed in the internal network 20, which is outside the integrated application management system 1, or in the external network 4.

Figure 32:
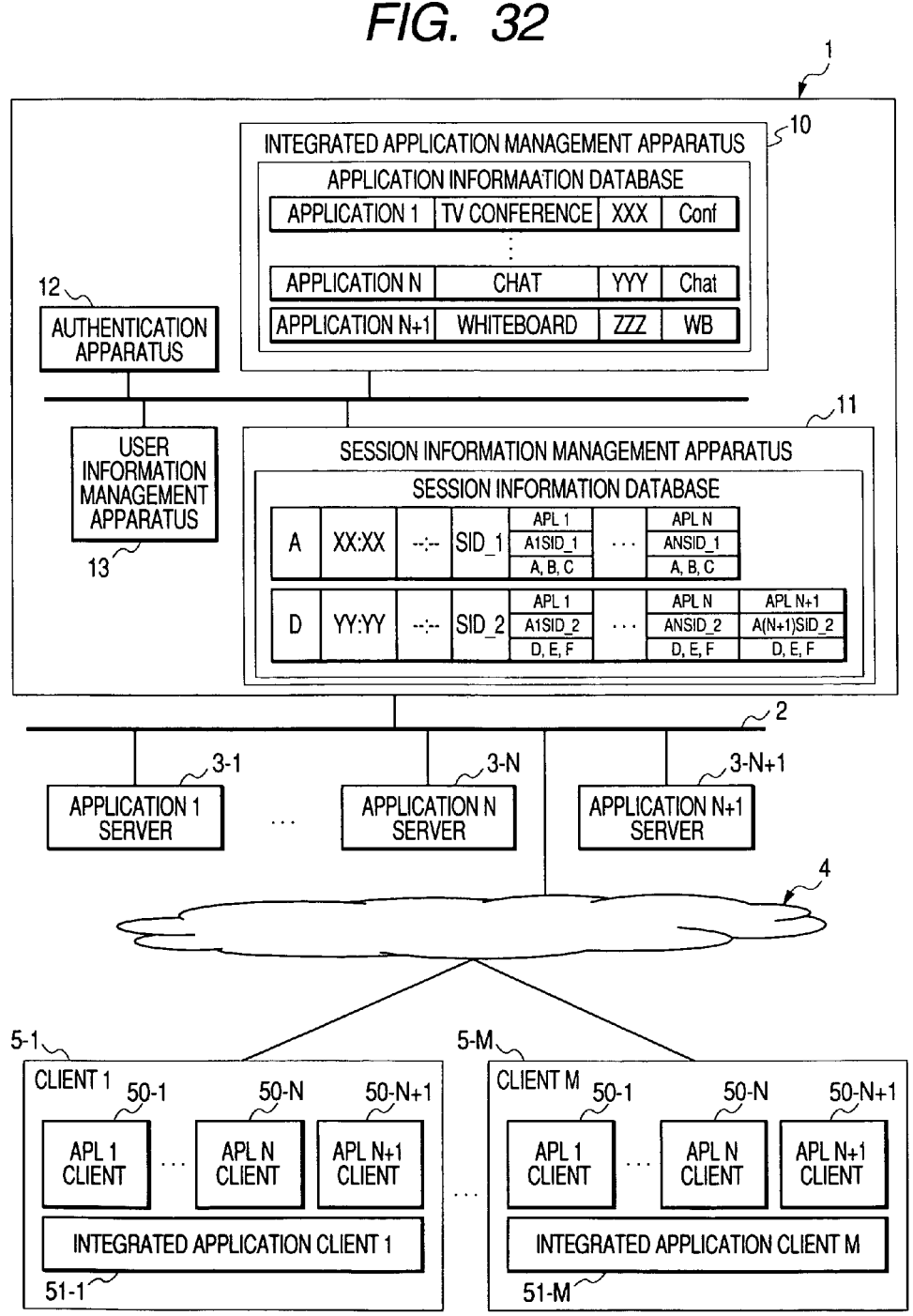
FIG. 32 is a block diagram of an integrated application management apparatus that includes an additional application server.

FIG. 32 shows how a new application is added to the system integrated application management system 1 in the first or second embodiment. At first, an application server N+1 (3–N+1 in FIG. 32) is added to the system integrated application management system 1. The system manager, when notified of an addition of a server N+1, stores the information of the application server N+1 in the application information database provided in the integrated application management apparatus 10. The information includes the application name (application N+1), the application type (white board), the server address (ZZZ), and the application identifier (WB). The user, when knowing the addition of the application, installs the application client N+1 (50–N+1 in FIG. 32).

Figure 33:
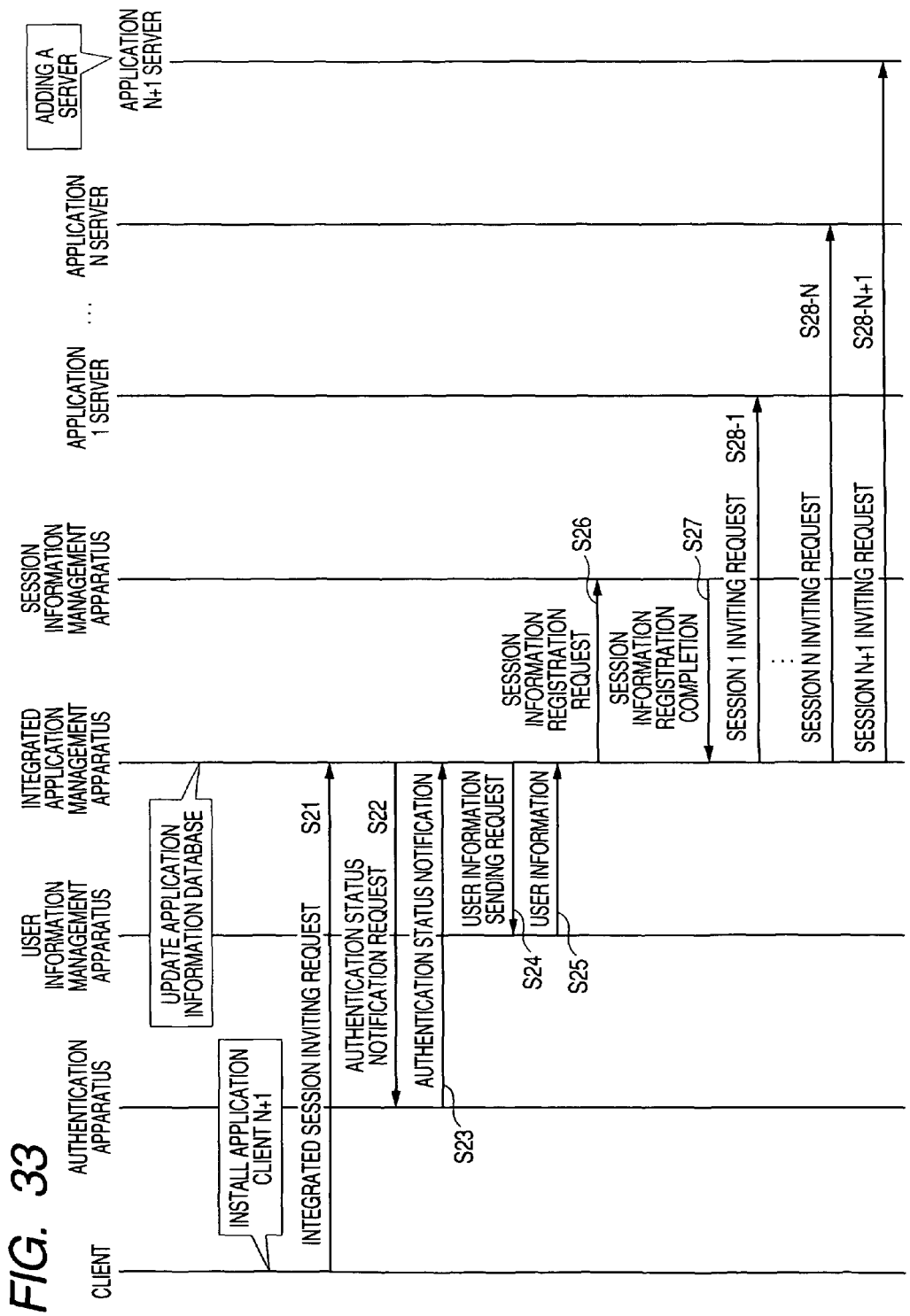
FIG. 33 is a time chart of the processings by an integrated application management system that includes an additional application server.

At that time, the user can invite an integrated session that includes the application N+1. As shown in FIG. 33, similarly to 521 to S28 in FIG. 10, if a client starts an integrated session that includes the application N+1, the integrated application management apparatus 10, after performing such necessary initial processings as authentication, sends a session inviting request (S28-1 to S28-N+1 in FIG. 32) to the application server that includes the application N+1 and stores the integrated session related information in the session information database provided in the session information management apparatus 11.

Figure 34:
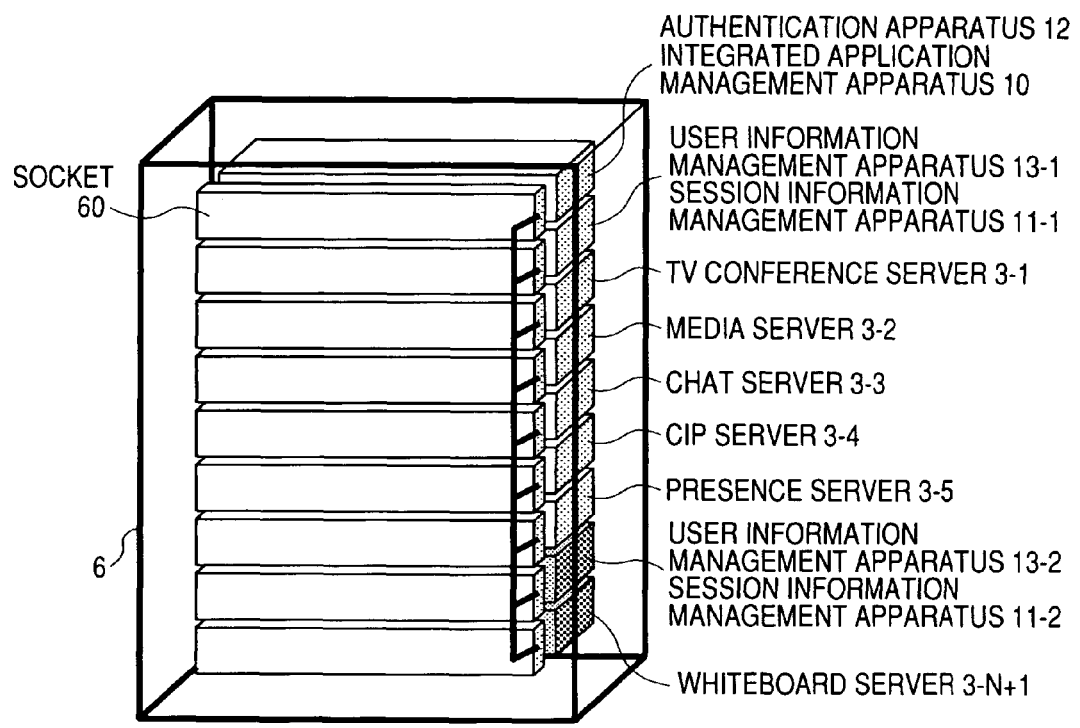
FIG. 34 describes an integrated application management system to which blades are applied.

FIG. 34 shows an embodiment of the system disposed in a blade server. The blade server can manage a plurality of apparatuses housed in a single cabinet. In FIG. 34, two blades are used to manage a pair of the authentication apparatus 12 and the integrated application management apparatus 10, a pair of the user information management apparatus 13-1 and the session information management apparatus 11-1, and a pair of the user information management apparatus 13-1 and the session information management apparatus 11-1 respectively. And, one blade is used for each of other application servers, which are a TV conference server 3-1, a media server 3-2, a chat server 3-3, an SIP (Session Initiation Protocol) server 3-4, and a presence server (used to recognize/maintain setting conditions, etc. to obtain user presence and information) 3-5. Each blade is housed in a socket 60 of the cabinet 6.

The advantage of such blade servers is that its load can be dispersed. For example, the number of users is often considered as an important performance index of such a system and such an index depends on the processing capacity of each of the user information management apparatus 13-1 and the session information management apparatus 11-1. If blade servers are used for the implementation of a system, it is only required to assign one blade newly to the user information management apparatus 13-2 and the session information management apparatus 11-2 respectively when the number of users is over the processing capacity of each of the user information management apparatus 13-1 and the session information management apparatus 11-1.

It is also required just to add a blade when an application is newly added to the system. For example, when adding a white board function to the system, it is required just to add a white board server (3-N+1) as a new blade as shown in FIG. 34. A blade means a board provided with a CPU, a storage, and an input/output interface and the blade server cabinet is provided with a switch unit that enables input/output interfaces of blades to be connected to each other.

In the above embodiment, a plurality of application servers 3-1 to 3-N are connected to the internal network 2. However, those application servers 3-1 to 3-N may be dispersed and connected to each another through the external network 4.

In the above embodiment, the internal network 2 and the external network 4 are separated from each other. However, the integrated application management system 1, the application servers 3-1 to 3-N, and the clients 5-1 to 5-M may be connected to the same network.

The above external network 4 may be any of the Internet, a WAN, a LAN, etc. and the internal network 2 may be any of a WAN, a LAN, etc.

Third Embodiment

Figure 35:
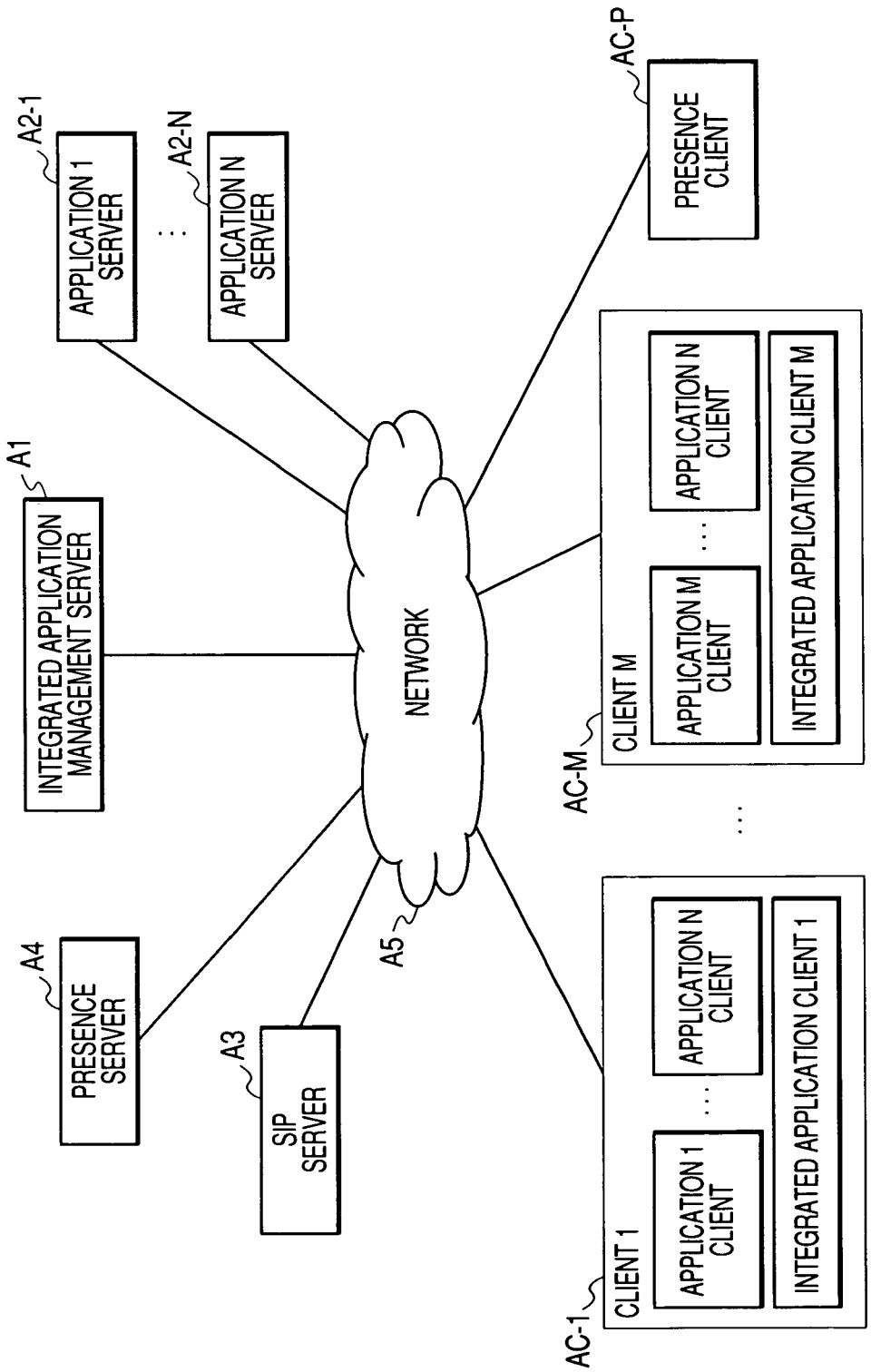
FIG. 35 is a block diagram of an integrated application management system in the third embodiment of the present invention.
Figure 36:
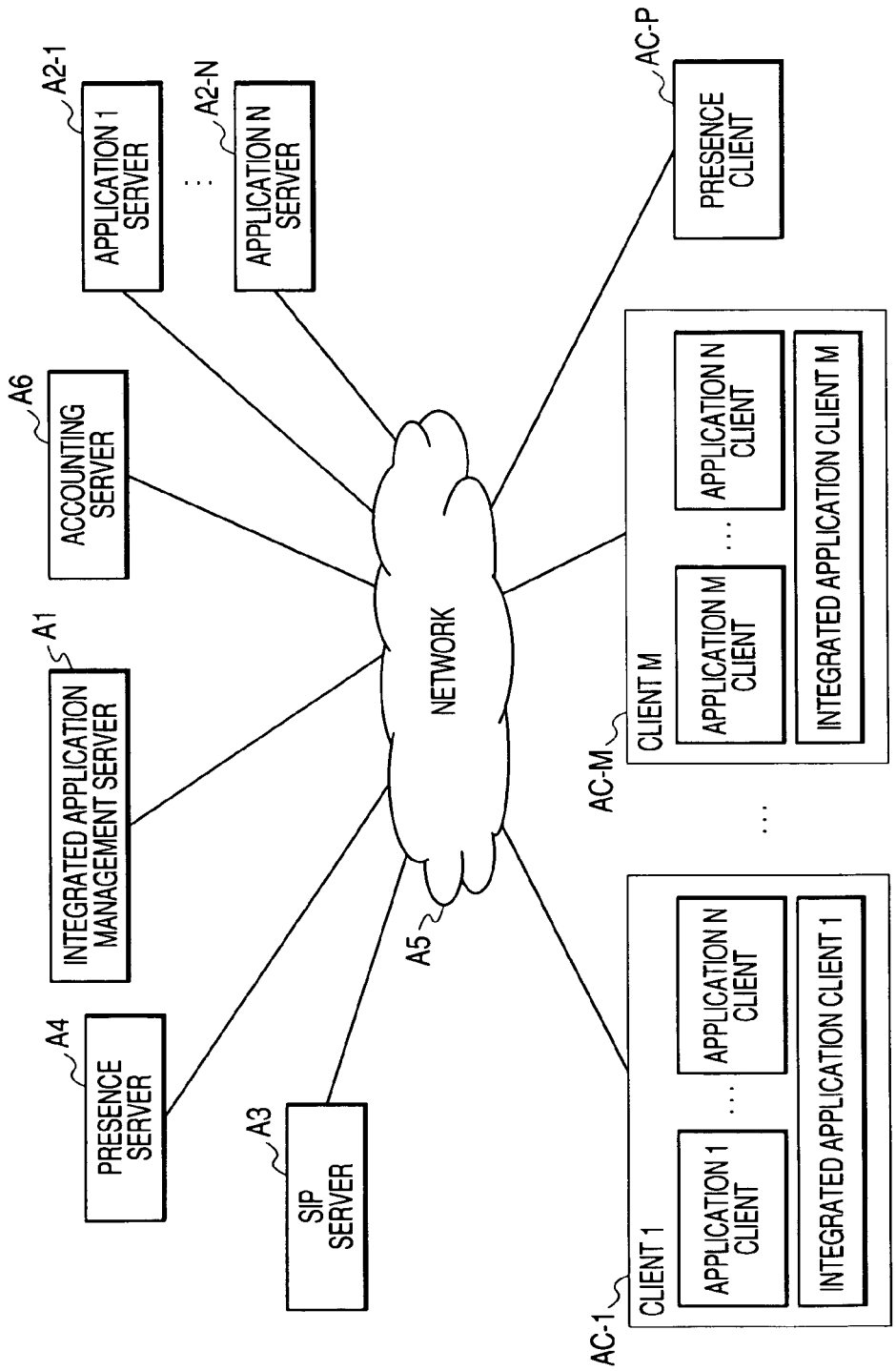
FIG. 36 is a block diagram of an integrated application management system that includes an accounting server.

Next, the third embodiment of the present invention will be described with reference to the accompanying drawings. FIG. 35 shows a system block diagram for realizing presence information management by a presence server in an integrated system for enabling a plurality of applications to cooperate with one another to exchange information among a plurality of clients (users). The system comprises an integrated application management server A1 for managing a plurality of application servers A2-1 to A2-N with use of an integrated application protocol, an SIP server A3 for controlling each call according to an SIP message, a presence server A4 for managing presence information, a plurality of clients 1 (AC-1) to AC-M for supplying application functions to users, and a presence client AC-P for supplying browsing functions of presence information to the users. Each of the clients 1 (AC-1) to AC-M is configured by application (hereinafter, to be abbreviated as APL) 1 clients (AC-1) to AC-N for supplying an application function and an integrated application client for managing APL clients integrally. Those system components are connected to one another through a network A5. FIG. 36 shows a system block diagram when the system includes an accounting server A6 and the addition of the accounting server A6 is an only difference from the system configuration shown in FIG. 35; other system components are completely the same between the two system configurations.

When a user is allowed to use any presence information, how the integrated session is managed now is required to be registered in the presence server beforehand in one of the following three ways. (1) The integrated application management server registers the information in the presence server. (2) The SIP server that monitors the integrated application management protocol message registers the presence information instead of the integrated application management server. (3) The SIP server transfers information related to the integrated application session to the presence server, then the presence server generates the presence information.

Figure 37:
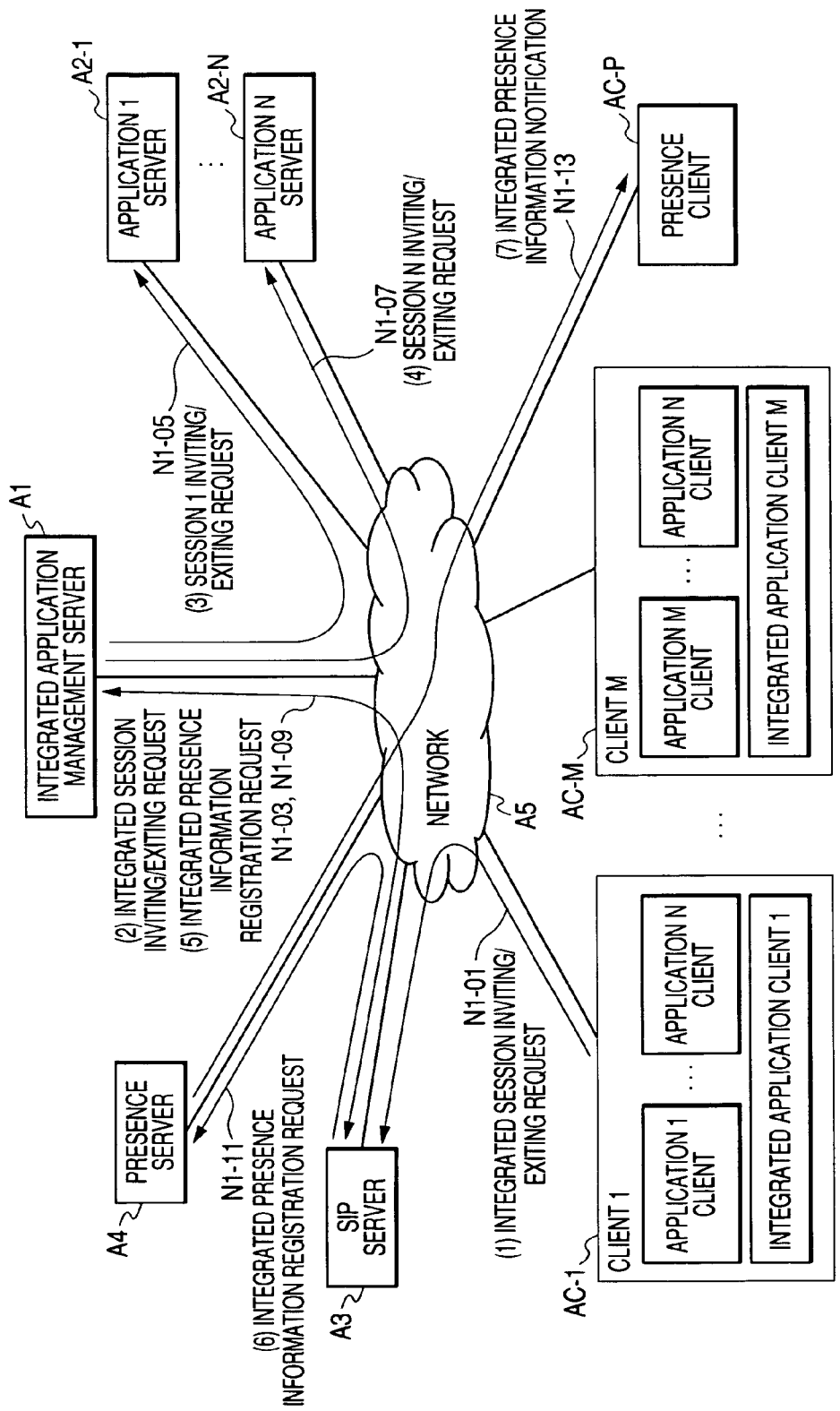
FIG. 37 is a block diagram 1 of a network for denoting how presence information is registered at the time of inviting/exiting an integrated session.

FIG. 37 shows how the integrated application management server A1 registers presence information in the presence server A4 when managing an integrated session. Integrated session management begins when an integrated application client of the client 1 (AC-1) sends an integrated session inviting or exiting request to the integrated application management server A1 through the SIP server A3 (N1-01,03). The integrated application management server A1 then analyzes the contents of the request and sends a session inviting or exiting request to the application servers A2-1 to A2-N under its control (N1-05, 07). At that time, the integrated application management server A1 also obtains the list of participants and the session status change according to the session information provided in the integrated application management protocol, then sends an integrated presence information registration request to the presence server A4 through the SIP server A3 (N1-09, 11). The presence server A4 extracts part of the presence information updated and requested to be notified to the users, that is, integrated presence information, to the presence client AC-P (N1-13).

Figure 38:
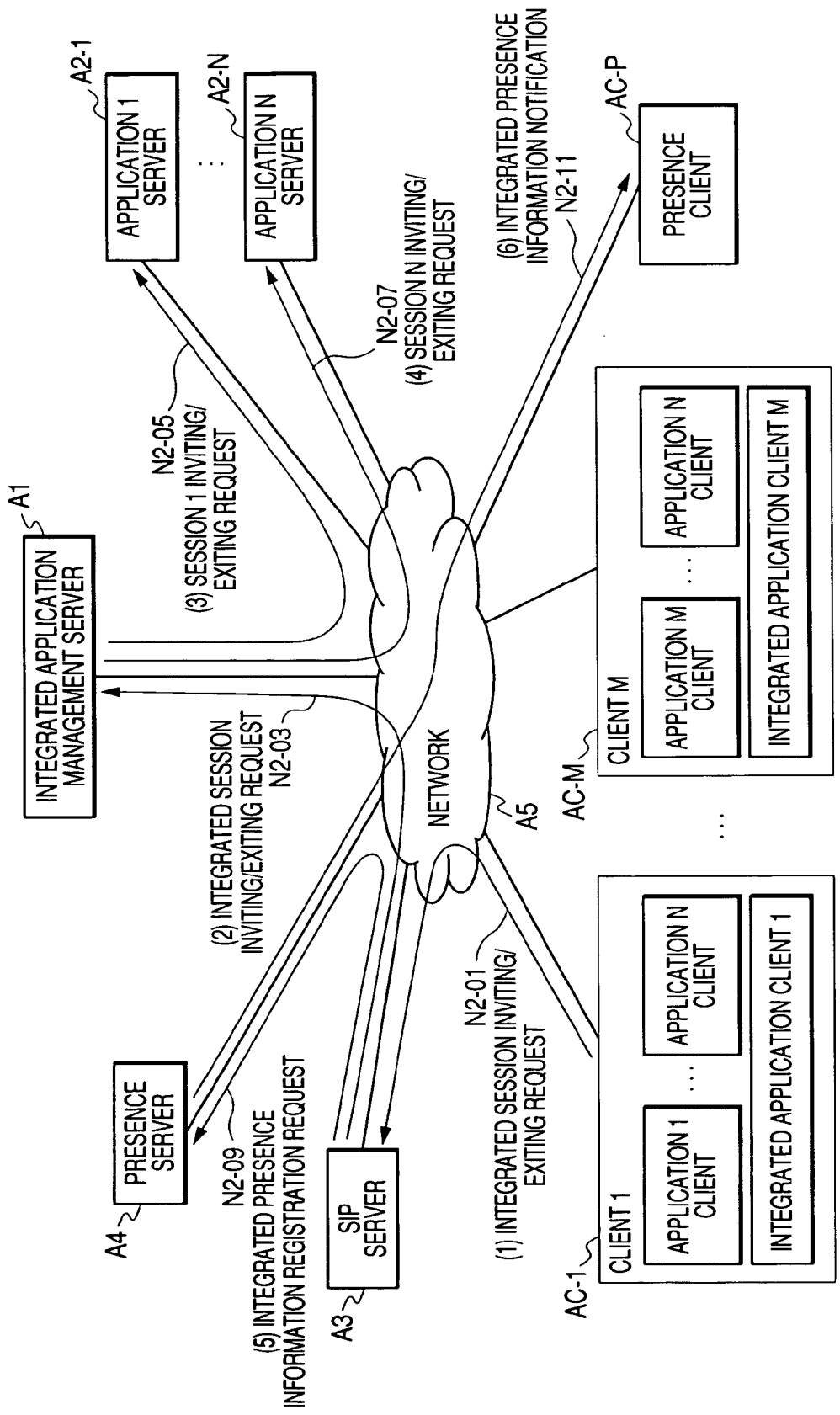
FIG. 38 is a block diagram 2 of a network for denoting how presence information is registered at the time of inviting/exiting an integrated session.

If the SIP server has a function for obtaining presence information at that time, the SIP server monitors the integrated application management protocol to register the subject presence information. FIG. 38 shows how the SIP server registers such presence information. The integrated application client of the client 1 (AC-1) sends an integrated session inviting or exiting request to the integrated application management server A1 through the SIP server A3 (N2-01, 03). The integrated application management server A1 then analyzes the contents of the request and sends a session inviting or exiting request to the application servers A2-1 to A2-N under its control (N2-05, 07). The SIP server A3, when transferring the inviting or exiting request, extracts a change to occur in the integrated session and converts the change to presence information, then sends the integrated presence information to the presence server A4 (N2-09). The presence server A4 sends an integrated presence information notice to the presence client AC-P so that the presence information updated and requested to be notified to the users is notified to the presence client (N2-11).

Figure 39:
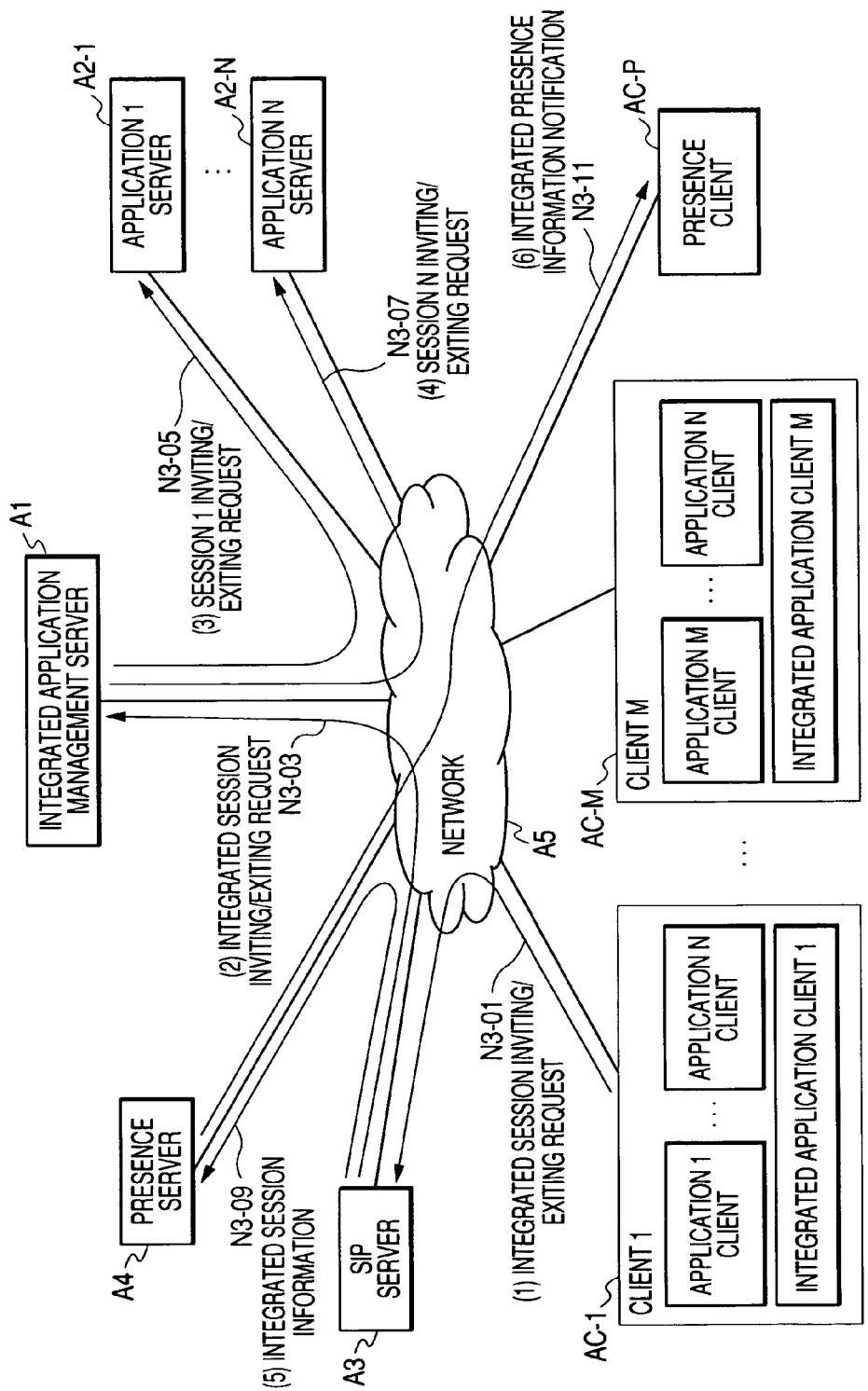
FIG. 39 is a block diagram 3 of a network for denoting how presence information is registered at the time of inviting/exiting an integrated session.

Even if the SIP server has no function for obtaining presence information, the SIP server can extract integrated session related information from the integrated application management protocol message and sends the extracted information to the presence server, thereby the presence server can obtain the presence information. FIG. 39 shows how the presence server obtains such presence information. At first, an integrated application client of the client 1 (AC-1) sends an integrated session inviting or exiting request to the integrated application management server A1 through the SIP server A3 (N3-01, 03). The integrated application management server A1 then analyzes the contents of the request and sends a session inviting or exiting request to the application servers A2-1 to A2-N under its control (N3-05, 07). The SIP server A3, when transferring the inviting or exiting request, extracts the integrated session related information. The SIP server then sends the extracted information to the presence server A4 as integrated session information with no modification (N3-09). Receiving the integrated session information, the presence server A4 converts the information to integrated presence information, then sends an integrated presence information notice to the presence client AC-P so that the presence information updated and requested to be notified to the users is notified to the presence client (N3-11).

If the status of an application session changes in an integrated session, for example, if only the application 1 exits the session, it causes a presence information change. In such a case, the presence information is registered in any of the following three ways.

Figure 40:
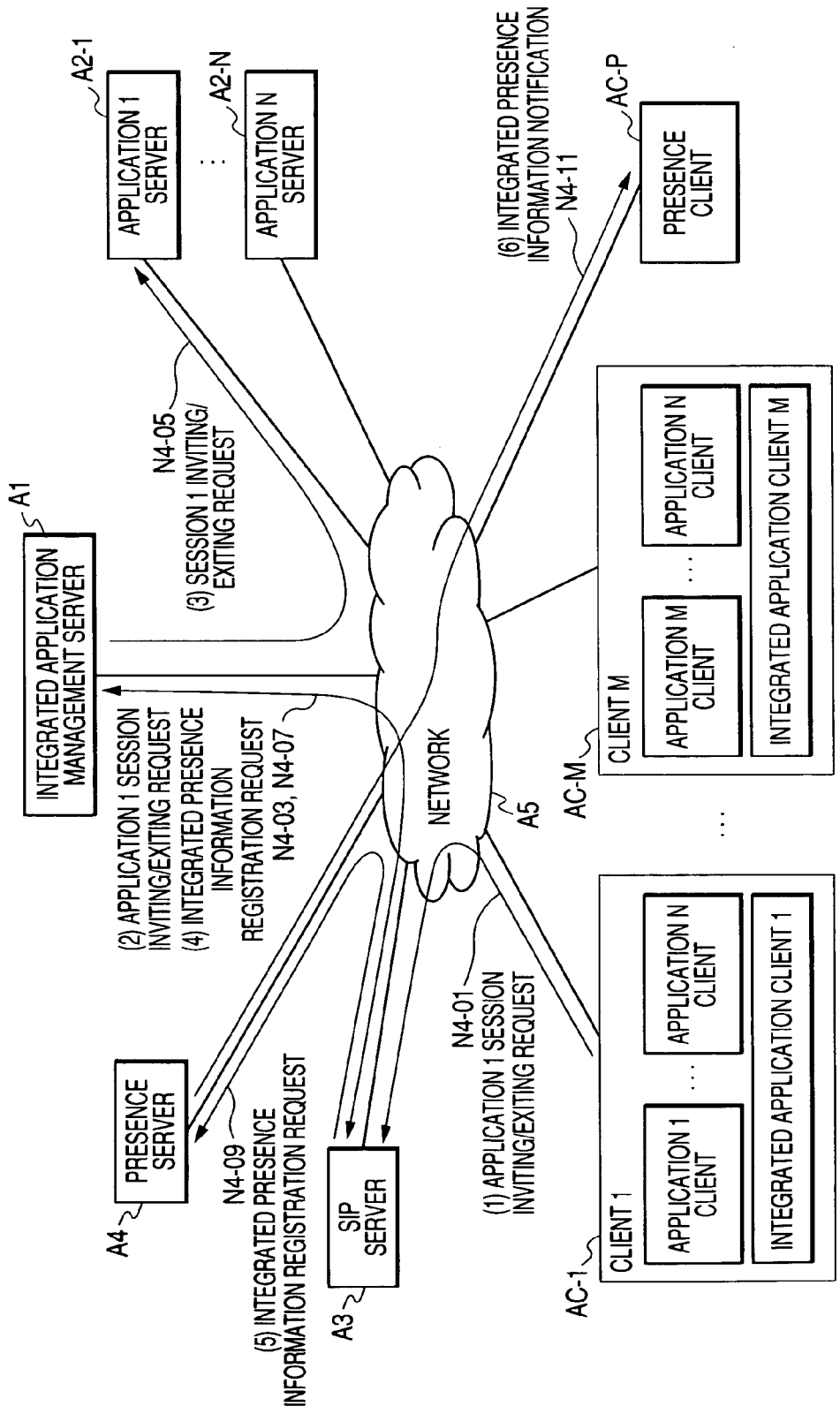
FIG. 40 is a block diagram 1 of a network for denoting how presence information is registered at the time of ending the current application session in an integrated session.

FIG. 40 shows how the integrated application management server A1 registers presence information in the presence server A4 when managing an application session. For example, at first, an integrated application client of the client 1 (AC-1) sends an APL1 session inviting or exiting request to the integrated application management server A1 through the SIP server A3 (N4-01, 03). The integrated application management server A1 then analyzes the contents of the request and sends a session inviting or exiting request to the application server A2-1 (N4-05). At the same time, the integrated application management server A1 obtains the list of the participants, as well as estimates how the status of the session is to change according to the session information provided in the integrated application management protocol and sends an integrated presence information registration request to the presence server A4 through the SIP server A3 (N4-07, 09). Such presence information change occurs only in the session of the application 1. However, because the application 1 is part of an integrated session, the application 1 is handled as integrated presence information. The presence server A4 then sends an integrated presence information notice to the presence client AC-P so that the presence information updated and requested to be notified to the users is notified to the present client (N4-11).

Figure 41:
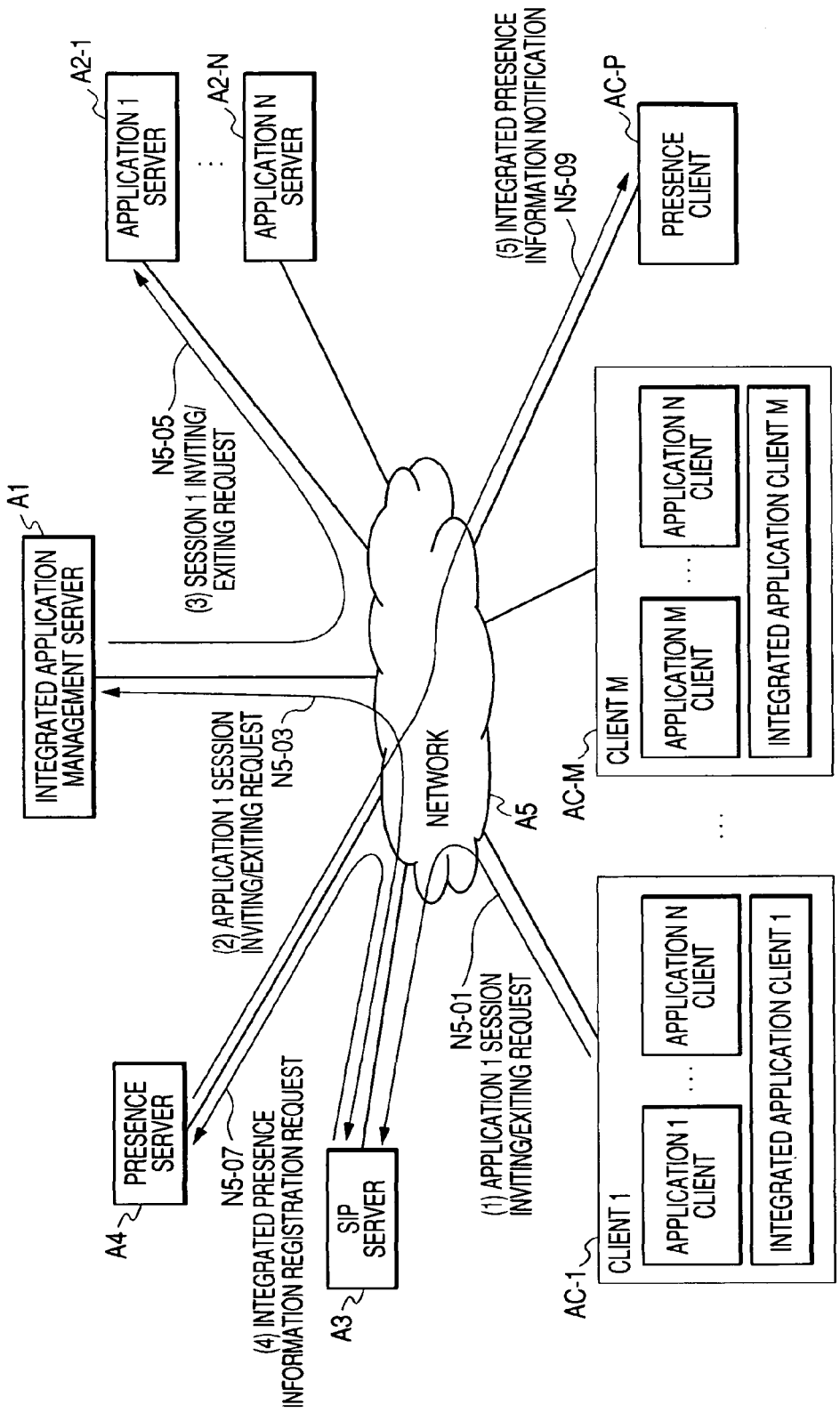
FIG. 41 is a block diagram 2 of a network for denoting how presence information is registered at the time of ending the current application session in an integrated session.

FIG. 41 shows how the SIP server registers such presence information. At first, an integrated application client of the client 1 (AC-1) sends an APL1 session inviting or exiting request to the integrated application management server A1 through the SIP server A3 (N5-01, 03). The integrated application management server A1 then analyzes the contents of the request and sends a session inviting or exiting request to the application server A2-1 (N5-05). The SIP server A3, when transferring the APL1 session inviting or exiting request, extracts a change to occur in the integrated session and converts the change to presence information, then sends the integrated presence information to the presence server A4 (N5-07). The presence server A4 then sends an integrated presence information notice to the presence client AC-P so that the presence information updated and requested to be notified to the users is notified to the presence client AC-P (N5-09).

Figure 42:
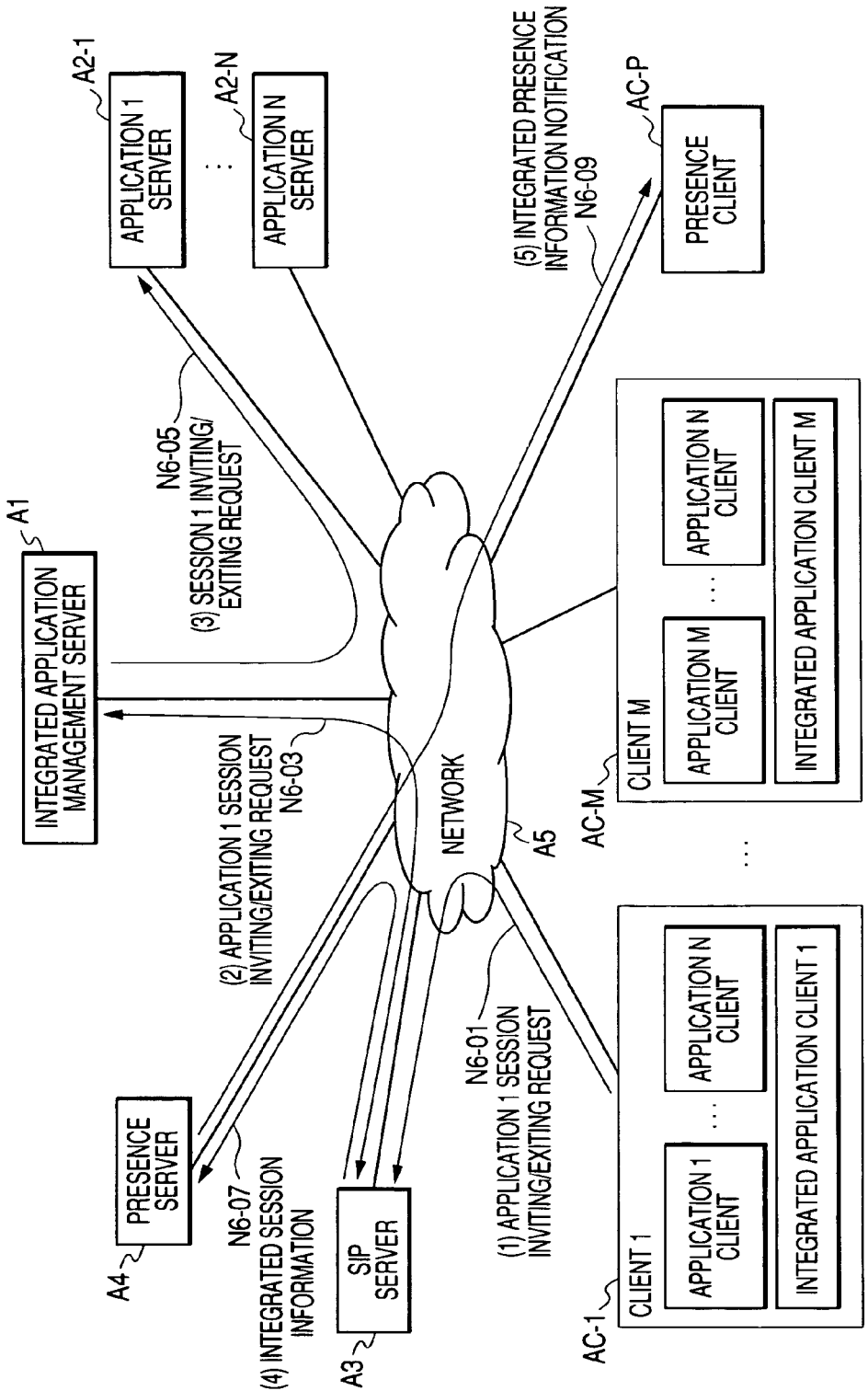
FIG. 42 is a block diagram 3 of a network for denoting how presence information is registered at the time of ending the current application session in an integrated session.

FIG. 42 shows how the presence server obtains such presence information. At first, an integrated application client of the client 1 (AC-1) sends an APL1 session inviting or exiting request to the integrated application management server A1 through the SIP server A3 (N6-01, 03). The integrated application management server A1 then analyzes the contents of the request and sends a session inviting or exiting request to the application server A2-1 (N6-05). The SIP server A3, when transferring the APL1 session inviting or exiting request, extracts integrated session related information. The SIP server then sends the extracted information to the presence server A4 as integrated session information with no modification (N6-07). Receiving the integrated session information, the presence server A4 converts the information to integrated presence information and sends an integrated presence information notice to the presence client AC-P so that integrated presence information updated and requested to be notified to the users is notified to the presence client AC-P (N6-09).

Figure 43:
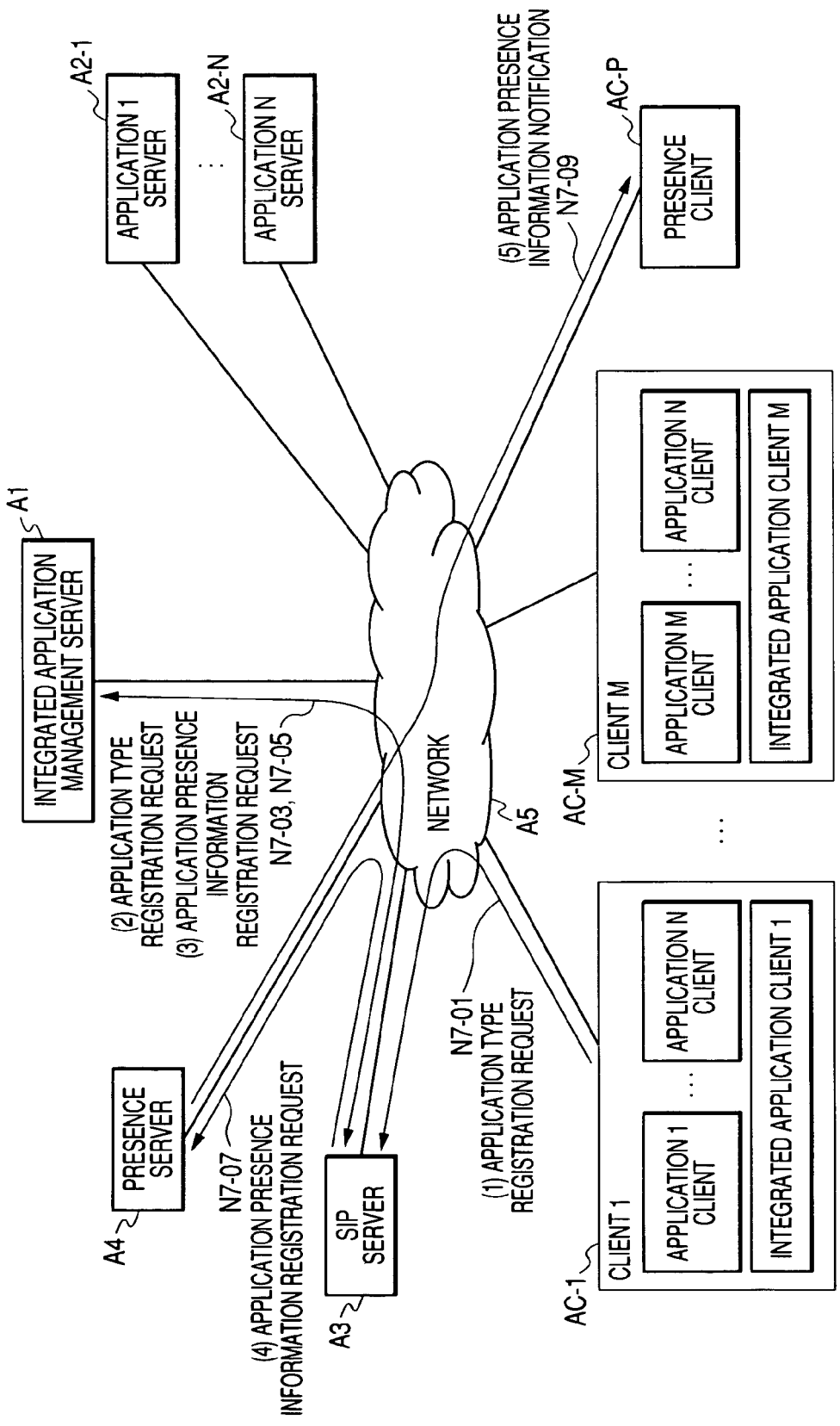
FIG. 43 is a block diagram of a network for denoting how an application type is registered.

Such presence information is also updated if a new application server is added to the system or if a new available application type is added to cope with an updated user contract. FIG. 43 shows a case in which an application type is added to the system. The client 1 (AC-1) sends a request for registering a new application type to the integrated application management server A1 through the SIP server A3 (N7-01, 03). The integrated application management server A1 then detects the added available application, then notifies the presence server A4 of the added application. The change of the presence information due to this operation is an event independent of the integrated session in which the user is participating, so that the integrated application management server A1 sends the information to the presence server A4 through the SIP server A3 as APL presence information (N-7-05, 07). The presence server A4 then sends an APL presence information notification to the presence client AC-P so that the presence information updated and requested to be notified to the users is notified to the presence client (N7-09). Such application presence information can also be registered by the SIP server and obtained by the presence server in any of three ways just like the registration of the integrated presence information.

The presence information is also updated in the same way as in the addition after an application server is deleted from the system or according to an updated user contract. In the case of deletion of an application server, however, it is possible to execute a procedure for confirming there is no user who uses the application server to be deleted before updating the presence information.

Figure 44:
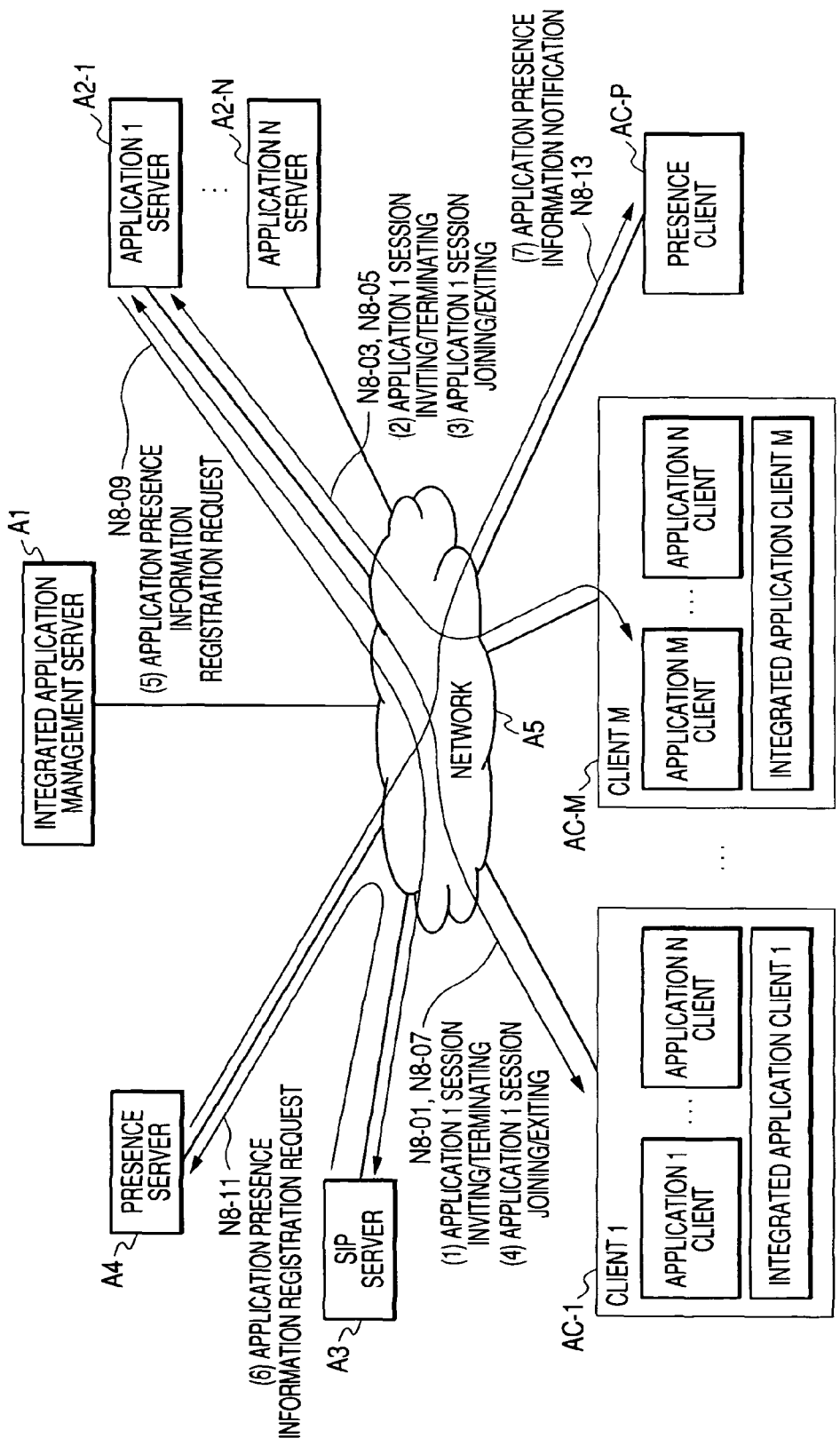
FIG. 44 is a block diagram of a network for denoting how an application session is invited or exited.
Figure 45:
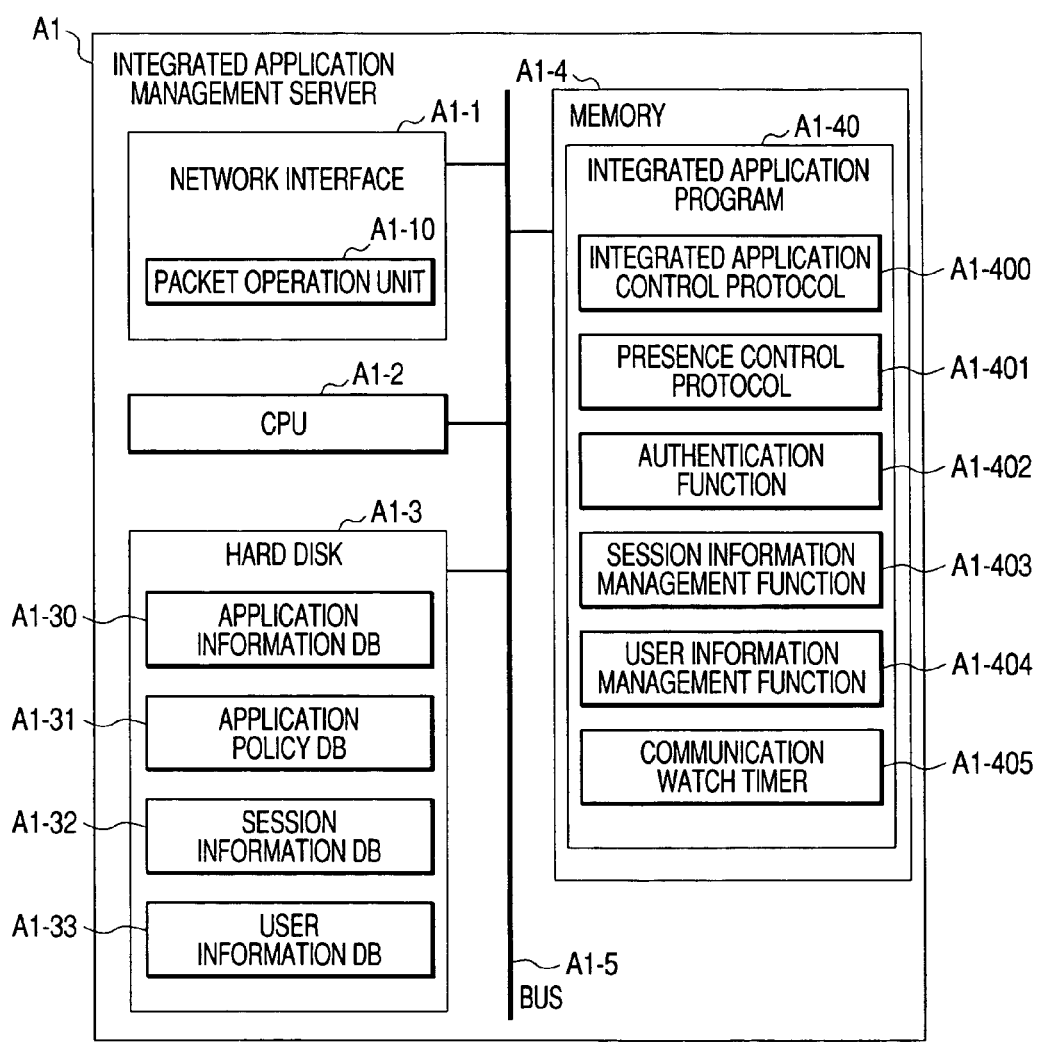
FIG. 45 is a functional block diagram of an integrated application management server having presence information registering functions.

A presence information change occurs not only when an integrated session is managed, but also when a session is managed just for an application independently as shown in FIGS. 8 and 9. FIG. 44 shows how presence information is notified while an application session is managed. At first, the client 1 (AC-1) sends an APL1 session inviting or ending request to the application 1 server A2-1 (N8-01). The application 1 server A2-1 then analyzes the contents of the message, then transfers the message to the client AC-M (N8-03). Receiving the request, the client AC-M returns "participating in or exiting from the application 1" message to the client 1 (AC-1) through the application 1 server A2-1 according to the contents of the message (N8-05, 07). Ending the management of the application 1 session, the application 1 server A2-1 obtains the change of the presence information. The change of the presence information does not depend on the integrated session, so that the application 1 server A2-1 sends the APL presence information to the presence server A4 through the SIP server A3 (N8-09, 11). The presence server A4 then sends an APL presence information notification to the presence client AC-P to notify the presence client of the presence information updated and requested to be notified to the users (N8-13). Next, the functions of each server in presence information management will be described with reference to the accompanying drawings. FIG. 45 shows a functional block diagram of the integrated application management server A1. The integrated application management server A1 includes the following basic hardware components; a network interface A1-1, a CPU A1-2, a hard disk drive A1-3, a memory A1-4, and a bus A1-5. The network interface A1-1 includes a packet operation unit A1-10 for receiving messages of the integrated application management protocol and the presence control protocol. The hard disk drive A1-3 includes an application information DB (A1-30), an application policy DB (A1-31), a session information DB (A1-32), and a user information DB (A1-33). The configuration of each of those DBs is shown as follows; FIG. 2B shows the configuration of the application information DB (A1-30), FIG. 2C shows the configuration of the application policy DB (A1-31), FIG. 5B shows the configuration of the session information DB (A1-32), and FIG. 4B shows the configuration of the user information DB (A1-33), respectively. The integrated application program A1-40 stored in the memory A1-4 includes modules of an integrated application control protocol A1-400 for controlling integrated sessions, a presence control protocol A1-401 for controlling presence information, authentication functions A1-402 for authenticating users, session information management functions A1-403 for managing each relationship among sessions, user information management functions A1-404 for managing user information, and a communication watch timer A1-405 for watching communication timeout errors.

Figure 46:
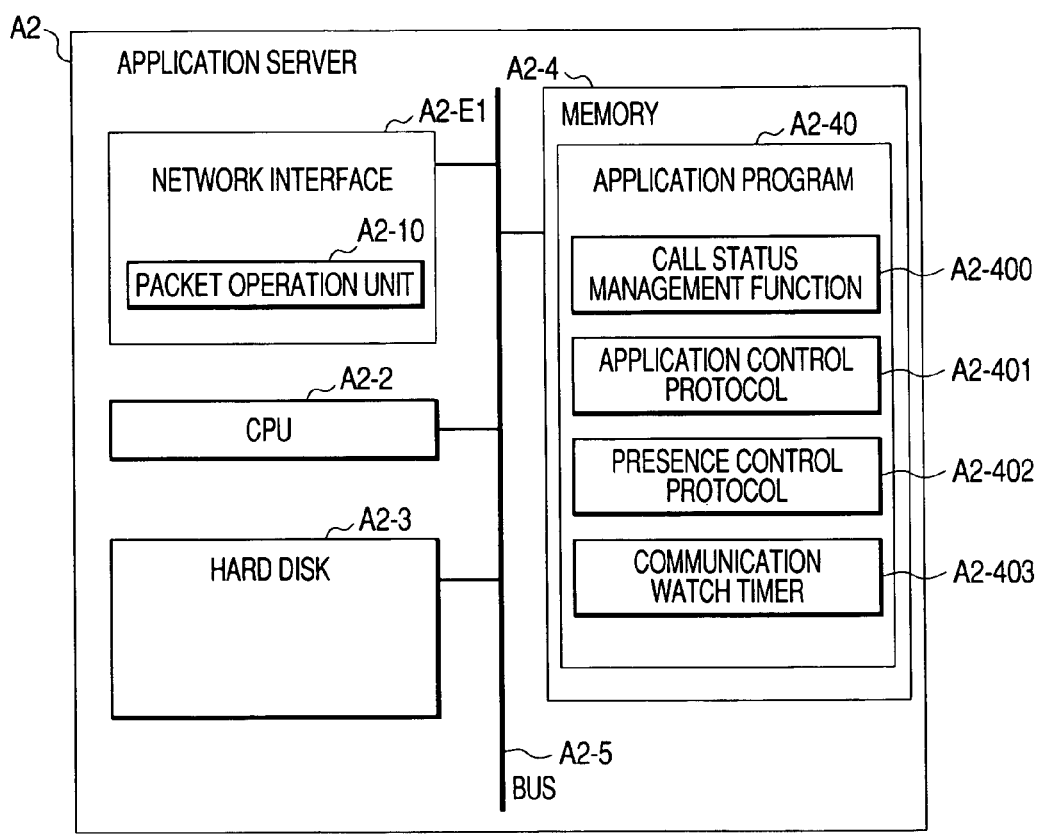
FIG. 46 is a functional block diagram of an application server having presence information registering functions.

FIG. 46 shows a functional block diagram of the application server A2. The application server A2 includes the following basic hardware components; a network interface A2-E1, a CPU A2-2, a hard disk drive A2-3, a memory A2-4, and a bus A2-5. The network interface A2-E1 includes a packet operation unit A2-10 for receiving messages of the integrated application management protocol and the presence control protocol. The application program A2-40 stored in the memory A2-4 includes modules of a call status management part A2-400 for controlling application calls, an application control protocol A2-401, a presence control protocol A2-402 for controlling presence information, a communication watch timer A2-403 for watching communication timeout errors.

Figure 47:
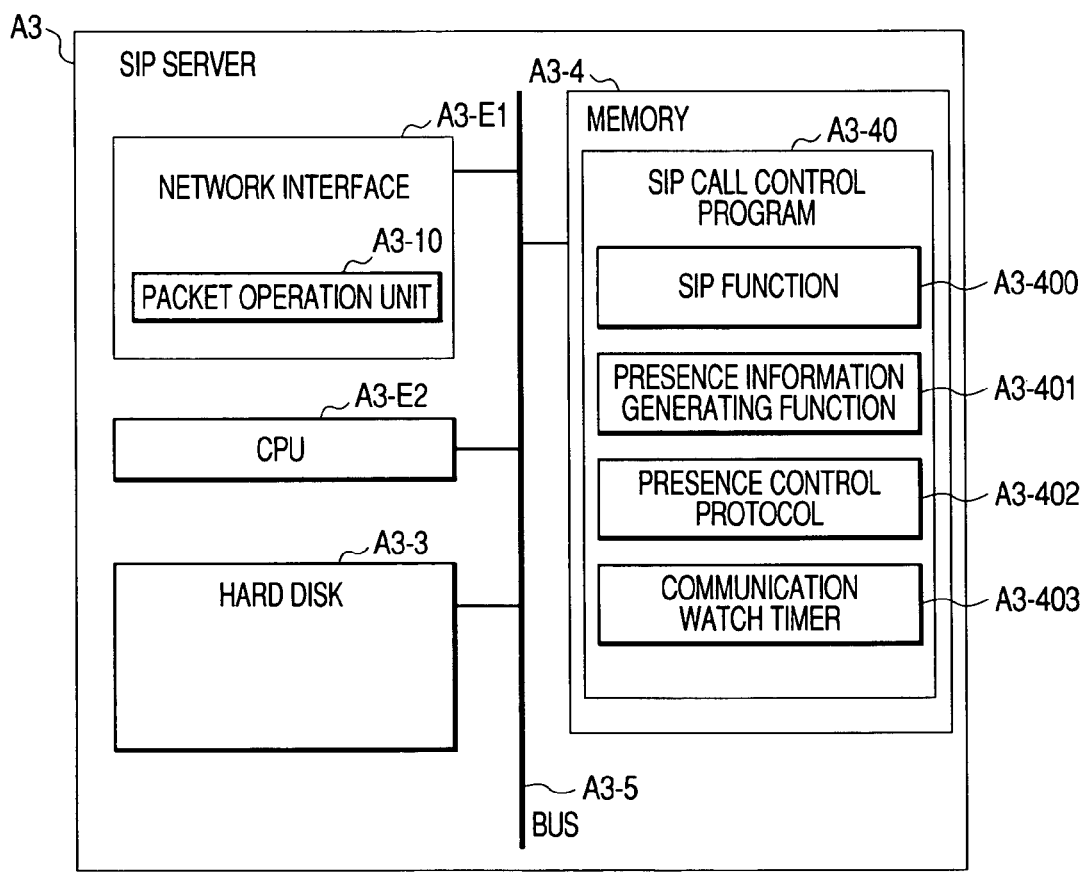
FIG. 47 is a functional block diagram of an SIP server.

FIG. 47 shows a functional block diagram of the SIP server A3. The SIP server A3 includes the following basic hardware components; a network interface A3-E1, a CPU A3-E2, a hard disk drive A3-3, a memory A3-4, and a bus A3-5. The network interface A3-E1 includes a packet operation unit A3-10 for receiving messages of the SIP and the presence control protocol. The SIP call processing program A3-40 stored in the memory A3-4 includes modules of an SIP processing part A3-400 for processing SIP messages, a presence information generation part A3-401 for calculating presence information from integrated session information, a presence control protocol A3-402 for controlling presence information, and a communication watch timer A3-403 for watching communication timeout errors.

Figure 48:
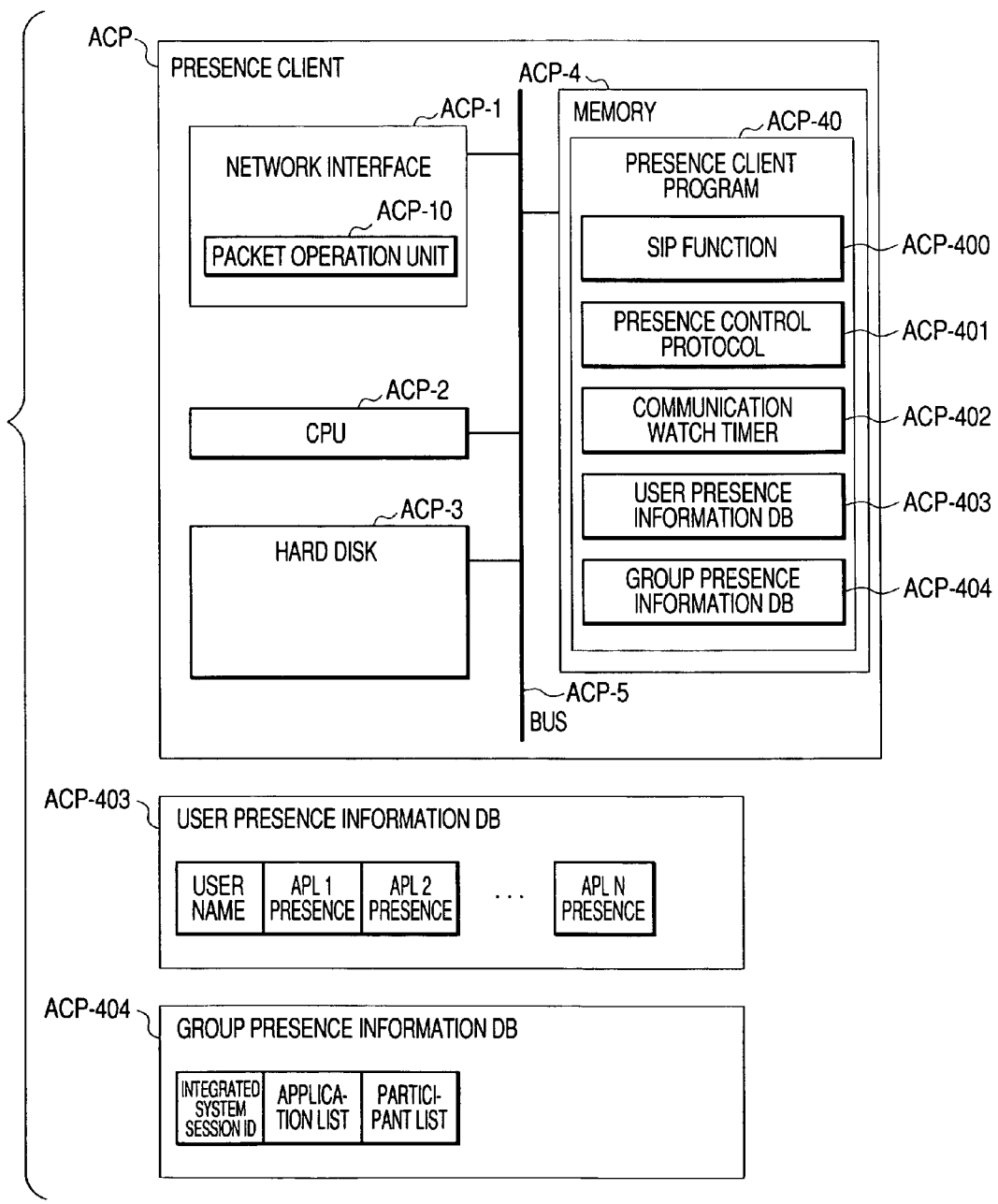
FIG. 48 is a functional block diagram of a presence client.

FIG. 48 shows a functional block diagram of the presence client ACP. The presence client ACP includes the following basic hardware components; a network interface ACP-1, a CPU ACP-1, a hard disk drive ACP-3, a memory ACP-4, and a bus ACP-5. The network interface ACP-1 includes a packet operation unit ACP-10 for receiving messages of the SIP and the presence control protocol. The presence client program ACP-40 stored in the memory ACP-4 includes modules of an SIP processing part ACP-400 for processing SIP messages, a presence control protocol ACP-401 for controlling presence information, a communication watch timer ACP-402 for watching communication timeout errors, a user presence information DB (ACP-403) for storing each user presence information, and a group presence information DB (ACP-404) for storing presence information of each group consisting of a plurality of users. The user present information DB (ACP-403) includes a list of user names, as well as a list of application presence information. The group presence information DB (ACP-404) includes integrated session IDs for identifying each group, respectively, a list of applications used by each group, a list of members of each group. Those DBs may be stored in the hard disk ACP-3 when the number of users increases excessively.

Figure 49:
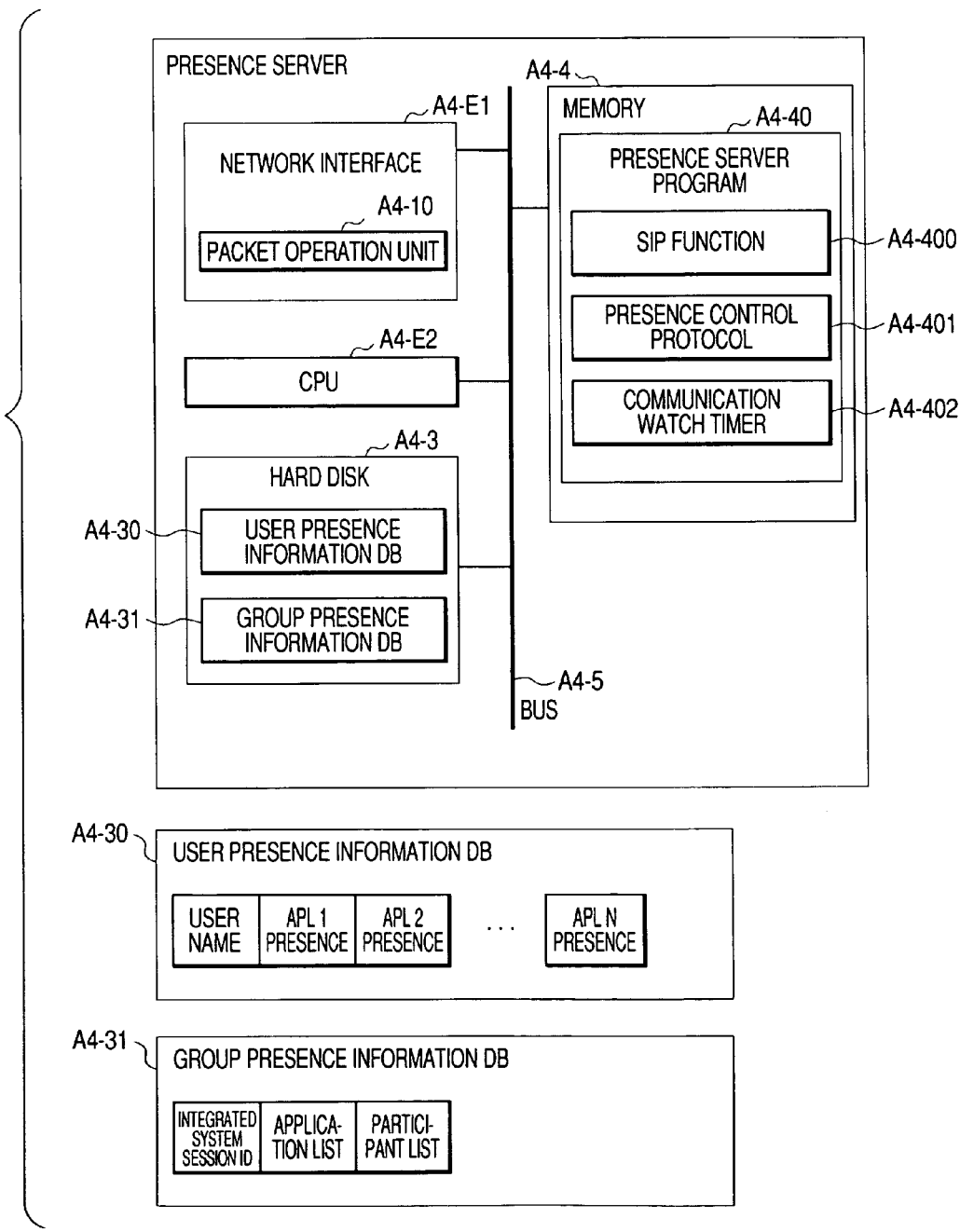
FIG. 49 is a functional block diagram of a presence server.

FIG. 49 shows a functional block diagram of the presence server A4. The presence server A4 includes the following basic hardware components; a network interface A4-E1, a CPU A4-E2, a hard disk drive A4-3, a memory A4-4, and a bus A4-5. The network interface A4-E1 includes a packet operation unit A4-10 for receiving messages of the SIP and the presence control protocol. The presence server program A4-40 stored in the memory A4-4 includes modules of an SIP processing part A4-400 for processing SIP messages, a presence control protocol A4-401 for controlling presence information, a communication watch timer A4-402 for watching communication timeout errors. The hard disk drive A4-3 includes a user presence information DB (A4-30) for storing each user presence information item, and a group presence information DB (A4-31) for storing presence information of each group consisting of a plurality of users. The user present information DB (ACP-403) includes a list of user names, as well as a list of application presence information. The group presence information DB (ACP-404) includes integrated session IDs for identifying each group, respectively, a list of applications used by each group, a list of members of each group. Those DBs may be stored in the memory A4-4 when the number of users is not large.

Figure 50:
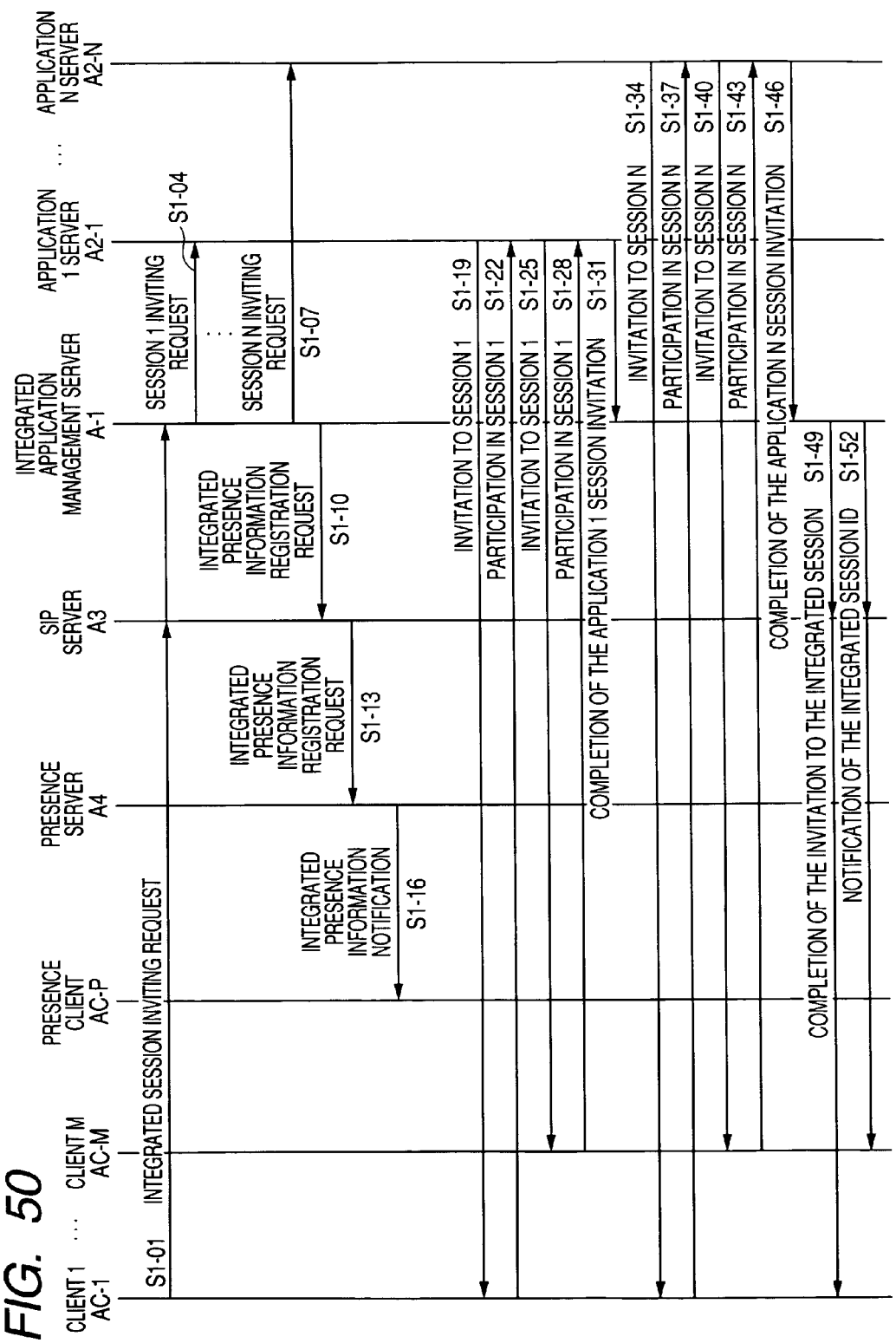
FIG. 50 is a sequence 1 at the time of starting an integrated session.

Next, a detailed sequence of presence management will be described. FIG. 50 shows a sequence in which the integrated application management server A1 registers presence information in an integrated session inviting operation. At first, the client (AC-1) sends an integrated session inviting request to the integrated application management server A1 through the SIP server A3 (S1-01). Receiving the session inviting request, the integrated application management server A1 analyzes the contents of the session and sends a session inviting request to the application servers A2-1 to A2-N under its control (S1-04, 07). At that time, the integrated application management server A1 obtains the subject integrated presence information from the integrated session inviting request information and sends an integrated presence information registration request to the presence server A4 through the SIP server A3 (S1-10, 13). The contents of the registered integrated presence information are shown in APF-01 in FIG. 64. Concretely, the integrated presence information registration request includes elements of originating address, destination address, packet type (integrated presence information registration request), integrated session ID, user name, list of applications, and list of application presence information. This request message is sent to each user specified in the integrated session inviting request. Receiving such an integrated presence information registration request, the presence server A4 analyzes the contents of the message and stores each user presence information item in the user presence information DB. After that, the presence server A4 obtains group presence information consisting of a group of users having the same integrated session ID in the presence information, then stores an integrated session ID, a list of applications, and a list of participants in the group presence information DB. Ending storing of such presence information in each DB, the presence server A4 sends an integrated presence information notice to the presence client AC-P to notify the users of the updated presence information (S1-16). The contents of the integrated presence information notice are shown in APF-03 in FIG. 64. Concretely, the integrated presence information notice includes elements of originating address, destination address, message type (integrated presence information notice), integrated session ID, user name, list of applications, and list of application presence information. Hereinafter, the processings between session 1 inviting (S1-19) and integrated session ID notification (S1-52) are the same as those between session 1 inviting (529-1) and integrated session ID notification (S36-M) shown in FIG. 10.

Figure 51:
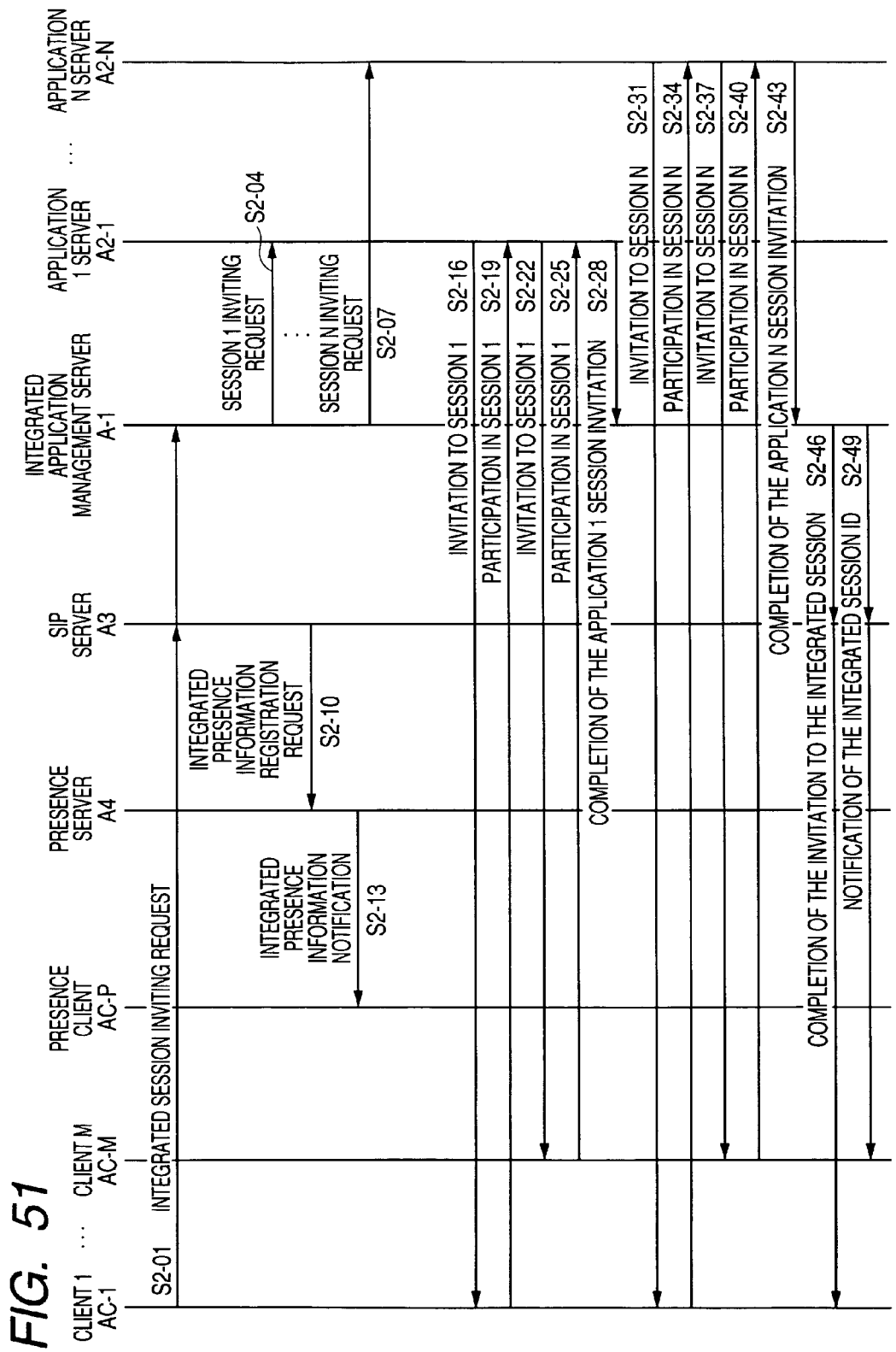
FIG. 51 is a sequence 2 at the time of starting an integrated session.

FIG. 51 shows a sequence in which the SIP server registers presence information in an integrated session inviting operation. At first, the client 1 (AC-1) sends a session inviting request to the integrated application management server A1 through the SIP server A3 (S2-01). Receiving the request, the integrated application management server A1 analyzes the contents of the request message and sends a session inviting request to the application servers A2-1 to A2-N under its control (S2-04, 07). At the same time, the SIP server A3 obtains the subject integrated presence information from the integrated session inviting request information, then sends an integrated presence information registration request to the presence server A4 (S2-10). This message is sent to each user specified in the integrated session inviting request. Receiving the request, the presence server A4 analyzes the contents of the message and stores each user presence information item in the user presence information DB. After that, the presence server A4 obtains a group of users having the same integrated session ID included in their presence information, then stores group presence information consisting of elements of integrated session ID, list of applications, and list of group members in the group presence information DB. Ending the storing of the presence information in each DB, the presence server A4 sends an integrated presence information notice to the presence client AC-P to notify the users of the updated presence information (S2-13). Hereinafter, the processings between session 1 inviting (S2-16) and integrated session ID notification (S2-49) are the same as those between the session 1 inviting (S29-1) and the integrated session ID notification (S36-M) shown in FIG. 10.

Figure 52:
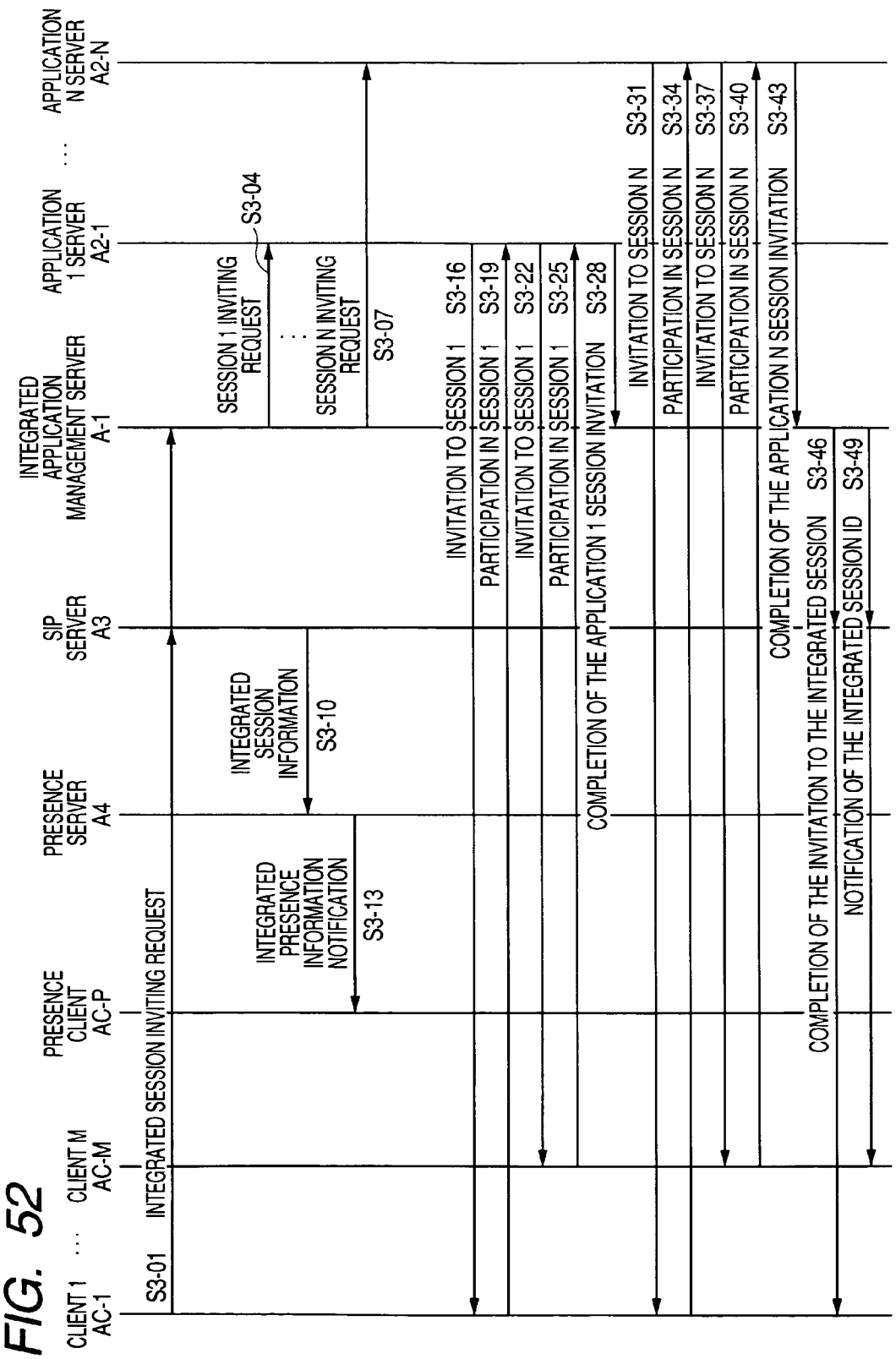
FIG. 52 is a sequence 3 at the time of starting an integrated session.

FIG. 52 shows a sequence in which the presence server generates presence information in an integrated session inviting operation. At first, the client 1 (AC-1) sends an integrated session inviting request to the integrated application management server A1 through the SIP server A3 (S3-01). Receiving the request, the integrated application management server A1 analyzes the contents of the request message and sends an integrated session inviting request to the application servers A2-1 to A2-N under its control (S3-04, 07). At the same time, the SIP server A3 extracts the subject integrated session information from the integrated session inviting request information, then sends the extracted information to the presence server A4 (S3-10). The contents of the integrated session information are shown in APF-05 in FIG. 64. The integrated session information includes elements of originating address, destination address, message type (integrated session information), integrated session ID, user name, list of applications, and integrated session processing type. The integrated session processing type denotes that the subject integrated session processing is any of inviting, adding, exiting, and ending operations. The presence server A4, when receiving such integrated session information, analyzes the contents of the message to obtain the subject presence information, then stores each user presence information in the user presence information DB. After that, the presence server A4 obtains the group of users having the same integrated session ID included in their presence information. The presence server A4 then stores the group presence information consisting of elements of integrated session ID, list of applications, and list of the group members in the group presence information DB. Ending the storing of the presence information in each DB, the presence server A4 sends an integrated presence information notification to the presence client AC-P to notify the users of the updated presence information (S3-13). Hereinafter, the processings between session 1 inviting (S3-16) and integrated session ID notification (S36-49) are the same as those between session1 inviting (S29-1) and integrated session ID notification (S36-M) shown in FIG. 10.

Figure 53:
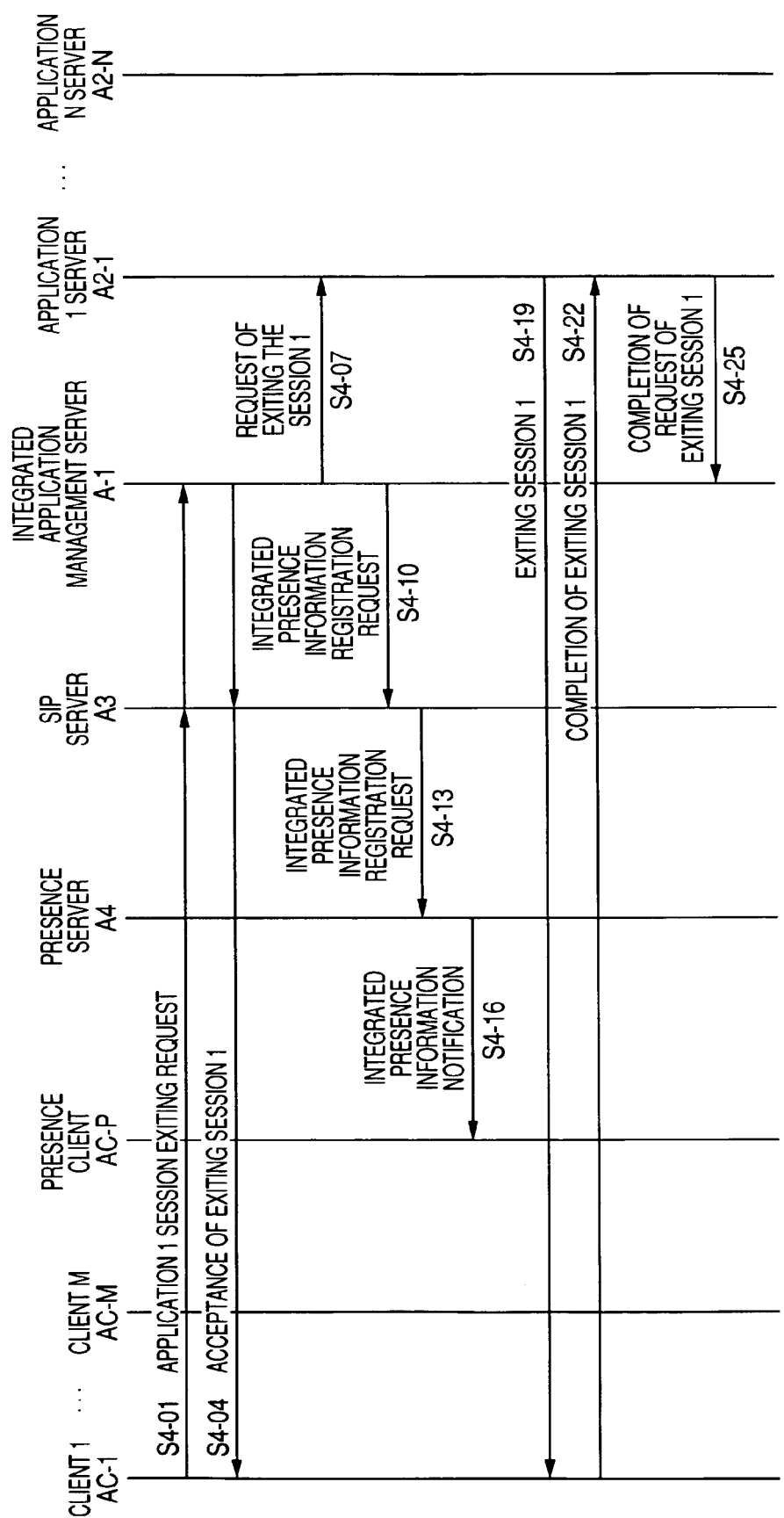
FIG. 53 is a sequence 1 at the time of exiting an application session.

FIG. 53 shows a sequence in which the integrated application management server A1 registers presence information in an application session exiting operation. At first, the client 1 (AC-1) sends an APL1 session exiting request to the integrated application management server A1 through the SIP server A3 (S4-01). Receiving the request, the integrated application management server A1 analyzes the contents of the request message and sends an APL1 session exiting request to the application server A2-1 (S4-04, 07). At that time, the integrated application management server A1 also obtains the subject integrated presence information from the APL1 session exiting request information, then sends an integrated presence information registration request message to the presence server A4 through the SIP server A3 (S4-10, 13). This message is sent to each user specified in the APL1 session exiting request. Receiving the registration request message, the presence server A4 analyzes the contents of the message and stores each user presence information item in the user presence information DB. After that, the presence server A4 obtains the group of users having the same integrated session ID included in their presence information, then stores the group presence information consisting of elements of integrated session ID, list of applications, and list of group members in the group presence information DB. Ending the storing of the presence information in each DB, the presence server A4 sends an integrated presence information notification to the presence client AC-P to notify the users of the updated presence information (S4-16). Hereinafter, the processings between session 1 exiting (S4-25) and session 1 exiting completion notification (S4-245) are the same as those between the session 1 exiting (S54-1) and the session 1 exiting completion notification (S56-1) shown in FIG. 12.

Figure 54:
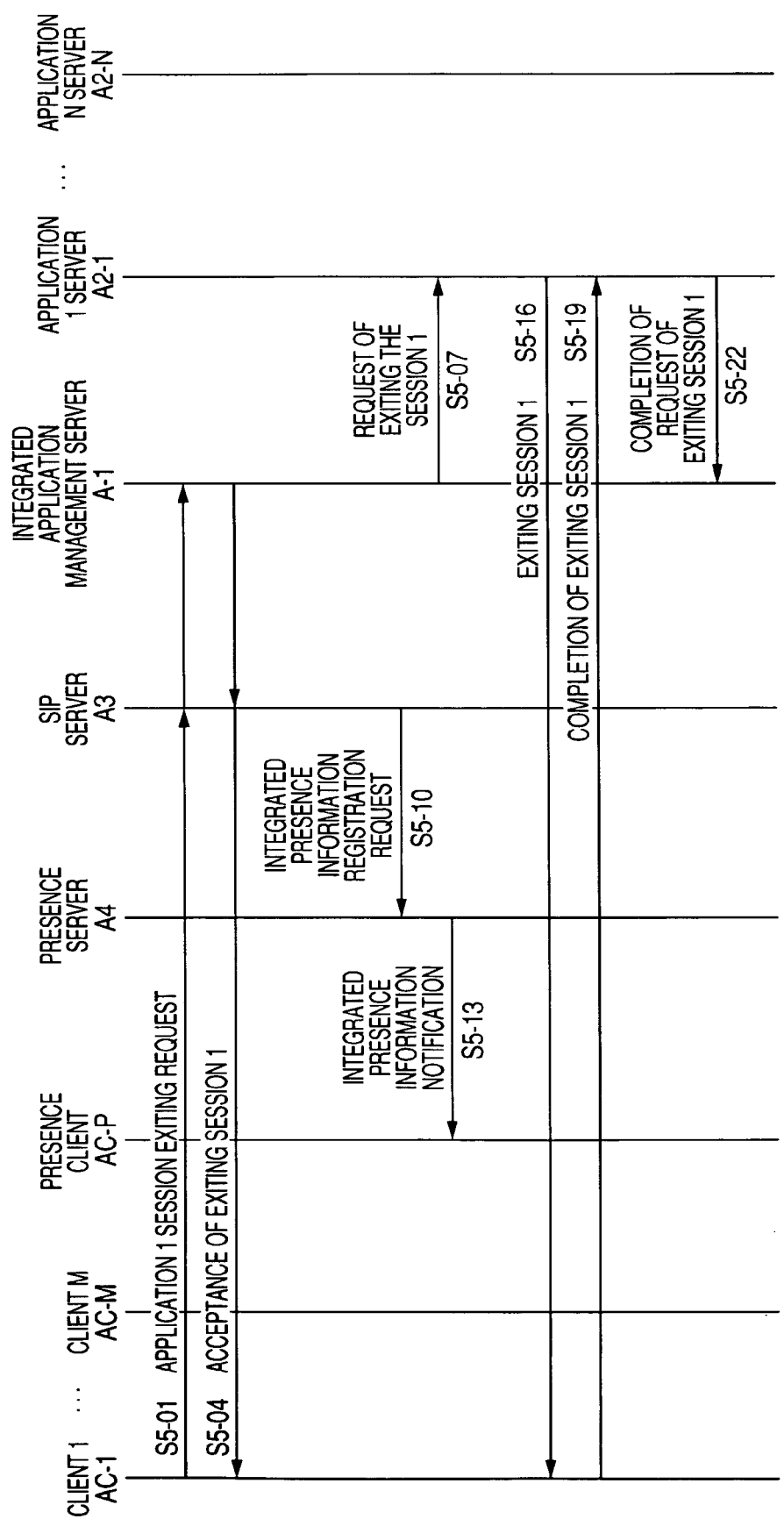
FIG. 54 is a sequence 2 at the time of exiting an application session.

FIG. 54 shows a sequence in which the SIP server registers presence information in an application session exiting operation. At first, the client 1 (AC-1) sends an APL1 session exiting request to the integrated application management server A1 through the SIP server A3 (S5-01). Receiving the request, the integrated application management server A1 analyzes the contents of the request message and sends an APL1 session exiting request acceptance message to the client 1 (AC-1) and a session 1 exiting request to the application 1 server A2-1 (S5-04, 07), respectively. At the same time, the SIP server A3 obtains the subject presence information from the APL1 session exiting request, then sends an integrated presence information registration request message to the presence server A4 (S5-10). This message is sent to each user specified in the APL1 session exiting request. Receiving the message, the presence server A4 analyzes the contents of the message and stores each user presence information item in the user presence information DB. After that, the presence server A4 obtains the group of users having the same integrated session ID included in the presence information, then stores the group presence information consisting of elements of integrated session ID, list of applications, and list of group members in the group presence information DB. Ending the storing of the presence information in each DB, the presence server A4 sends an integrated presence information notification to the presence client AC-P to notify the users of the updated presence information (S5-13). Hereinafter, the processings between session 1 exiting (S5-16) and session 1 exiting completion notification (S5-22) are the same as those between the session 1 exiting (S54-1) and the session 1 exiting completion notification (S56-1) shown in FIG. 12.

Figure 55:
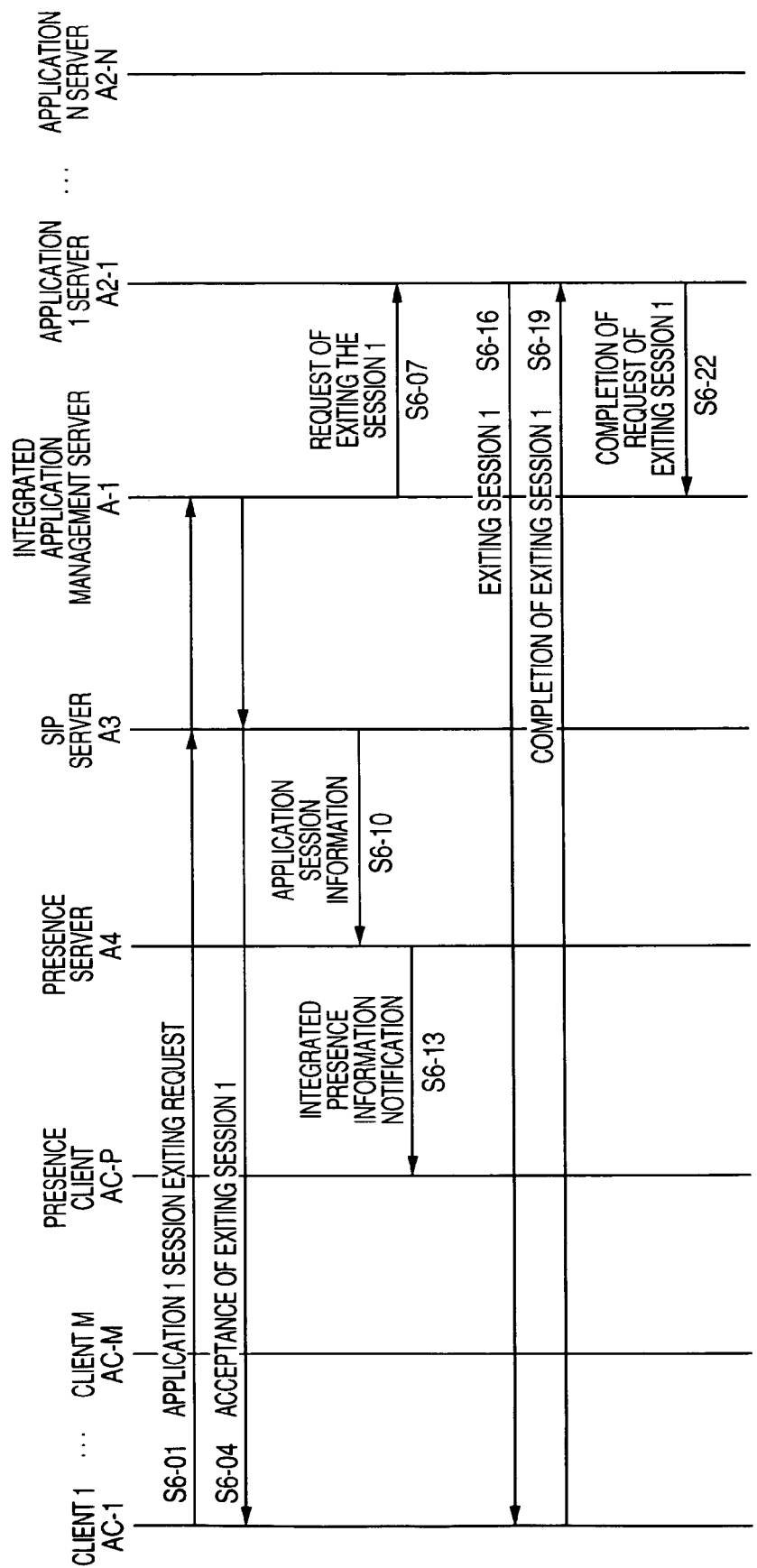
FIG. 55 is a sequence 3 at the time of exiting an application session.

FIG. 55 shows a sequence in which the presence server generates presence information in an application session exiting operation. At first, the client 1 (AC-1) sends an APL1 session exiting request to the integrated application management server A1 through the SIP server A3 (S6-01). Receiving the request, the integrated application management server A1 analyzes the contents of the request message and sends an APL1 session exiting acceptance message to the client 1 (AC-1) and a session 1 exiting request to the application 1 server A2-1 (S6-04, 07), respectively. At the same time, the SIP server A3 obtains the subject integrated session information from the APL1 session exiting request, then sends the obtained information to the presence server A4 (S6-10). Receiving the information, the presence server A4 analyzes the contents of the message and stores each user presence information item in the user presence information DB. After that, the presence server A4 obtains the group of users having the same integrated session ID included in the presence information, then stores the group presence information consisting of elements of integrated session ID, list of applications, and list of group members in the group presence information DB. Ending the storing of the presence information in each DB, the presence server A4 sends an integrated presence information notification to the presence client AC-P to notify the users of the updated presence information (S6-13). Hereinafter, the processings between session 1 exiting (S6-16) and session 1 exiting completion notification (S6-22) are the same as those between the session 1 exiting (S54-1) and the session 1 exiting completion notification (S56-1) shown in FIG. 12.

Figure 56:
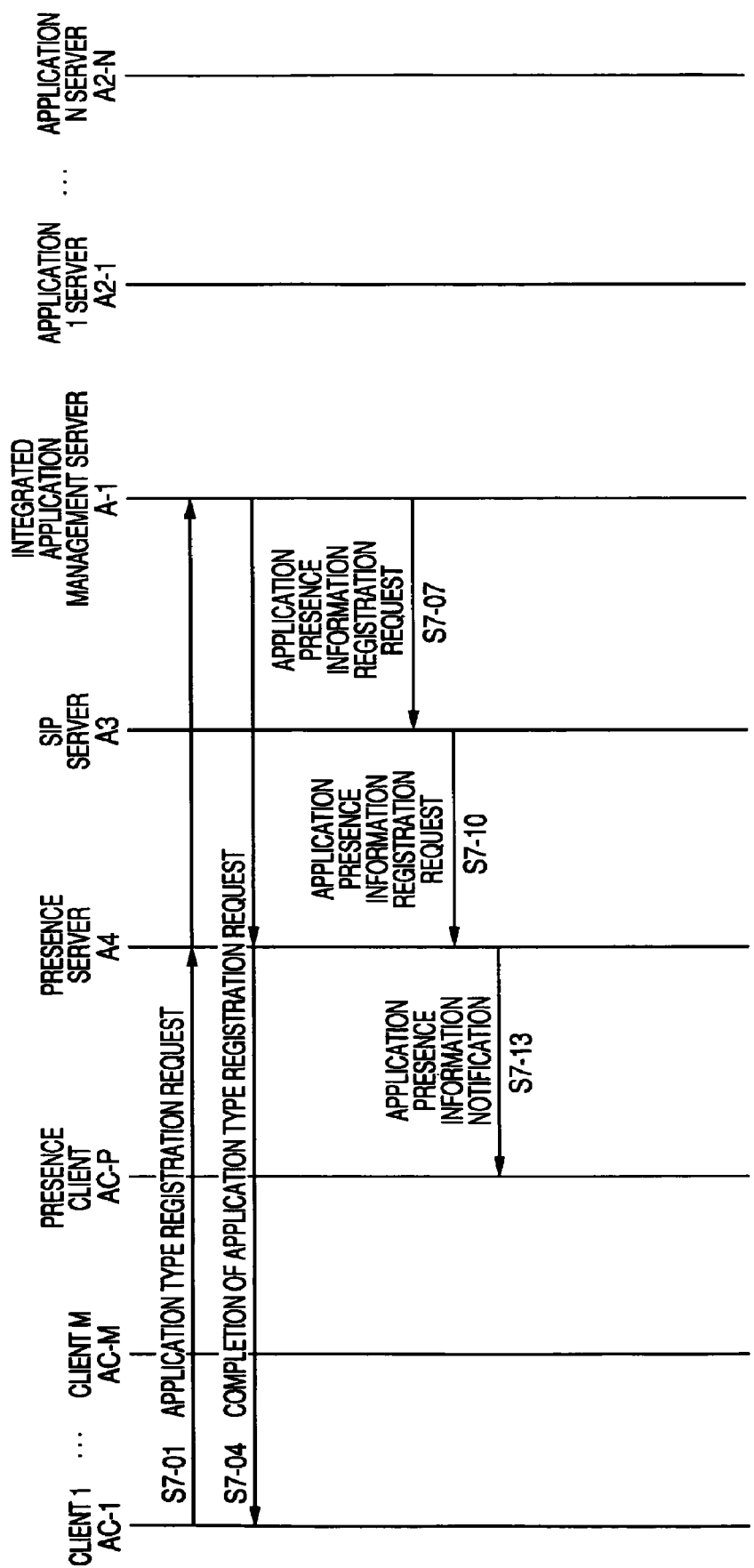
FIG. 56 is a sequence at the time of registering an application type.

FIG. 56 shows a sequence in which a user registers a new application type. At first, the user sends an APL type registering request to the integrated application management server A1 through the client 1 (AC-1) (S7-01). The contents of the APL type registering request are shown in APF-15 in FIG. 64. The APL type registering request includes elements of originating address, destination address, packet type (APL type registering request), integrated session ID, user name, list of applications to be added, and list of respective application accounts. Receiving the request, the integrated application management server A1 returns an APL type registration completion message to the client 1 (AC-1) (S7-04). The contents of the APL type registration completion message are shown in APF17 in FIG. 64. Concretely, the APL type registration completion message includes elements of originating address, destination address, packet type (APL type registration completion message), integrated session ID, and response code. At that time, the integrated application management server A1 also sends an APL presence information registration request message to the object through the SIP server A3 to notify the presence server of the newly added application (S7-07, 10). The contents of the APL presence information registration request message are shown in APF-07 in FIG. 64. Concretely, the APL presence information registration request message includes elements of originating address, destination address, packet type (APL presence information registration request), user name, list of applications, and list of presence information. Receiving the request message, the presence server A4 analyzes the contents of the message and stores each user presence information item in the user presence information DB. Ending the storing of the presence information in each DB, the presence server A4 sends an APL presence information notification to the presence client AC-P to notify the users of the updated presence information (S7-13), respectively. The contents of the APL presence information registration request message are shown in APF-09 in FIG. 64. Concretely, the APL presence information registration request message includes elements of originating address, destination address, packet type (APL presence type notice), user name, list of applications, and list of presence information.

Figure 57:
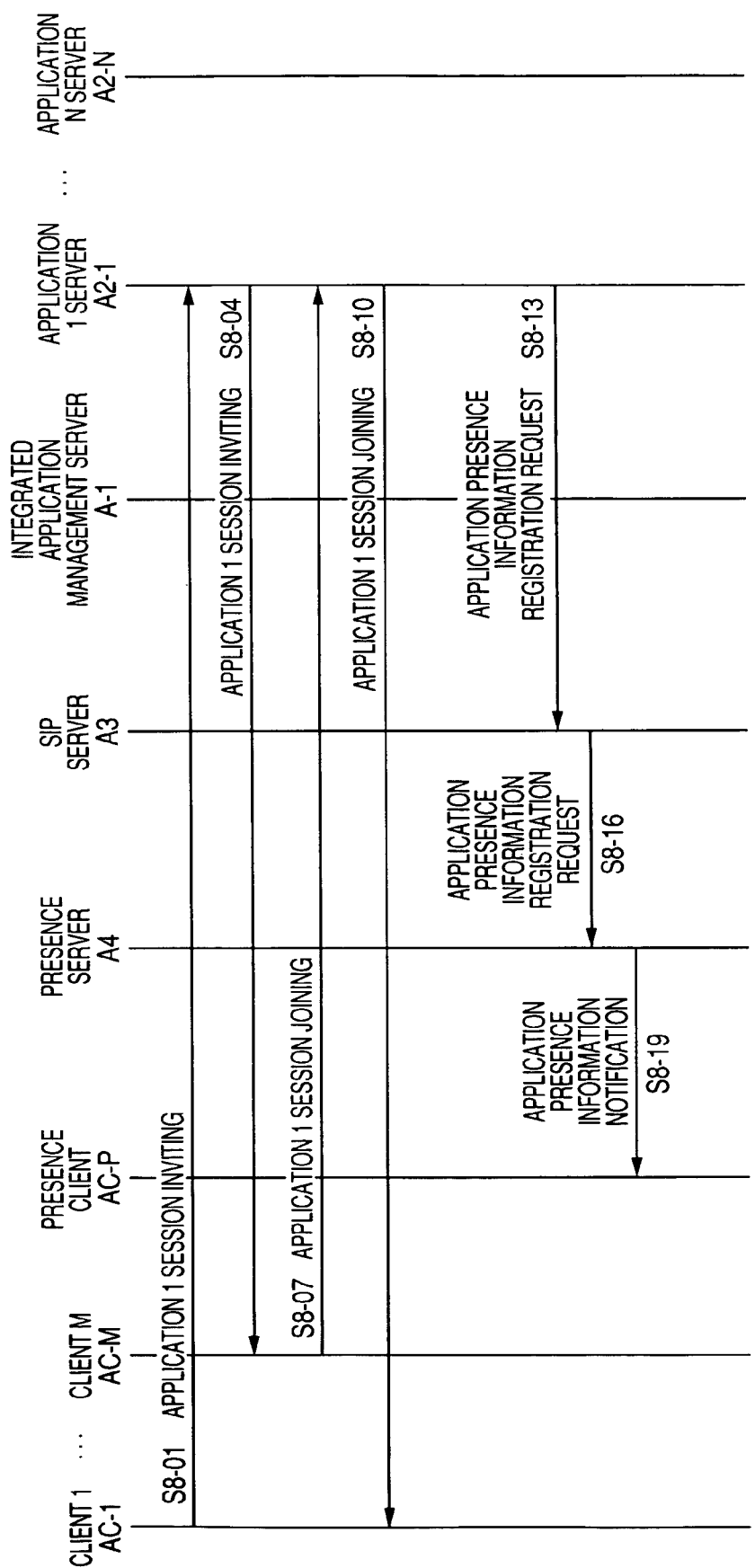
FIG. 57 is a sequence at the time of inviting an application session independently.

FIG. 57 shows a detailed sequence in which an application session is started independently. In this sequence, an application client requests an application server for session inviting directly, so that the message is not passed through any of the integrated application management server A1 and the SIP server A3. Consequently, the application server comes to register the subject presence information. At first, the client 1 (AC-1) sends an APL1 session inviting request to the application 1 server A2-1 (S8-01). The application 1 server A2-1 then identifies that the message is addressed to the client M (AC-M), then transfers the message to the client M (AC-M) (S8-04). Receiving the inviting request, the client M (AC-M) returns a notice of participation in the APL1 session to the client 1 (AC-1) through the application 1 server A2-1 (S8-07, 10). The application 1 server A2-1, after transferring the inviting request and the participating notice, obtains the subject presence information from the session processing status, then sends an APL presence information registration request to the presence server A4 through the SIP server A3 (S8-13, 16). If an application session is controlled independently in that case, the application has no relationship with any integrated session. The subject presence information is thus registered as APL presence information registration. Receiving the APL presence information registration request, the presence server A4 analyzes the contents of the request message, then stores each user presence information item in the user presence information DB. Ending the storing of the presence information in each DB, the presence server A4 sends an APL presence information notice to the presence client AC-P to notify the user of the updated presence information (S8-19).

Figure 58:
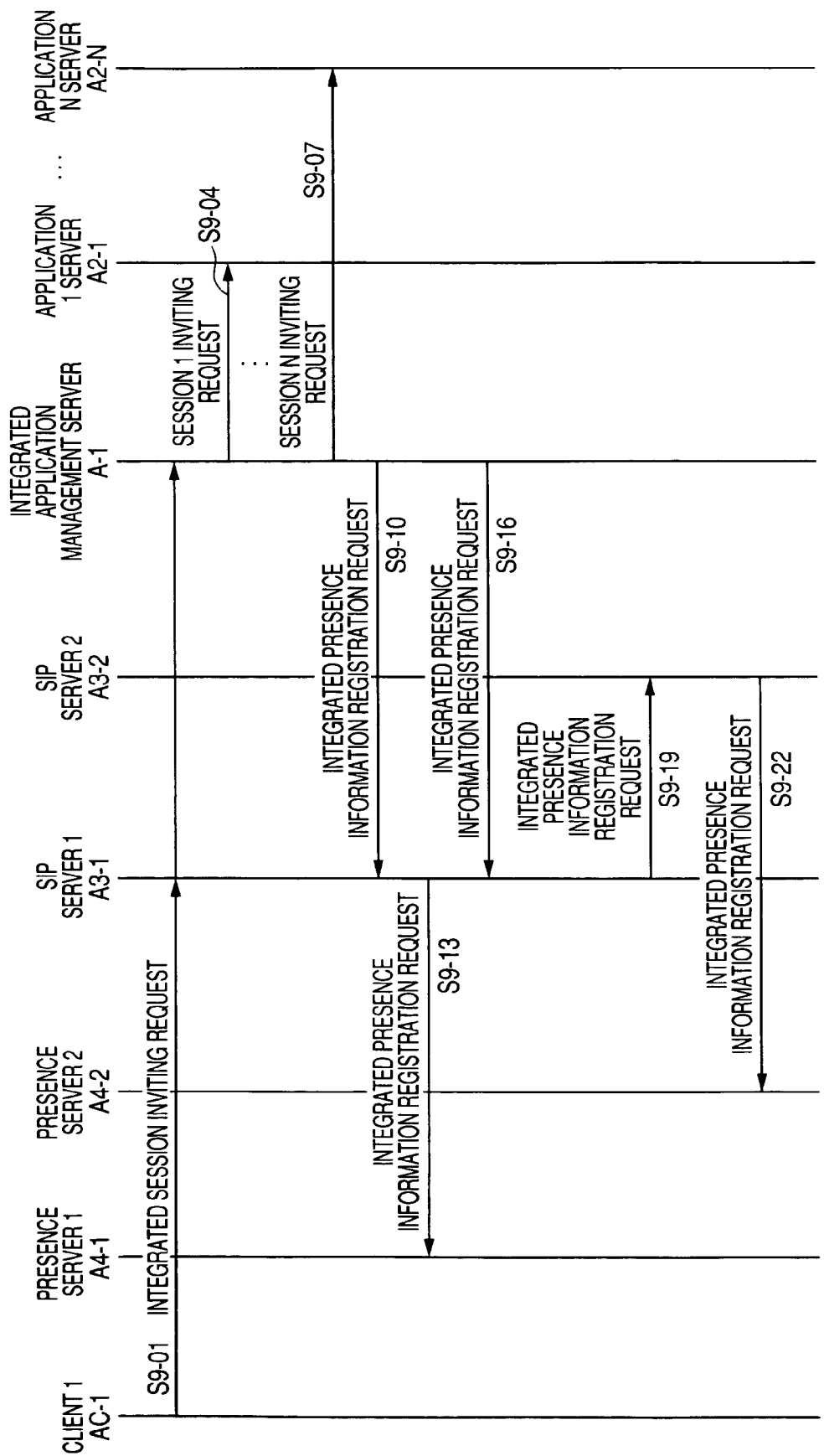
FIG. 58 is a sequence at the time of starting an integrated session over a plurality of domains.

FIG. 58 shows a detailed sequence in which subject presence information is notified to a plurality of presence servers in their domains at the starting time of an integrated session. In this case, the processings between an integrated session inviting request from the client 1 (AC-1) (S9-01) and a session inviting request to each application server (S9-04, 07) are the same as those S1-01 to S1-07 shown in FIG. 50. At first, the integrated application management server A1 sends an integrated presence information registration request message to each object server through the SIP server A3-1 in the domain 1. At that time, the SIP server A3-1 also transfers the request message to the presence server A4-1 in the domain 1 directly (S9-10, 13). The SIP server A3-1 in the domain 1 cannot transfer the message directly to the presence server A4-2 in the domain 2. However, because the destination SIP-URL is in the domain 2, the SIP server A3-1 transfers the message to the SIP server A3-2 that manages the domain (S9-16, 19). Receiving the integrated presence information registration request message from the SIP server A3-1 in the domain 1, the SIP server A3-2 in the domain 2 identifies that the message is addressed to its own domain, then transfers the message to the presence server A4-2 in the domain 2 (S9-22).

Figure 59:
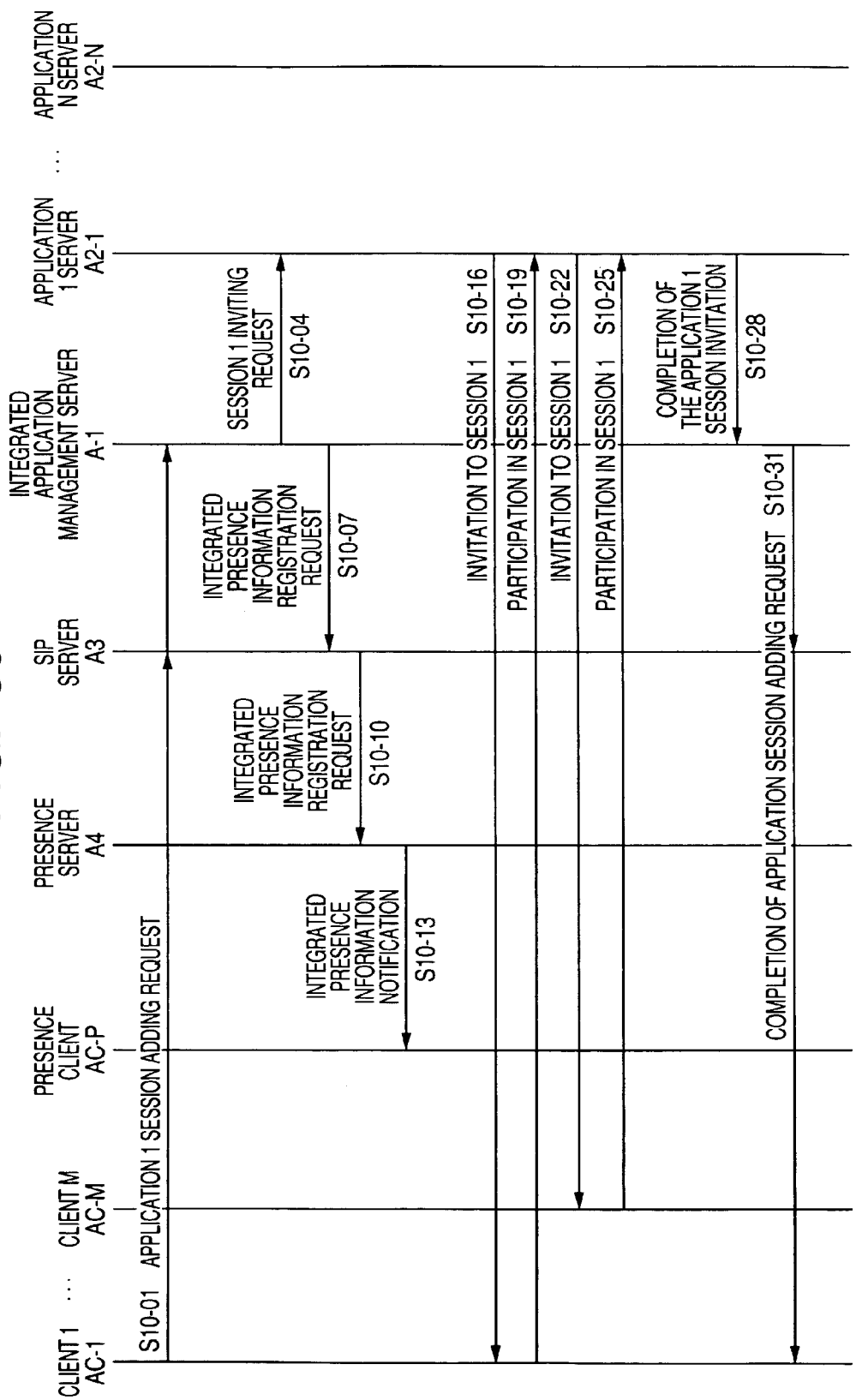
FIG. 59 is a sequence at the time of adding an application session.

FIG. 59 shows a detailed sequence in which an application session is added during an integrated session. At first, the client 1 (AC-1) sends an APL1 session adding request to the integrated application management server A1 through the SIP server A3 (S10-01). The contents of the APL session adding request are shown in SPF-11 in FIG. 64. Concretely, this APL session addition request includes elements of originating address, destination address, packet type (APL session adding request), integrated session ID, list of session participants, list of added application sessions, and list of added application types. The reason why the integrated session ID is included in the request is to specify an integrated application among the existing ones, to which an application is to be added. Receiving the APL1 session addition request, the integrated application management server A1 analyzes the contents of the message and sends a session inviting request to the application server A2-1 (S10-04). At that time, the integrated application management server A1 also obtains the subject integrated presence information from the information included in the integrated session inviting request, then sends an integrated presence information registration request message to the presence server A4 through the SIP server A3 (S10-07, 10). This message is sent to each user specified in the integrated session inviting request. Receiving the registration request message, the presence server A4 analyzes the contents of the message and stores each user presence information item in the user presence information DB.

After that, the presence server A4 obtains the group of users having the same integrated session ID included in the subject presence information, then stores the group presence information consisting of elements of integrated session ID, list of applications, and list of group members in the group presence information DB. Ending the storing of the presence information in each DB, the presence server A4 sends an integrated presence information notice to the presence client AC-P to notify the users of the updated presence information (S10-13), respectively. Hereinafter, the processings between session 1 inviting (S10-16) and session 1 inviting completion (S10-28) are the same as those between session 1 inviting (S1-19) and session 1 inviting completion (S1-31) shown in FIG. 50. Finally, the integrated application management server A1 sends an APL1 session adding completion notice to the client 1 (AC-1) (S10-31). The contents of the APL session adding completion notice are shown in APF-13 in FIG. 64. Concretely, the APL session addition completion notice includes elements of originating address, destination address, packet type (APL session addition completion notice), integrated session ID, and response code.

Figure 60:
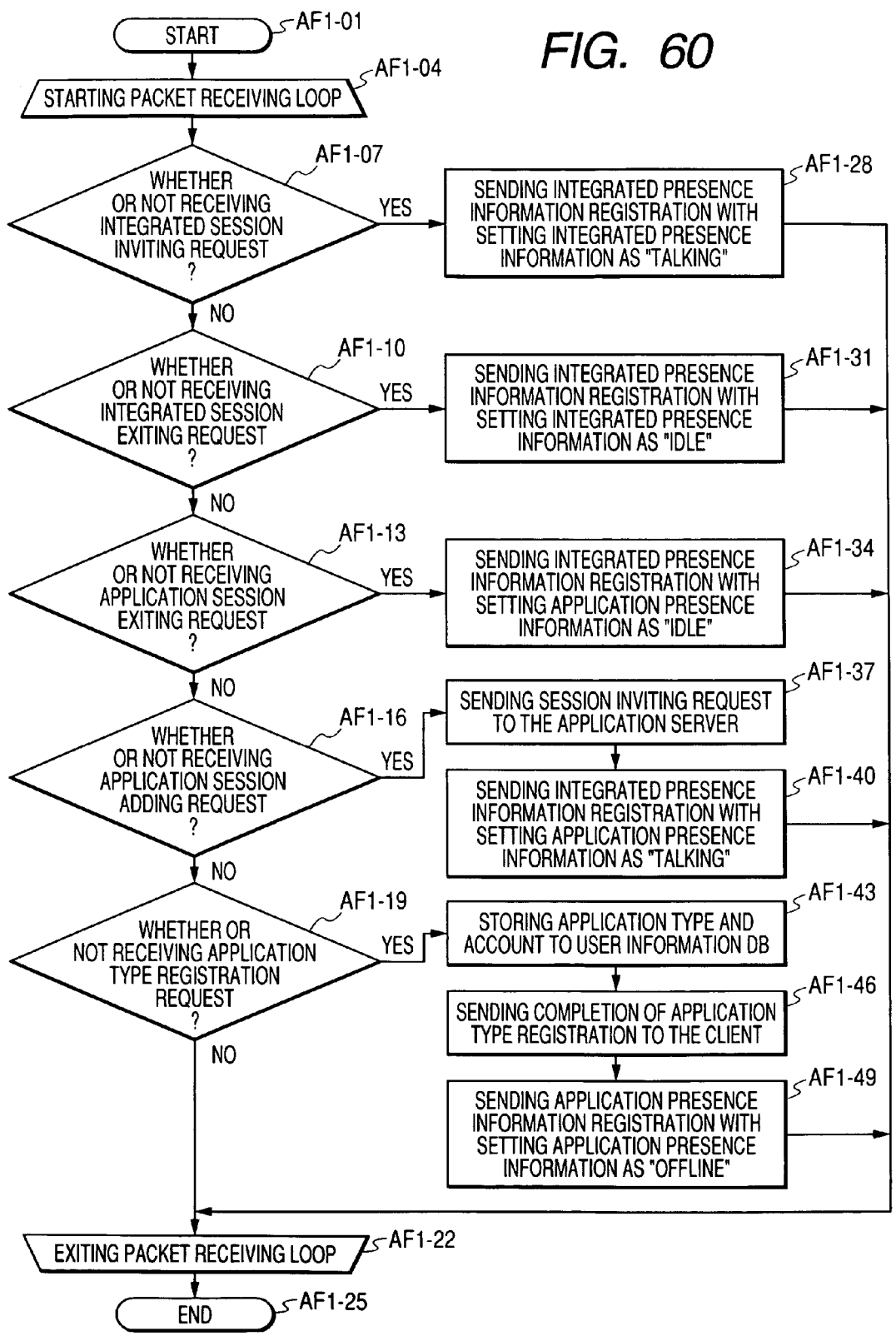
FIG. 60 is a flowchart of operations of the presence registering functions of the integrated application management server.

Next, a description will be made for a flowchart of operations of each server in a presence information management operation under the control of an integrated session. FIG. 60 shows a flowchart of operations of an integrated application management server. The management server is initialized when it is started up to start a packet receiving loop (AF1-01, 04). If the management server receives an integrated session inviting request in the packet receiving loop (AF1-07), sets the status of "talking" for the presence information of the integrated session of each user included in the inviting request, then sends an integrated presence information registration request to the SIP server (AF1-28). If the management server receives an integrated session exiting request in the loop (AF1-10), the management server sets the status of "idle (waiting)" for the presence information of the integrated session of each user included in the integrated session exiting request, then sends an integrated presence information registration request to the SIP server (AF1-31). If the management server receives an APL session exiting request in the loop (AF1-13), the management server sets the status of "idle (waiting)" for the application state of each user included in the APL session exiting request, then sends an integrated presence information registration request to the SIP server (AF1-34). If the management server receives an APL session addition request in the loop (AF1-16), the management server sends a session inviting request to the application server to which an application session is to be added (AF1-37), then sets the status of "talking" for the application state of each user included in the APL session addition request and sends an integrated presence information registration request to the SIP server (AF1-40). If the management server receives an APL type registration request in the loop (AF1-19), the management server adds an application session and an application account to the user information DB, respectively (AF1-43), then returns an APL type registration completion notice to the client (AF1-46).

After that, the management server sets the status of "offline" for the presence information of the added application session, then sends an APL presence information registration request to the SIP server (AF1-49). The packet receiving loop is closed when the management server is shut down (AF1-22). The management server thus stops the packet receiving loop, then stops its own functions (AF1-25).

Figure 61:
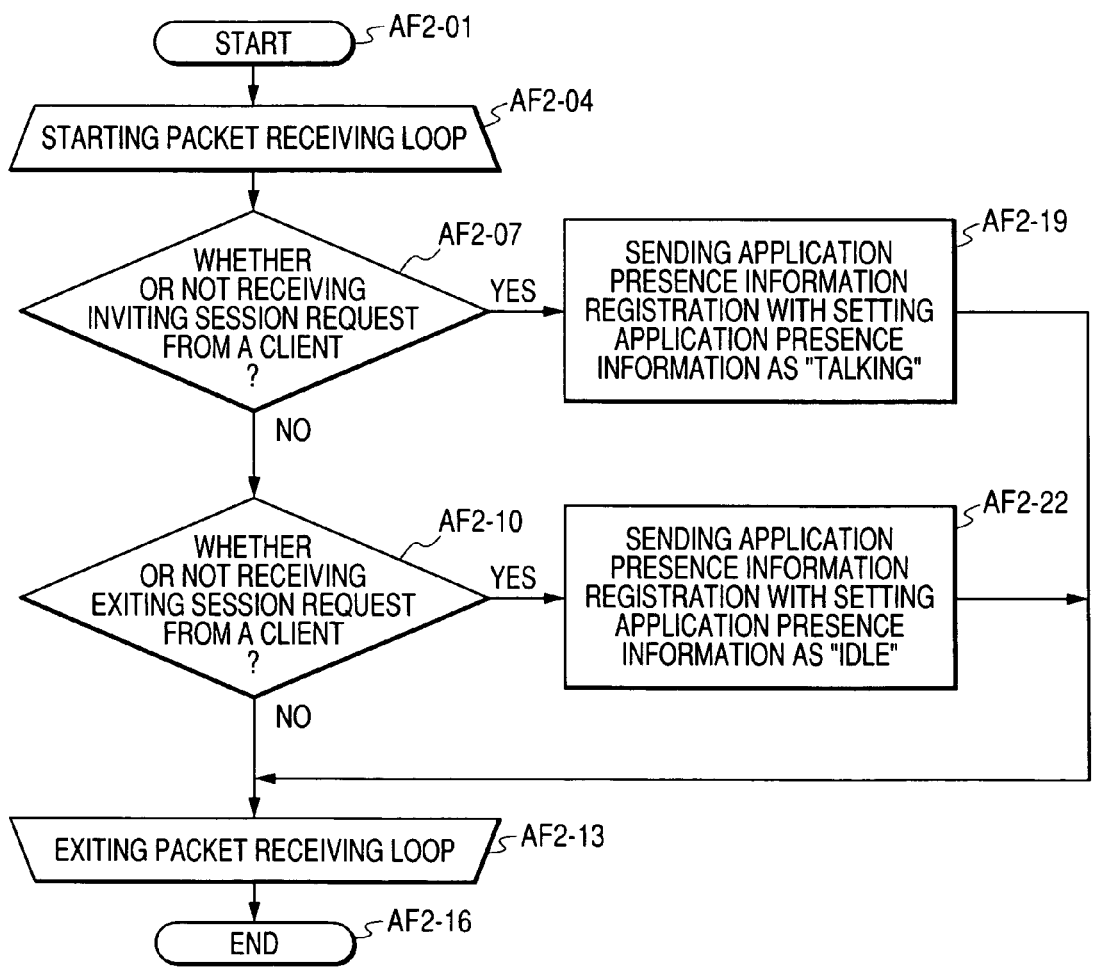
FIG. 61 is a flowchart of operations of the presence registering functions of the application server.

FIG. 61 shows a flowchart of operations of an application server. The application server is initialized when it is started up to start a packet receiving loop (AF2-01, 04). If the application server receives a session inviting request from a client in the packet receiving loop (AF2-07), the application server sets the status of "talking" for the application of each user included in the session inviting request, then sends an APL presence information registration request to the SIP server (AF2-19). If the application server receives a session ending notice from the client (AF2-10), the application server sets the status of "idle" for the application of each user included in the session inviting request, then sends an APL presence information registration request to the SIP server (AF2-22). The packet receiving loop operation is closed when the application server is shut down (AF2-13). The application server thus stops the packet receiving loop, then stops its functions (AF2-16).

Figure 62:
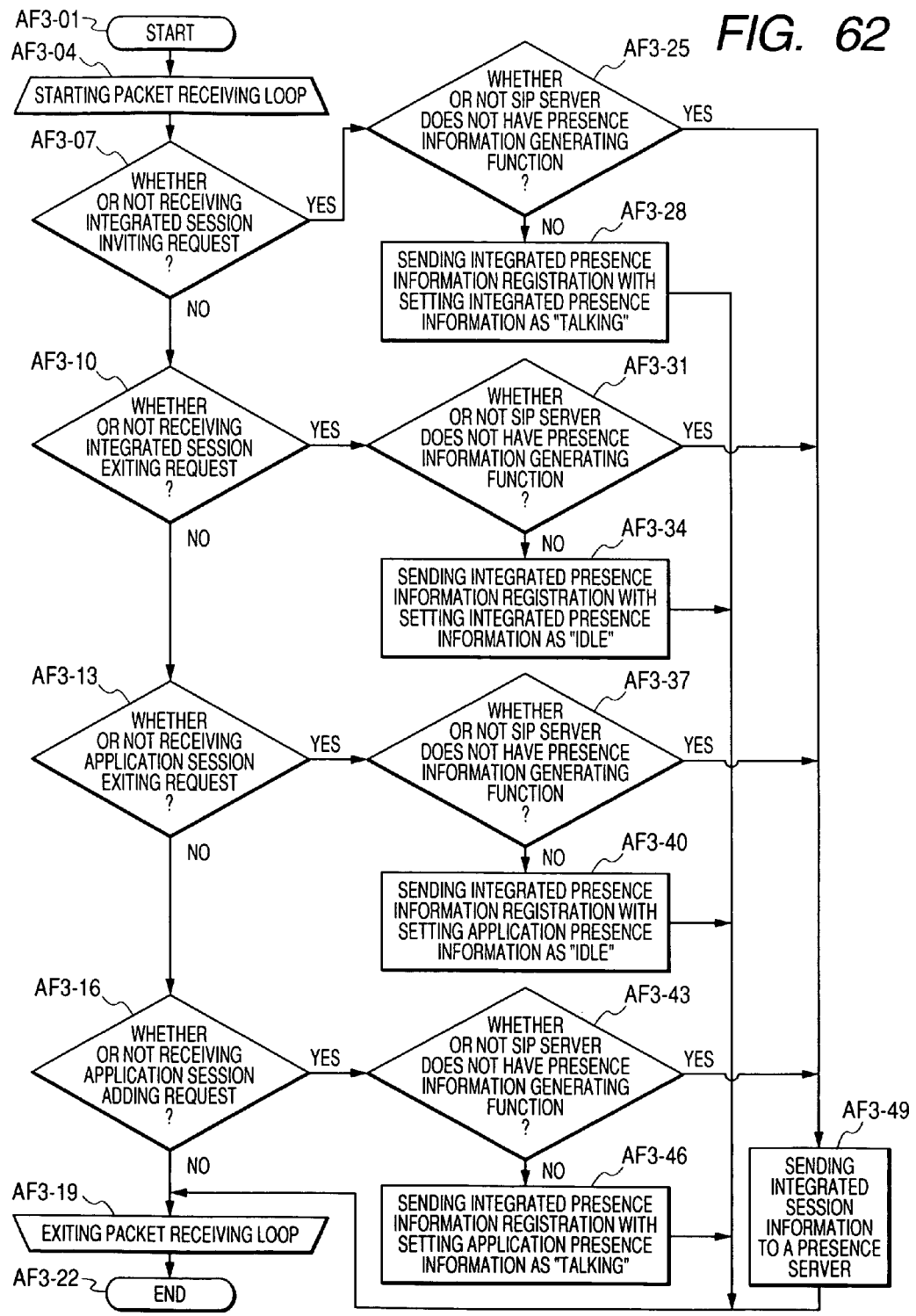
FIG. 62 is a flowchart of operations of an SIP server.

FIG. 62 shows a flowchart of operations of the SIP server. The SIP server is initialized when it is started up to start a packet receiving loop (AF3-01, 04). The SIP server operations are classified roughly into two types according to whether or not the server has functions for generating presence information. At first, a description will be made for the operation of the SIP server having the functions for generating presence information. If the SIP server receives an integrated session inviting request in the packet receiving loop (AF3-07), the SIP server sets the status of "talking" for the presence information of the integrated session of each user included in the integrated session inviting request, then sends an integrated presence information registration request to the presence server (AF3-28). If the SIP server receives an integrated session exiting request in the packet receiving loop (AF3-10), the SIP server sets the status of "idle" for the presence information of the integrated session of each user included in the integrated session exiting request, then sends an integrated presence information registration request to the presence server (AF3-34). If the SIP server receives an APL session exiting request in the packet receiving loop (AF3-13), the SIP server sets the status of "idle" for the subject application of each user included in the integrated session exiting request, then sends an integrated presence information registration request to the presence server (AF3-40). If the SIP server receives an APL session adding request in the packet receiving loop (AF3-16), the SIP server sets the status of "talking" for the application of each user included in the APL session adding request, then sends an integrated presence information registration request to the presence server (AF3-46). If the SIP has no function for generating presence information, the SIP server extracts the subject integrated session information from the request message, then sends the extracted information to the presence server with no modification regardless of the received message type (AF3-49). The packet receiving loop is closed when the SIP server is shut down (AF3-19). The SIP server thus stops the packet receiving loop, then stops its functions (AF3-22).

Figure 63:
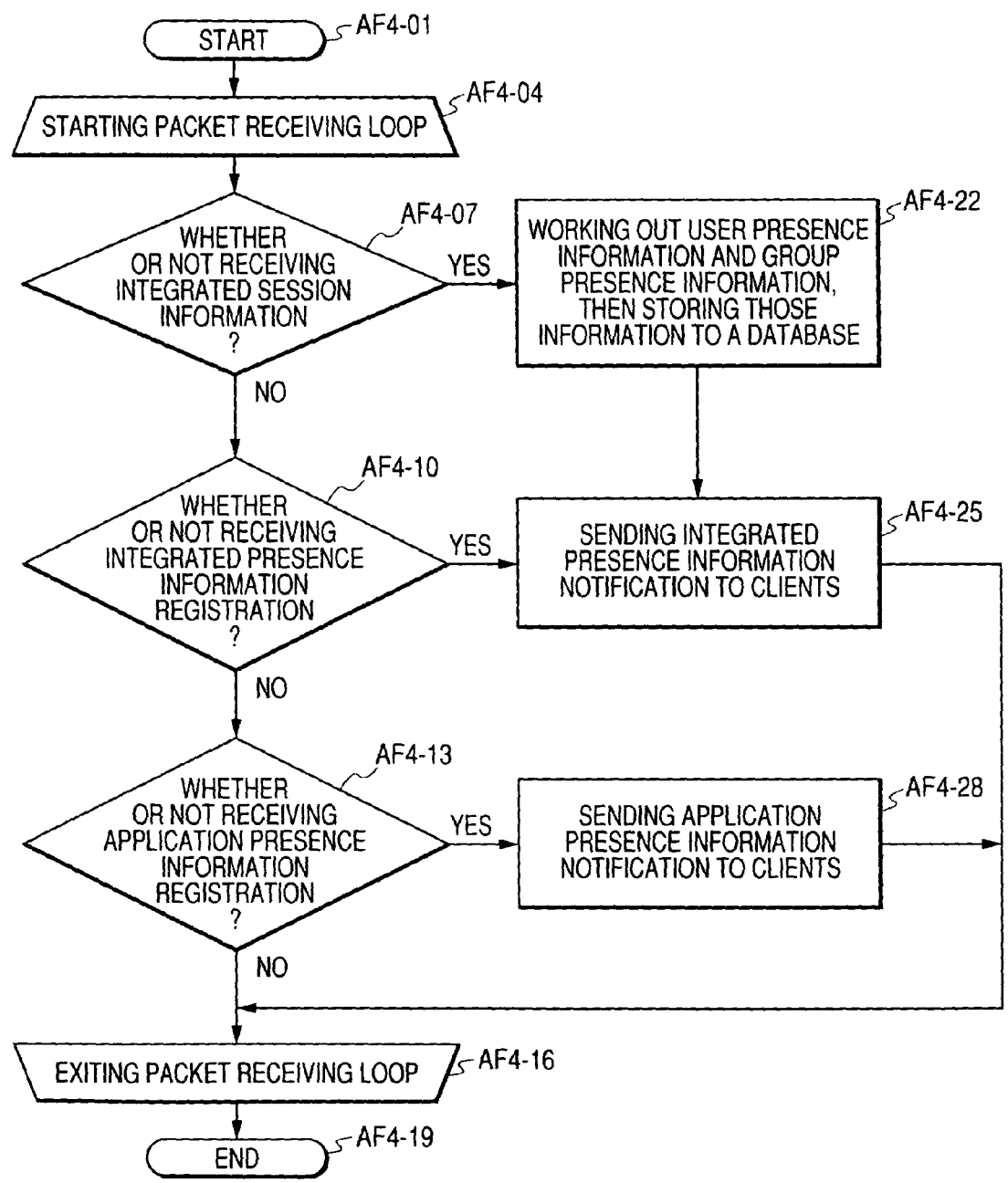
FIG. 63 is a flowchart of operations of a presence server.

FIG. 63 shows a flowchart of operations of a presence server. The presence server is initialized when it is started up to start a packet receiving loop (AF4-01, 04). If the presence server receives integrated session information in the packet receiving loop (AF4-07), the presence server obtains the subject integrated presence information and stores the presence information in each DB (AF4-22), then sends an integrated presence information notification to the presence client (AF4-25). This processing is executed only when the presence server has functions for generating presence information. If the presence server receives an integrated presence information registration request (AF4-13), the presence server stores the presence information in each DB, then sends an integrated presence information notification to the presence client (AF4-25). If the presence server receives an APL presence information registration request in the loop (AF4-16), the presence server stores the presence information in each DB, then sends an APL presence information notification to the presence client (AF4-28). The packet receiving loop is closed when the presence server is shut down (AF4-16). The presence server thus stops the packet receiving loop, then stops its functions (AF4-19).

Figure 65:
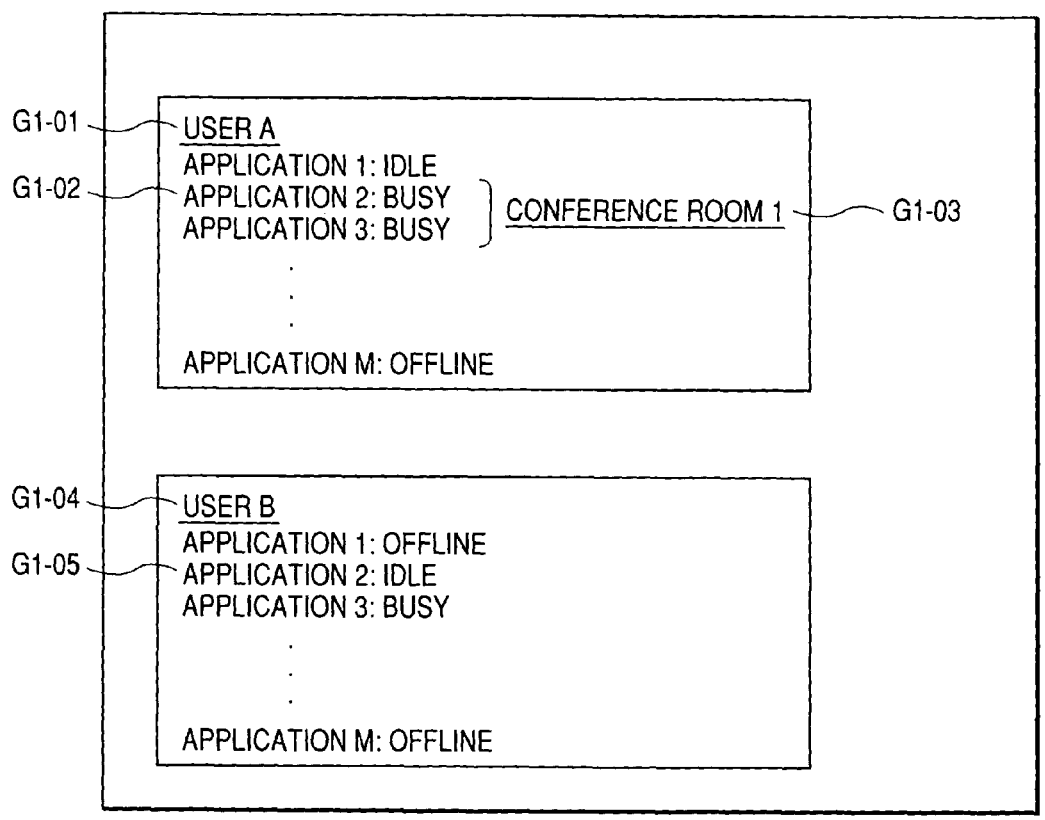
FIG. 65 is a chart 1 of the GUI of a presence client.
Figure 66:
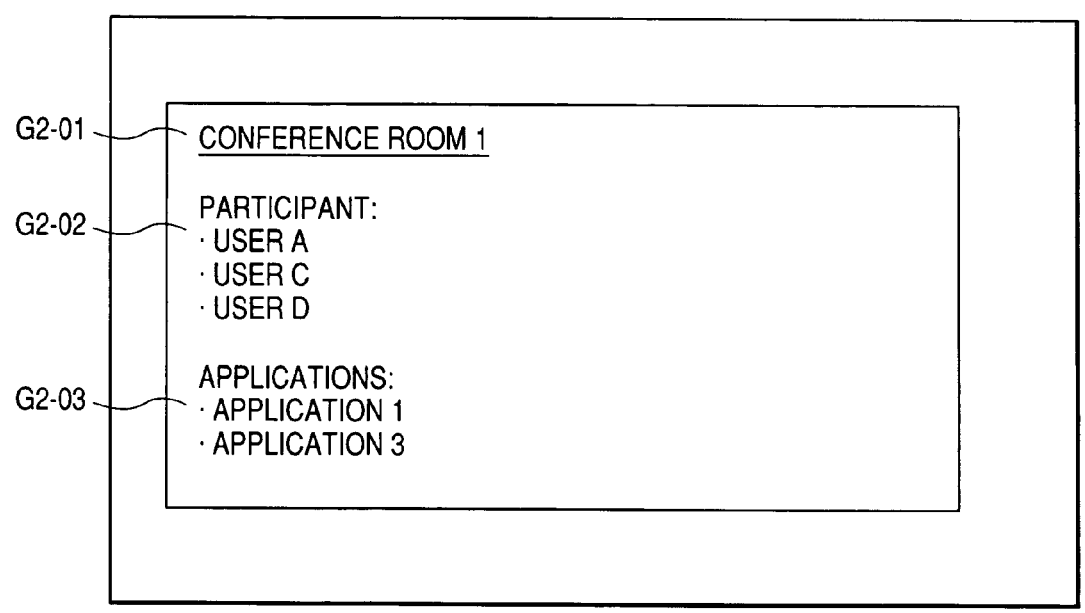
FIG. 66 is a chart 2 of the GUI of the presence client.

Next, a description will be made for a means for displaying presence information. FIGS. 65 and 66 show presence clients. FIG. 65 shows a field of a screen for displaying each user's presence information, which consists of elements of user name (G1-01, 04) and presence information (G1-02, 05) of each application available for each user. If a user accesses a plurality of application sessions in an integrated session, the means can display a group of applications used in the integrated session. Such a group of applications is displayed with a unique identifier. The identifier is clicked to display details of the group presence information in the integrated session shown in FIG. 66. The group presence information display screen includes elements of identifier name (G2-01), list of group members (G2-02), and list of applications (G2-03).

As described above, in the integrated application management system 1 of the present invention, the integrated application management apparatus and the integrated application client can control applications of both application servers and clients. This is why the system can apply to any of TV conference systems and education systems in which a plurality of applications are used cooperatively among a plurality of users.

What is claimed is:

1. An integrated session management server including a packet operating unit connected to a plurality of application servers through a network, the plurality of application servers being connected to a plurality of terminals through the network; wherein said integrated session management server further includes:
a memory; and
a CPU;
wherein said packet operation unit receives one integrated session ID, a plurality of terminal IDs corresponding to said integrated session ID, and a plurality of application IDs corresponding to said integrated session ID from one terminal of said plurality of terminals, said plurality of terminal IDs identifying corresponding terminals of said plurality of terminals;
wherein said packet operating unit can send an instruction for starting communication with said terminals corresponding to said plurality of terminals IDs, said integrated session ID, and said plurality of terminal IDs to said plurality of application servers corresponding to said plurality of application IDs, and send said integrated session ID to said terminals corresponding to said plurality of terminal IDs other than said one terminal;
wherein said memory can retain information denoting the start or end of communication between said plurality of application servers and said plurality of terminals;
wherein the packet operating unit can be connected to a new application server in addition to said plurality of application servers; and
wherein said memory can further retain an address of said new application server used on said network and information denoting a start or end of communication between said new application server and each of said plurality of terminals.

2. An integrated session management system, including:
a plurality of application servers, each having a memory, a CPU, and a packet operating unit connected to a plurality of terminals respectively; and
an integrated session management server connected to those application servers;
wherein said packet operation unit of said integrated session management server can receive one session integrated session ID, a plurality of terminal IDs corresponding to said integrated session ID, and a plurality of application IDs corresponding to said integrated session ID from one of said terminals and send said integrated session ID and said plurality of terminal IDs to said plurality of application servers corresponding to said plurality of application IDs, said plurality of terminal IDs identifying corresponding terminals of said plurality of terminals;
wherein said memory of said integrated session management server can retain information denoting the start or end of communication between said plurality of application servers and said plurality of terminals;
wherein said packet operating unit of each of said plurality of application servers corresponding to said plurality of application IDs can receive said integrated session ID and said plurality of terminal IDs from said integrated session management server and send a communication start request to said terminals corresponding to said plurality of terminal IDs other than said one terminal;
wherein the packet operating unit can be connected to a new application server in addition to said plurality of application servers; and
wherein said memory of said integrated session management server can further retain a network address of said new application server used and information denoting a start or end of communication between said new application server and each of said plurality of terminals.

3. A non-transitory computer-usable storage medium having computer-readable instructions stored thereon for execution by a CPU to implement an integrated session starting method in a terminal that includes a packet operating unit and a CPU connected to a plurality of application servers and an integrated session management server, respectively, said integrated session starting method comprising:
sending one integrated session ID, a plurality of application server IDs corresponding to said integrated session ID, and a plurality of terminal IDs corresponding to said integrated session ID through said packet operation unit, said plurality of terminal IDs identifying corresponding terminals of a plurality of terminals;
enabling said packet operating unit to receive a communication starting request from each of said plurality of application servers corresponding to said plurality of application IDs and to send said integrated session ID to said plurality of terminals corresponding to said plurality of terminal IDs;
enabling the packet operating unit to connect to a new application server in addition to said plurality of application servers; and
retaining a network address of said new application server used on said network and information denoting a start or end of communication between said new application server and each of said plurality of terminals.

4. The computer-usable storage medium of claim 3, wherein said integrated session starting method further comprises:
displaying information denoting a plurality of applications that can be supplied from said plurality of application servers on said display unit; displaying at least one of a plurality of applications that can be supplied from said plurality of application servers selected according to an input from said input interface; and
sending at least one of a plurality of application server IDs, which supplies said selected application to said integrated session management server together with said terminal ID through said packet operating unit.

* * * * *